(12) United States Patent
Tsujimichi et al.

(10) Patent No.: US 8,034,309 B2
(45) Date of Patent: Oct. 11, 2011

(54) PHOTOCATALYTIC PROCESS USING HYDROPHILIFIABLE MATERIAL

(75) Inventors: Kazuya Tsujimichi, Kitakyushu (JP); Hiroto Hasuo, Kitakyushu (JP); Hideki Kobayashi, Kitakyushu (JP)

(73) Assignee: Toto Ltd, Fukuoka-ken (JP)

( * ) Notice: Subject to any disclaimer, the term of this patent is extended or adjusted under 35 U.S.C. 154(b) by 1798 days.

(21) Appl. No.: 10/625,272

(22) Filed: Jul. 23, 2003

(65) Prior Publication Data

US 2004/0072684 A1   Apr. 15, 2004

Related U.S. Application Data

(62) Division of application No. 09/772,048, filed on Jan. 29, 2001, now abandoned, which is a division of application No. 09/380,946, filed on Sep. 9, 1999, now abandoned.

(30) Foreign Application Priority Data

Dec. 10, 1997 (JP) .................................... 9-362078

(51) Int. Cl.
*B01D 47/00* (2006.01)
(52) U.S. Cl. ..................................... 423/210; 423/239.1
(58) Field of Classification Search ................. 423/210, 423/235, 239.1; 422/122
See application file for complete search history.

(56) References Cited

U.S. PATENT DOCUMENTS

| | | | | |
|---|---|---|---|---|
| 5,854,708 A | * | 12/1998 | Komatsu et al. | 359/512 |
| 6,013,372 A | * | 1/2000 | Hayakawa et al. | 428/411.1 |
| 6,620,385 B2 | * | 9/2003 | Fujii | 422/186.3 |

FOREIGN PATENT DOCUMENTS

| | | |
|---|---|---|
| EP | 0590477 | 4/1994 |
| EP | 0684075 | 11/1995 |
| EP | 0780158 | 6/1997 |
| EP | 0866101 | 9/1998 |
| EP | 0913447 | 5/1999 |
| EP | 0923988 | 6/1999 |
| JP | 03073304 | 3/1991 |
| JP | 9075748 | 3/1997 |
| JP | 11060281 | 3/1999 |
| JP | 11131261 | 5/1999 |

OTHER PUBLICATIONS

Communication from European Patent Office dated Jul. 3, 2003, enclosing European Search Report for EPO 03005425.8-2104.
Office Action from Japanese Patent Office, issued Mar. 26, 2004 in Japanese language, for Japanese Application No. H09-362078.

* cited by examiner

*Primary Examiner* — Edward Johnson
(74) *Attorney, Agent, or Firm* — Carrier Blackman & Associates, P.C.; Joseph P. Carrier; William D. Blackman

(57) ABSTRACT

In a formulation comprising titanium dioxide as a photocatalyst and an amphoteric metal oxide (alumina or the like) or a basic metal oxide (barium oxide, strontium oxide or the like) as a material having a base point, when a nitrogen oxide (nitrogen monoxide) comes into contact with or approaches titanium dioxide, upon exposed to light, the carbon monoxide is oxidized to nitrogen dioxide (gas) by hydroxy radicals as an active oxygen species produced by titanium dioxide. As is apparent from the molecular structure, nitrogen dioxide is an acidic gas, alumina is an amphoteric metal oxide, and barium oxide and strontium oxide are a basic metal oxide. The oxygen atom thereof serves as a base point to an acid gas. Therefore, nitrogen dioxide is attracted and chemically bonded to the oxygen atom, held on the metal oxide, and kept close to titanium dioxide as the photocatalyst.

15 Claims, 16 Drawing Sheets

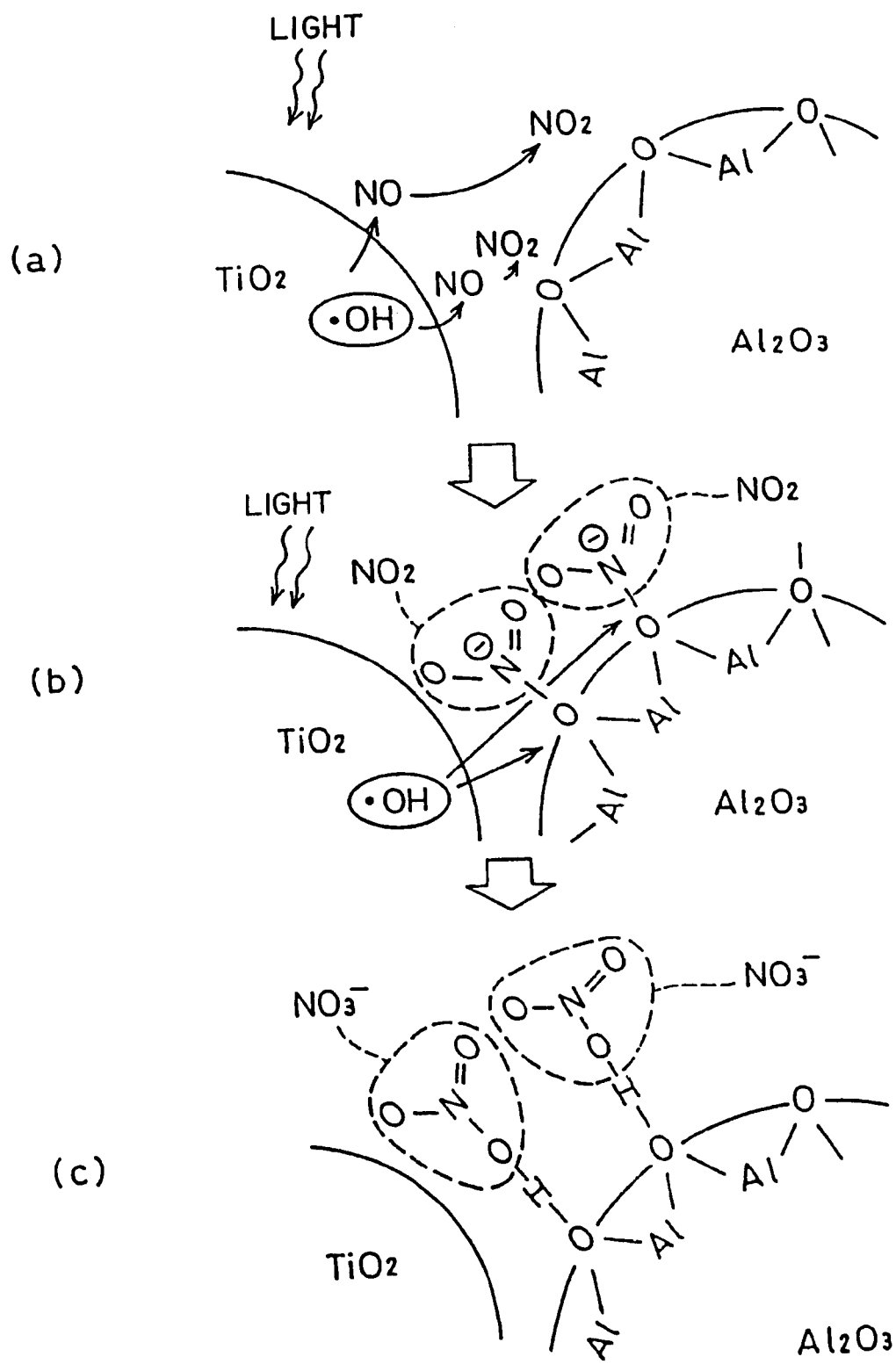
F I G. 1

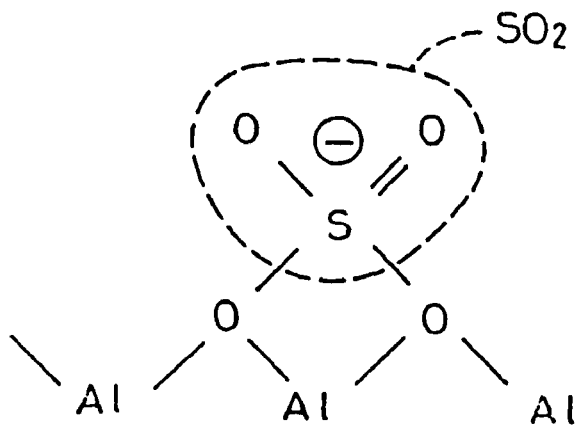
F I G. 2
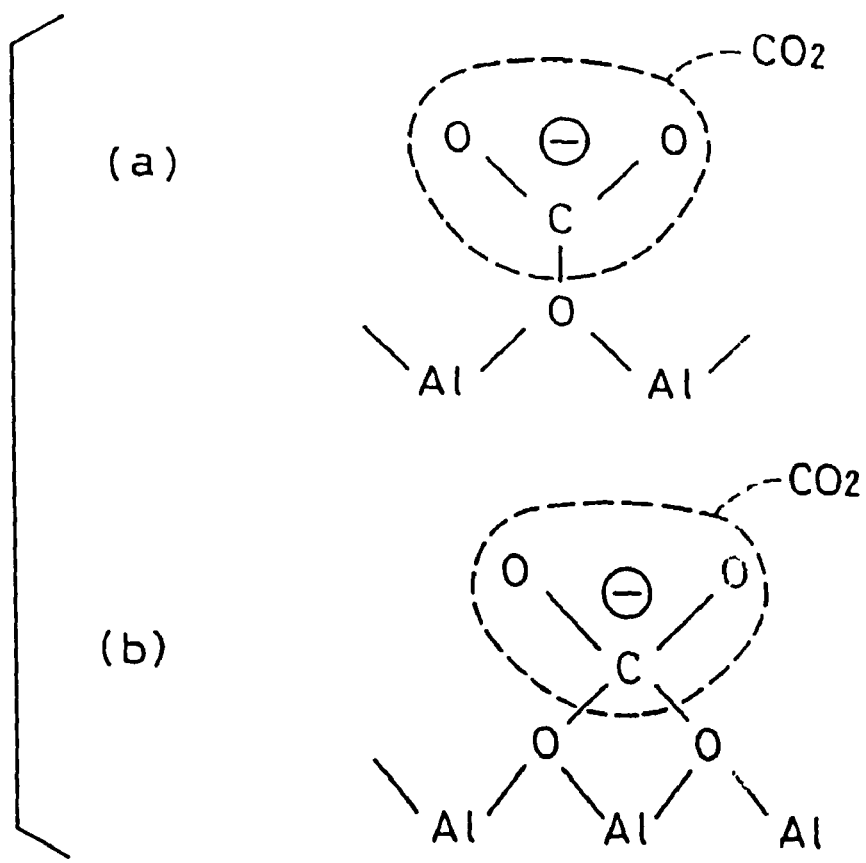
F I G. 3

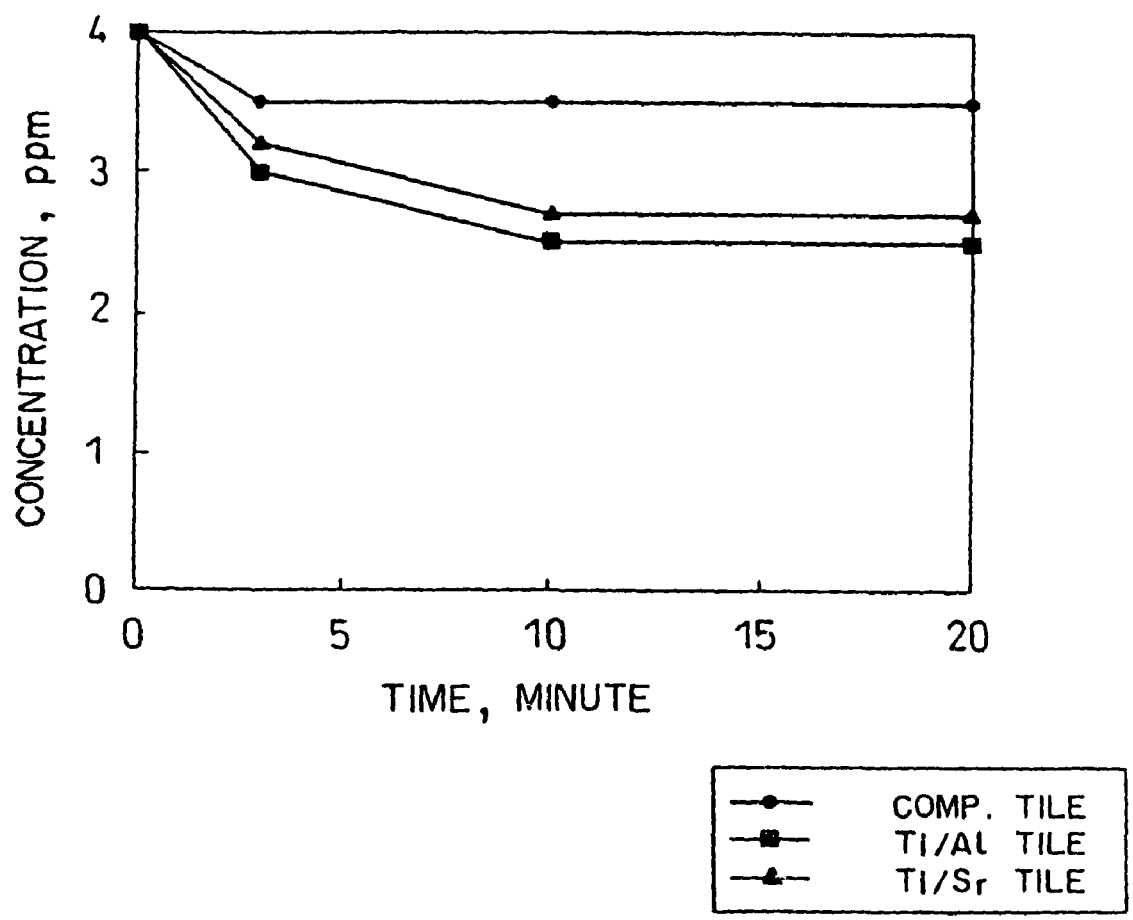
F I G. 6

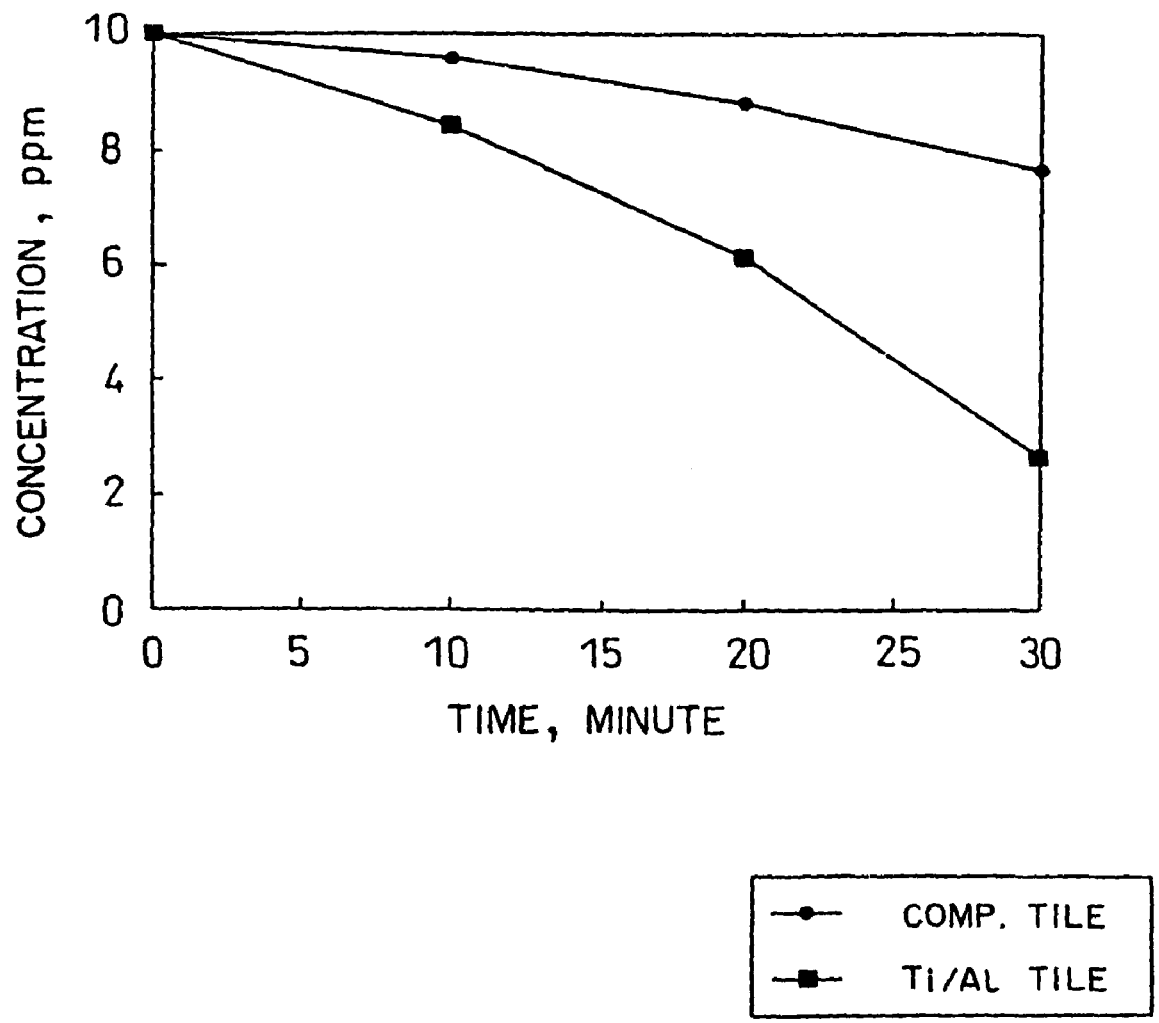
F I G. 7

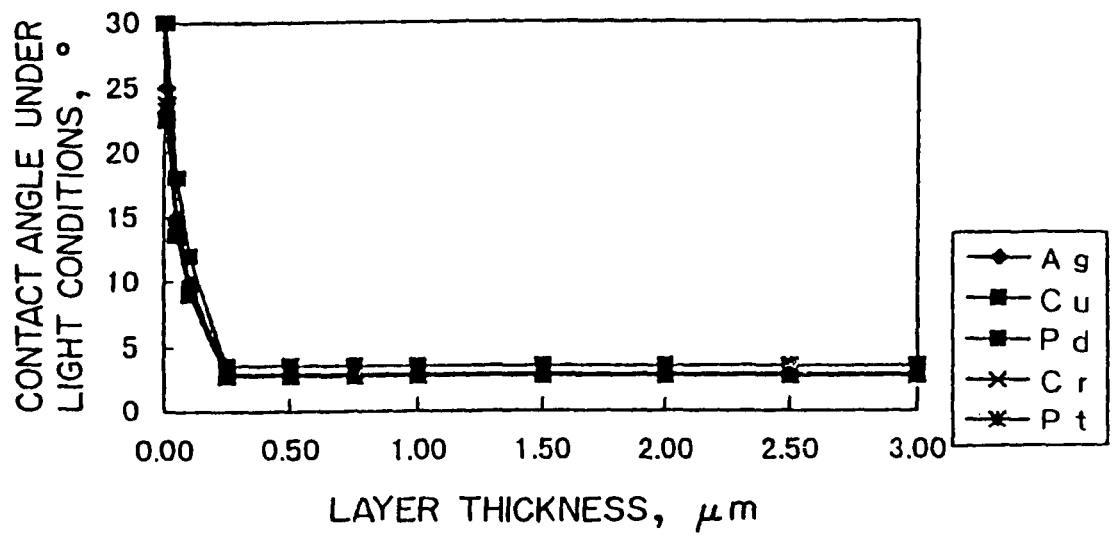
F I G. 13
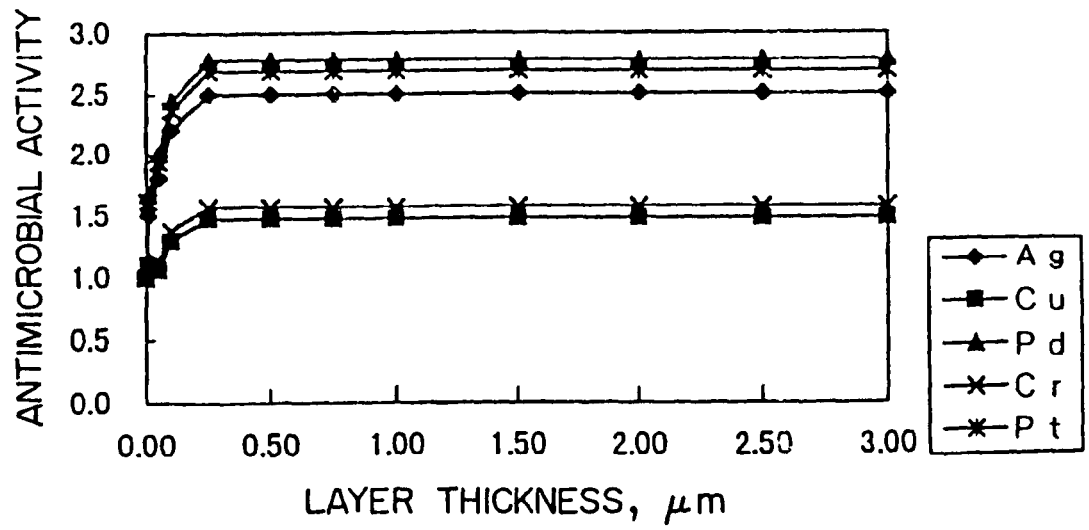
F I G. 14

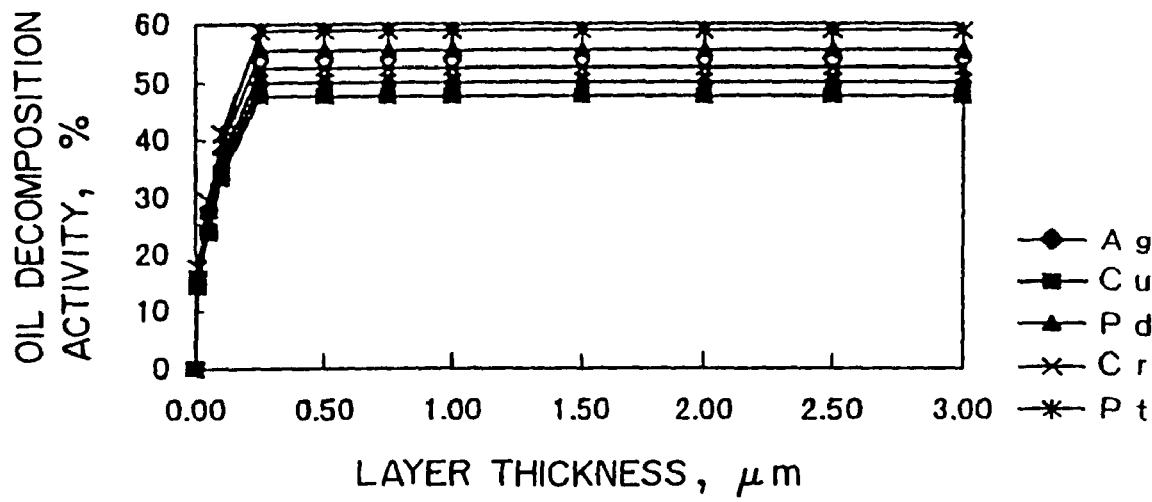
F I G. 15
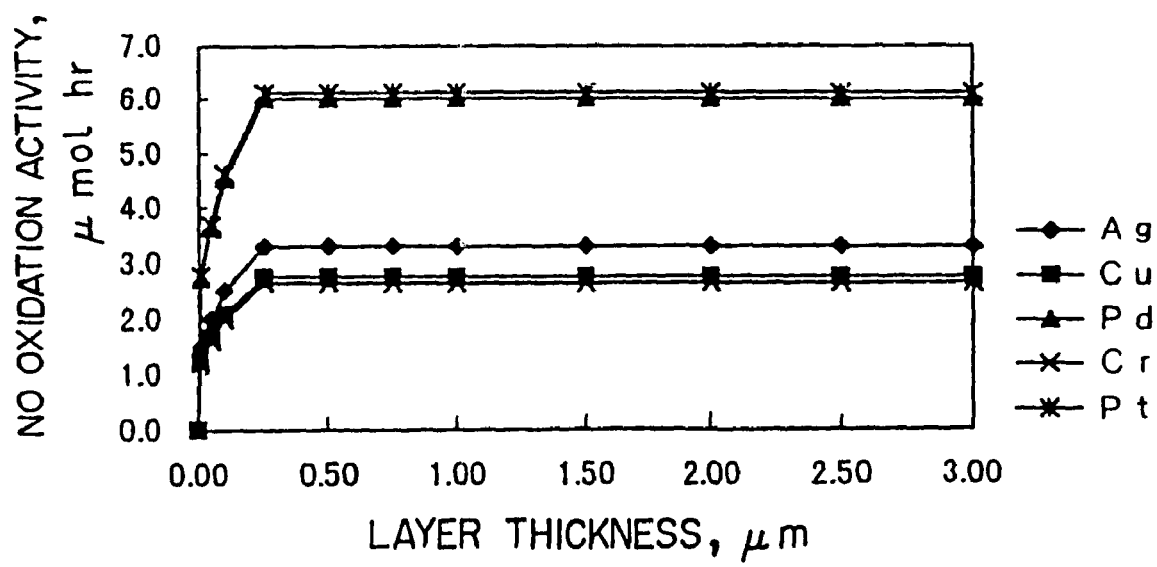
F I G. 16

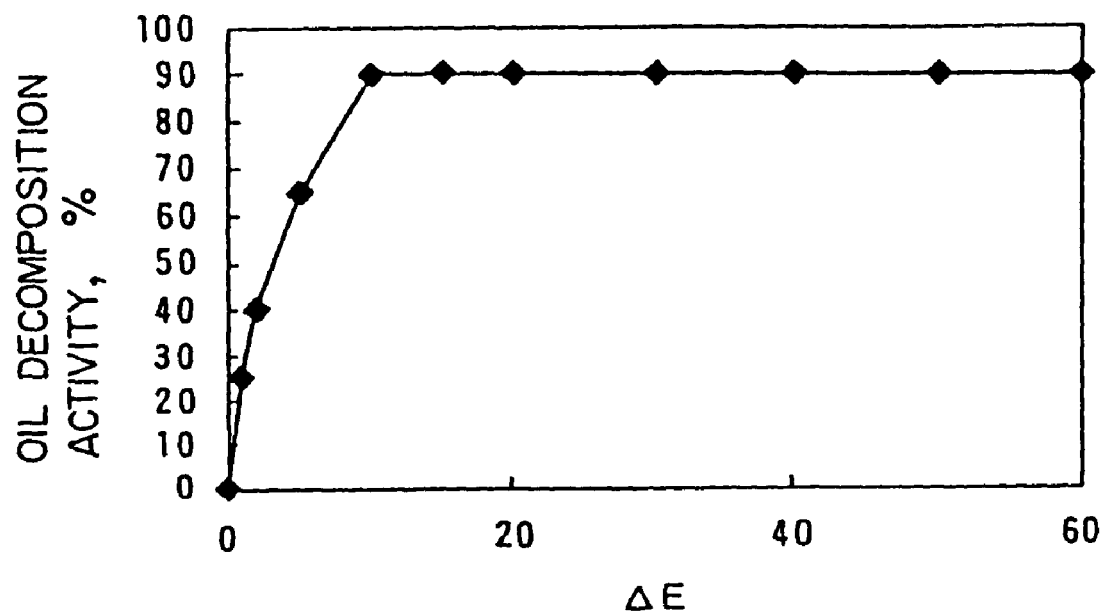
F I G. 20
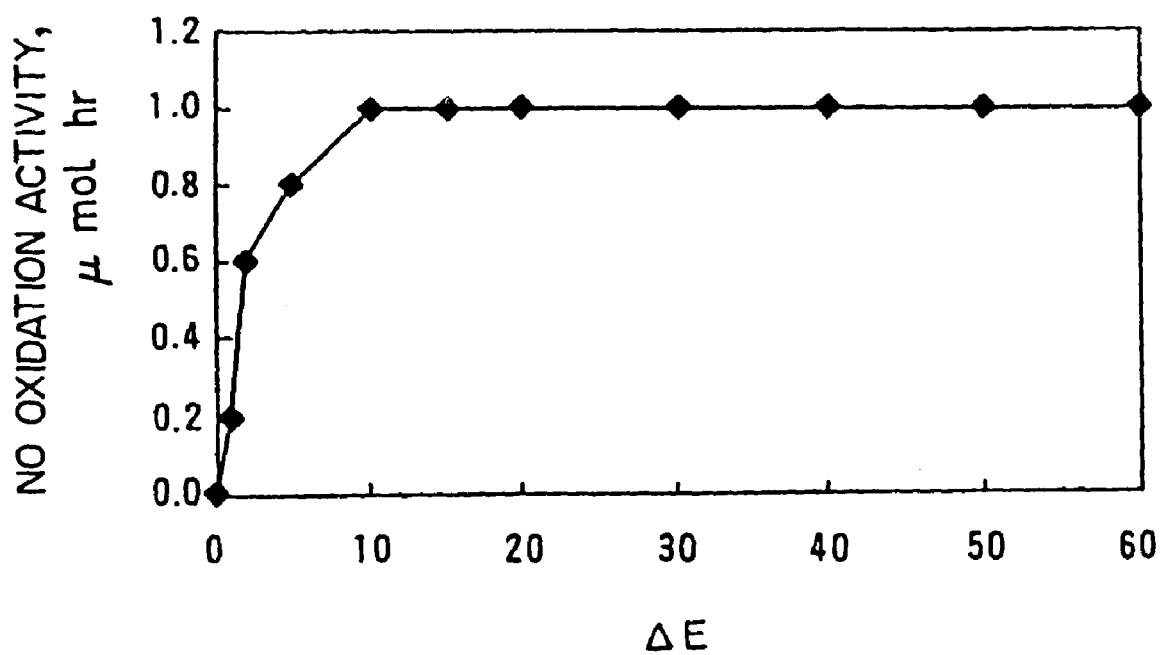
F I G. 21

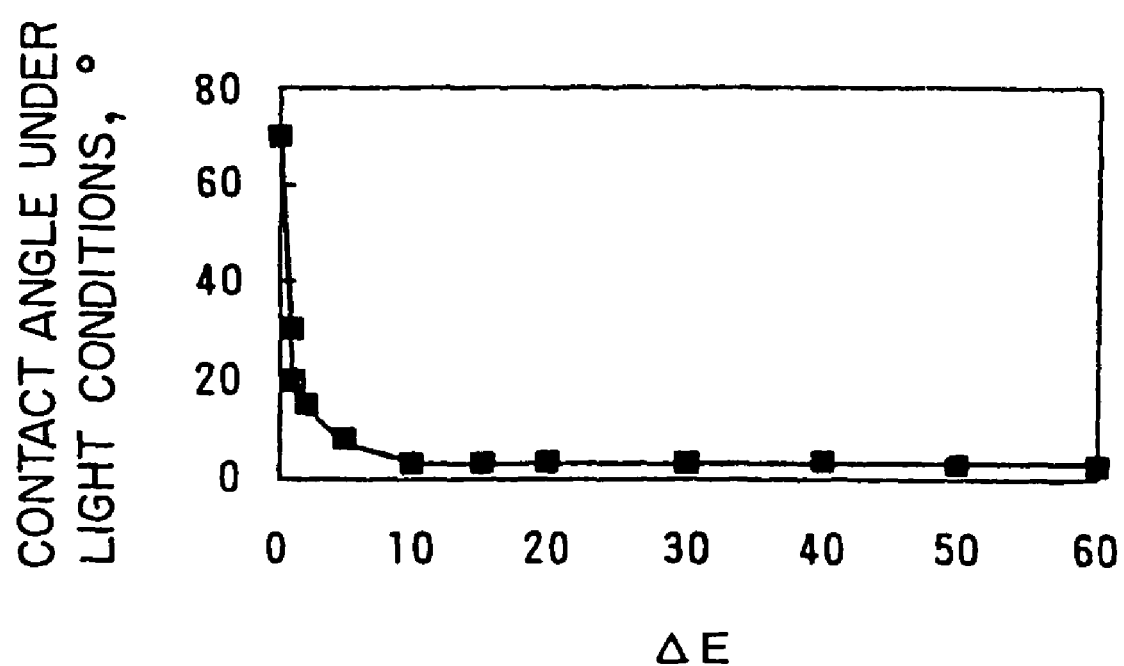
F I G. 22

US 8,034,309 B2

PHOTOCATALYTIC PROCESS USING HYDROPHILIFIABLE MATERIAL

This is a division of application Ser. No. 09/772,048, filed Jan. 29, 2001, now abandoned hereby incorporated herein by reference, which is a division of application Ser. No. 09/380,946, filed Sep. 9, 1999, now abandoned and claims the benefit of International Application No. PCT/JP98/03705, which has the international filing date of Aug. 21, 1998 and which was not published under PCT Article 21(2) in English.

FIELD OF THE INVENTION

The present invention relates to a photocatalytic hydrophilifiable formulation containing a photocatalyst.

BACKGROUND

This type of photocatalysts are finding expanded applications because energy used in catalytic reactions is light energy, such as sunlight, that is inexhaustible. For example, titanium dioxide ($TiO_2$), a kind of photocatalyst, particularly titanium oxide in an anatase crystal form, produces excited electrons and positive holes upon exposure to light energy (ultraviolet light), and the excited electrons and positive holes produce active oxygen species, such as $O_2^-$, $O^-$, and •OH (wherein the dot • represents an unpaired electron and means that the species attended with the dot • is a free radical), in the presence of oxygen and water on the surface of the catalyst. Applications utilizing free radical properties of the active oxygen species have been proposed such as air purification applications where nitrogen oxides (NOx) in the air are oxidized with the active oxygen species and consequently converted to a harmless reaction product (nitric acid), and degradation of bacteria through the oxidation of organic matter, that is, the so called antimicrobial applications.

In the course of the oxidation of the nitrogen oxides with the active oxygen species, nitrogen dioxide ($NO_2$) is produced as an intermediate that is further oxidized and finally converted to nitric acid. As a result of the production of nitric acid, the nitrogen oxides in the air are reduced, and the air is purified. For this reason, the presence of the active oxygen species and the nitrogen oxide or nitrogen dioxide is indispensable for enhancing the percentage reduction of nitrogen oxides. Since, however, nitrogen dioxide is a relatively chemically stable compound (gas), the produced nitrogen dioxide leaves the reaction system. This lowers the efficiency of the oxidation with the active oxygen species, resulting in lowered percentage reduction of the nitrogen oxides. Use of porous adsorbents, such as activated carbon, is considered effective for preventing nitrogen dioxide from leaving the reaction system. As is apparent from the following description, this method is not always effective.

Specifically, when nitrogen dioxide, which has left, is adsorbed on the above adsorbent, the nitrogen dioxide often remains within pores of the adsorbent without being released. For this reason, in some cases, the adsorbed nitrogen dioxide is placed outside the system of oxidation with the active oxygen species and does not undergo the oxidation reaction and hence cannot be converted to nitric acid as a final product. Thus, the nitrogen oxides are not finally converted to nitric acid. This inhibits the reduction of nitrogen oxides. In this case, it should be noted that nitrogen dioxide adsorbed onto the adsorbent in a region where nitrogen dioxide can be present together with the active oxygen species and is in the reaction system, that is, in a region close to the photocatalyst, is oxidized to produce nitric acid. Since, however, the region close to the photocatalyst occupies only a small proportion of the whole material adsorption region (including pores) in the absorbent, it can be said that the proportion of nitrogen dioxide, which could not be oxidized to nitric acid, is high. That is, the adsorbent merely adsorbs and holds nitrogen dioxide, and the percentage reduction of nitrogen oxides by conversion to nitric acid does not appear to be satisfactory.

The present invention has been made with a view to solving the above problems, and an object of the present invention is to further improve the efficiency of a catalytic reaction, in which a photocatalyst participates, or to improve the percentage reduction of the reactant applied to the catalytic reaction through the conversion of the reactants to the final product. Another object of the present invention is to supplement the function of a photocatalyst.

DISCLOSURE OF THE INVENTION

In order to attain the above objects, according to one aspect of the present invention, there is provided a photocatalyst formulation comprising: a photocatalyst that functions as a catalyst upon exposure to light; and another compound, characterized in that, when a reactant applied that participates in a reaction catalyzed by a photocatalyst, is catalytically reacted and chemically converted to a final product specified by the structure of the reactant and the catalytic reaction, the other compound functions in the presence of the photocatalyst so as to enhance the conversion of the reactant to the final product.

According to the photocatalyst formulation having the above constitution according to the first aspect of the present invention, the conversion of the reactant to the final product can be enhanced, and, hence, the percentage reduction of the reactant can be enhanced. In the photocatalyst formulation having the above constitution according to the first aspect of the present invention, the following preferred embodiments may be adopted. According to a first preferred embodiment of the present invention, the other compound is a compound that is chemically bonded to the reactant or to an intermediate produced before the reactant is catalytically reacted and converted to the final product.

In this first embodiment, the reactant or the intermediate is held in such a state that it is chemically bonded to the other compound which has been formulated together with the photocatalyst. This other compound with the reactant or the intermediate held thereon does not have a porous structure. Therefore, the reactant or the intermediate is not placed outside the system of the catalytic reaction, in which the photocatalyst participates, that is, in a region distant from the photocatalyst, and, instead, the reactant or the intermediate is placed within the catalytic reaction system, adjacent to the photocatalyst which has been formulated together with the other compound. Further, since the reactant or the intermediate is chemically bonded to the other compound, the reactant or the intermediate can be surely placed within the catalytic reaction system. As a result, the photocatalyst formulation according to the first preferred embodiment can ensure the opportunity for the reactant to be applied to the catalytic reaction and the opportunity for the intermediate to be applied to this catalytic reaction. This can further improve the efficiency of the catalytic reaction. The improved efficiency of the catalytic reaction can enhance the conversion of the reactant to the final product and hence can enhance the percentage reduction of the reactant.

According to a second preferred embodiment, upon exposure to energy of applied light, the photocatalyst produces excited electrons and positive holes that produce an active oxygen species in the presence of oxygen and water on the surface of the catalyst.

According to this second preferred embodiment of the present invention, the reactant or the intermediate is placed within the system of a catalytic reaction based on an active oxygen species produced by the photocatalyst. This ensures the opportunity for the reactant to be applied to the catalytic reaction or the opportunity for the intermediate to undergo the catalytic reaction. This permits the catalytic reaction to proceed more efficiently. Therefore, the percentage reduction of the reactant can be enhanced.

In this case, examples of photocatalysts usable herein include titanium dioxide ($TiO_2$), zinc oxide (ZnO), vanadium oxide ($V_2O_5$), and tungsten oxide ($WO_3$). These photocatalysts are not restricted by their crystal form and may be in any crystal form, for example, an anatase, rutile, or brookite form with the anatase titanium dioxide being preferred from the viewpoint of ready availability and the like. Regarding reactants applicable to the catalytic reaction based on the active oxygen species, intermediates produced from the reactants, and final products produced from the intermediates, examples are as follows. When the reactant is nitrogen oxide, the intermediate and the final product are nitrogen dioxide and nitric acid, respectively. When the reactant is sulfur oxides, the intermediate and the final product are sulfur dioxide and sulfuric acid or sulfurous acid, respectively. When the reactant is carbon monoxide, the intermediate and the final product are carbon dioxide and carbonic acid, respectively. In addition, ammonia may also be mentioned as an example of the reactant. In this case, the intermediate and the final product are nitrogen monoxide or nitrogen dioxide produced from ammonia and nitric acid, respectively.

According to a third preferred embodiment of the present invention, the other compound is at least one metal oxide selected from amphoteric metal oxides, basic metal oxides, and acidic metal oxides that are chemically bonded to the intermediate.

According to this third preferred embodiment, in placing the reactant or the intermediate within the system of the catalytic reaction based on the active oxygen species produced by the photocatalyst, when the reactant or the intermediate is acidic, the so called "basic site" may be formed at a specific atom derived from the atomic arrangement of a basic metal oxide. At this basic site, the basic metal oxide can be surely chemically bonded to the reactant or the intermediate. When the reactant or the intermediate is basic, the so-called "acidic site" may be formed at a specific atom derived from the atomic arrangement of an acidic metal oxide. At this acidic site, the acidic metal oxide can be securely chemically bonded to the reactant or the intermediate. Further, when the other compound is an amphoteric metal oxide, a specific atom derived from the atomic arrangement of the amphoteric metal oxide may serve as a basic site or an acidic site compatible with the properties of the reactant or the intermediate. Therefore, in this case, even when the reactant or the intermediate is any of a basic compound and an acidic compound, the amphoteric metal oxide can be surely chemically bonded to the reactant or the intermediate.

In this case, examples of amphoteric metal oxides include alumina ($Al_2O_3$), zinc oxide (ZnO), and tin oxides (SnO and $SnO_2$). Examples of basic metal oxides include strontium oxide (SrO), barium oxide (BaO), magnesium oxide (MgO), calcium oxide (CaO), rubidium oxide ($Rb_2O$), sodium oxide ($Na_2O$), and potassium oxide ($K_2O$). Further, examples of acidic metal oxides include phosphorus oxide ($P_2O_5$). In these metal oxides, the formation of the basic site or the acidic site is attributable to the difference in electronegativity between the metal atom and the oxygen atom constituting the metal oxide, and the atomic arrangement of the metal atom and the oxygen atom on the surface of the metal oxide. The basic metal oxide, the acidic metal oxide, and the amphoteric metal oxide may be properly selected according to the reactant for the catalytic reaction based on the active oxygen species and the intermediate produced from the reactant. It is a matter of course that when zinc oxide is selected as the photocatalyst, zinc oxide is not selected as the amphoteric metal oxide, because zinc oxide is a photocatalyst and, at the same time, an amphoteric metal oxide.

Here, a system where the photocatalyst is titanium dioxide, the compound is alumina as an amphoteric metal oxide, and the reactant is nitrogen oxide (nitrogen monoxide), will be taken by way of example to explain the progress of the catalytic reaction and bonding utilizing alumina. In this case, nitrogen monoxide is oxidized with an active oxygen species produced by titanium dioxide to give nitrogen dioxide as an intermediate. As schematically shown in FIG. 1, when nitrogen monoxide comes into contact with or approaches titanium dioxide as the photocatalyst, nitrogen monoxide is oxidized with hydroxy radical, which is an active oxygen species produced by titanium dioxide upon exposure to light, to give nitrogen dioxide (gas) (FIG. 1a). As is apparent from the molecular structure, nitrogen dioxide is acidic, and alumina is an amphoteric metal oxide with an oxygen atom thereof serving as the basic site for an acidic gas. Therefore, nitrogen dioxide is attracted by and chemically bonded to the oxygen atom and held on the alumina (FIG. 1b). The force by which nitrogen dioxide is attracted to the oxygen atom is coulombic force, and the bonding is chemical.

Nitrogen dioxide bonded to the oxygen atom of alumina stays near titanium dioxide as the photocatalyst and hence is within the system of an oxidation reaction (a catalytic reaction) induced by a hydroxy radical (FIG. 1b). This ensures the opportunity for nitrogen dioxide to be oxidized with the hydroxy radical and permits the oxidation of nitrogen dioxide to proceed efficiently. It is considered that nitrogen dioxide is oxidized to nitrate ions which, together with a hydrogen atom in the hydroxy radical, are bonded and held in the form of nitric acid (final product) on the oxygen atom, serving as the basic site, of alumina (FIG. 1c).

When nitrogen dioxide is originally present, that is, when nitrogen dioxide is the reactant, nitrogen dioxide is directly oxidized by an active oxygen species produced by titanium dioxide and, at the same time, nitrogen dioxide chemically bonded to alumina as described above is also oxidized with the active oxygen species. In other words, in this case, nitrogen dioxide as the reactant is chemically bonded to alumina.

Next, bonding utilizing alumina, in the case where sulfur monoxide (SO) and carbon monoxide (CO) are oxidized with an active oxygen species produced by titanium dioxide, will be explained. Upon oxidation, these oxides are converted to sulfur dioxide and carbon dioxide, that is, here again produce acidic gases. For this reason, as schematically shown in FIG. 2, sulfur dioxide is chemically bonded to oxygen atoms, which are basic sites possessed by alumina as an amphoteric metal oxide and adjacent thereto, and held on alumina. As schematically shown in FIG. 3, in the case of carbon dioxide, the carbon atom and the oxygen atom can be bonded in different bond orders. Therefore, carbon dioxide is chemically bonded to a single oxygen atom as the basic site noted above (FIG. 3a), or oxygen atoms serving as the basic site and adjacent to thereto (FIG. 3b) and held on alumina. In this case, the sulfur dioxide bonded and held on the alumina in this way is further reacted with an active oxygen species (hydroxy radical) produced by titanium dioxide to give sulfuric acid or sulfurous acid (final product), while carbon dioxide is converted to carbonic acid (final product). Carbon dioxide is considered to be converted also to methane or methanol by a reaction based on a radical hydrogen atom, produced in the production of the hydroxy radical as the active oxygen species, and the active oxygen species. In this case, methane or methanol can be said to be a final product.

According to a fourth preferred embodiment, the other compound is formulated so as to satisfy a/(a+b) of about 0.0001 to 0.8 wherein a represents the weight of the other compound and b represents the weight of the photocatalyst. When the value of a/(a+b) is not less than about 0.0001 as specified in the preferred fourth embodiment, the other compound (amphoteric metal oxide, basic metal oxide, or acidic metal oxide) represented by a can advantageously ensure the chemical bond of the reactant or the intermediate to prevent the lowering of the catalytic reaction efficiency. When the value of a/(a+b) is not more than about 0.8, the amount of the photocatalyst represented by b is advantageously not too small in relationship with the other compound, so that lowering of the efficiency of the catalytic reaction can be advantageously avoided.

In this case, the amount of the photocatalyst may be about 20 to 95% by weight based on the total amount of the photocatalyst, the above compound as a compounding ingredient other than the photocatalyst, and other ingredient(s), if any.

According to a fifth preferred embodiment, the photocatalyst and the other compound are regulated to and formulated in a particle diameter range of about 0.005 to 0.5 microns. When the particle diameter of the photocatalyst and the particle diameter of the other compound (amphoteric metal oxide, basic metal oxide, or acidic metal oxide) are in the range of from about 0.005 to 0.5 microns as specified in the fifth preferred embodiment, the regulation of the particle diameter can be advantageously carried out by means of an existing grinding device, such as a ball mill, or by the sol-gel process. Further, according to the fifth preferred embodiment, there is no significant difference in particle diameter between the photocatalyst and the other compound, particles of the photocatalyst and particles of the other compound having diameters similar to those of the particles of the photocatalyst approach each other. Therefore, the other reactant or intermediate chemically bonded to the other compound can approach the photocatalyst. This advantageously ensures the opportunity for the catalytic reaction to proceed, realizing improved efficiency.

According to a sixth preferred embodiment of the present invention, the photocatalyst formulation further comprises, in addition to the photocatalyst and the other compound, a third component of a compound to which a hydroxyl group is chemically bondable, and chemically adsorbs and holds the hydroxyl group on the surface of the photocatalyst and the compound as the third component, whereby the held hydroxyl group develops hydrophilicity.

In this sixth preferred embodiment, the hydroxyl group produced through the catalytic reaction, in which the photocatalyst participates, is chemically adsorbed and held on the surface of the compound as the third component, not to mention on the photocatalyst. Further, there is no possibility that the amount of water (water vapor in the air, rainwater or the like) on the surface of the catalyst becomes zero. Therefore, it can be said that the hydroxyl group is always produced during exposure to light. This permits the hydroxyl group to be held at very high density through chemical adsorption bonding, so that the hydroxyl group is firmly held. On the other hand, in the absence of light, hydroxyl groups are not produced by the photocatalyst. Since, however, hydroxyl groups, which have been produced up to this point, are firmly held on the surface of the photocatalyst and the compound as the third component, there is no fear of the hydroxyl group being inadvertently removed. In this case, when light is again applied, holding of the hydroxyl group at high density is returned even though the hydroxyl density has been decreased up to this point. Therefore, fixation of the photocatalyst formulation according to the sixth embodiment onto the surface of a certain substrate permits the surface of the substrate to be surely rendered highly hydrophilic, and this high hydrophilicity can be surely maintained for a long period of time. That is, the photocatalyst formulation according to the sixth preferred embodiment can function as a hydrophilicity-imparting material for imparting high hydrophilicity to the surface of the substrate.

Effects attained by the hydrophilic nature will be described. The hydrophilicity is greatly related to the contact angle between the surface of the material and water. The higher the hydrophilicity, the lower the contact angle. When the contact angle is small, water is less likely to stay on the surface of the material. Therefore, in this case, stains deposited onto the surface, together with water, run down the surface of the material and are removed from the surface. When hydrophilicity is high enough to exhibit a contact angle below the contact angle of inorganic dust, such as urban dust having a high oleophilic component content and clay mineral, is obtained, the dust can be removed without utilizing the affinity. Further, as the contact angle approaches 0°, the hydrophilicity enhances and water is diffused as a film on the surface of the substrate, facilitating the flow of stains. Therefore, not only urban dust but also inorganic dust, together with water, easily runs down the surface of the substrate. In this case, the contact angle is preferably not more than about 20° and close to 0° from the viewpoint of enhancing the antifouling effect.

Therefore, through fixation of the photocatalyst formulation according to the sixth preferred embodiment of the invention on the surface of inner or outer walls of buildings or the body surface of vehicles, such as automobiles and electric trains, the high hydrophilicity, which has been imparted in this way, can exhibit high antifouling effect. In this case, when rain water pours onto the surface thereof, by virtue of high hydrophilicity imparted to the surface thereof, dust and contaminants deposited on the surface, together with rain water, are washed away from the surface each time when the surface is exposed to rainfall, thus permitting the surface to be self-cleaned. That is, the so called "rain streak fouling" can be effectively prevented wherein streaks of dust or the like are left along streams of water. Further, fixation of the photocatalyst formulation according to the sixth preferred embodiment onto the surface of glasses, lenses, mirrors or the like can offer high antifogging effect by virtue of the high hydrophilicity.

According to a seventh preferred embodiment, the compound as the third component has a heat of wetting equal to or higher than that of the photocatalyst. In the case of the material with hydroxyl groups being present on the surface thereof, the heat of wetting can be regarded as an indication of the capability of the surface to hold the hydroxyl groups. The higher the heat of wetting, the higher the capability of the surface to hold the hydroxyl groups and the higher the hydroxyl group density. Therefore, according to the seventh preferred embodiment, the hydroxyl groups produced by the photocatalyst are chemically adsorbed and held at higher density in a more effective manner onto the compound as the third component. This can impart high hydrophilicity to the surface of the substrate with higher reliability for a long period of time. In this case, the heat of wetting of titania, a particularly preferred catalyst, is 320 to $512 \times 10^{-3}$ $Jm^{-2}$ for the anatase form and 293 to $645 \times 10^{-3}$ $Jm^{-2}$ for the rutile form. Therefore, compounds having a heat of wetting of not less than $500 \times 10^{-3}$ $Jm^{-2}$ are more preferred.

According to an eighth preferred embodiment, the compound as the third component is at least one metal oxide selected from $SiO_2$, $Al_2O_3$, $ZrO_2$, $GeO_2$, $ThO_2$, and ZnO. Since these metal oxides have the heat of wetting equal to or greater than titania, which is particularly preferred as the photocatalyst, the holding density of the hydroxyl group is advantageously more enhanced. Silica ($SiO_2$), alumina ($Al_2O_3$), $GeO_2$, and $ThO_2$ are more preferred because the upper limit of the heat of wetting exceeds $1000 \times 10^{-3}$ $Jm^{-2}$.

In this case, each compound as the third component ($SiO_2$, $Al_2O_3$, $ZrO_2$, $GeO_2$, $ThO_2$, or ZnO) is determined by taking into consideration the reactant to be reduced by the present invention and a combination with the other compound ($Al_2O_3$, ZnO, SnO, $SnO_2$, SrO, BaO, MgO, CaO, $Rb_2O$, $Na_2O$, $K_2O$, or $P_2O_5$) formulated together with the photocatalyst. Specifically, when $Al_2O_3$ is selected as the other compound formulated together with the photocatalyst, the compound as the third component is selected from the compound other than $Al_2O_3$, that is, selected from $SiO_2$, $ZrO_2$, $GeO_2$, $ThO_2$, and ZnO, in order to avoid the overlapping of the component. When $Al_2O_3$ as the other compound cannot be chemically bonded to the reactant or the intermediate, the other compound is selected from compounds other than $Al_2O_3$, that is, selected from ZnO, SnO, $SnO_2$, SrO, BaO, MgO, CaO, $Rb_2O$, $Na_2O$, $K_2O$, and $P_2O_5$, and the third component is selected from compounds including $Al_2O_3$ (that is, $SiO_2$, $Al_2O_3$, $ZrO_2$, $GeO_2$, $ThO_2$, and ZnO). This is true of ZnO.

According to a ninth preferred embodiment, a fourth component of an antimicrobial metal is added besides the photocatalyst, the other compound, and the compound as the third component, and the metal as the fourth component is supported on the photocatalyst. In the ninth preferred embodiment, during exposure to light, the antimicrobial activity of the photocatalyst per se is utilized, while in the absence of light, the antimicrobial activity of the metal supported on the photocatalyst is utilized. Therefore, the antimicrobial activity of the photocatalyst can be supplemented, and synergistic antimicrobial activity can be realized by the antimicrobial metal and photocatalyst.

According to a tenth preferred embodiment, the metal as the fourth component has a reduction potential that is not less than the potential of free electrons emitted by the photocatalyst. In this tenth preferred embodiment, the metal can be easily supported on the photocatalyst by taking advantage of the reduction potential of this metal. In this case, the metal is preferably at least one member selected from silver, copper, palladium, iron, nickel, chromium, cobalt, platinum, gold, lithium, calcium, magnesium, aluminum, zinc, rhodium, and ruthenium, because they have the above reduction potential. Silver, copper, palladium, platinum, and gold are particularly preferred because they have a positive reduction potential and hence can easily realize bearing of the metal by reduction. The metal selected as the fourth component is preferably formulated so as to satisfy a c/d value of about 0.00001 to 0.05 wherein c represents the weight of the metal and d represents the weight of the photocatalyst. That is, when the metal as the fourth component has a c/d value of not less than 0.00001, there is no possibility that the amount of the metal is too small to exhibit synergistic antimicrobial activity, while when the metal as the fourth component has a c/d value of not more than 0.05, there is no possibility that the amount of the metal is excessive and adversely affects the catalytic reaction of the photocatalyst.

According to a second aspect of the present invention, there is provided a photocatalyst-containing material having a photocatalyst that functions as a catalyst upon exposure to light, the photocatalyst-containing material comprising the photocatalyst formulation according to the first aspect of the present invention or the photocatalyst formulation according to each embodiment of the first aspect of the present invention that has been mixed and dispersed in a paint or a glaze.

As with the photocatalyst formulation according to the first aspect of the present invention, the paint and the glaze as the photocatalyst-containing material having the above constitution according to the second aspect of the present invention can enhance the percentage reduction of the reactant or enables the reactant or the intermediate to be surely placed within the catalytic reaction system. Therefore, the reactant can be efficiently reduced on a surface coated with the paint or on a surface with the glaze being applied thereto. Further, on these surfaces, the opportunity for the reactant to be applied to the catalytic reaction and the opportunity for the intermediate to undergo the catalytic reaction can be ensured, permitting the catalytic reaction to proceed more efficiently.

In this case, paints and glazes in which the photocatalyst and the compound are mixed and dispersed may be conventional paints and glazes. In the case of the glaze, the photocatalyst and the compound, together with a raw material of a glaze, for example, a frit, such as feldspar or potassium carbonate, are dispersed in a solution. In dispersing and mixing the photocatalyst and the compound, the photocatalyst and the compound may be formulated together with the raw material of the glaze in the course of the production of the glaze. Alternatively, they may be formulated in the completed glaze before the glaze is applied.

In the photocatalyst-containing material according to the second aspect of the present invention, when the photocatalyst-containing material according to the second aspect of the present invention is a photocatalyst-containing material (a paint or a glaze) such that the photocatalyst is one that, upon exposure to light, produces excited electrons and positive holes which produce an active oxygen species in the presence of oxygen and water on the surface of the catalyst, and the other compound is at least one metal oxide selected from amphoteric metal oxides, basic metal oxides, and acidic metal oxides that chemically bind to the reactant or the intermediate of the catalytic reaction based on the active oxygen species, the following advantage can be offered.

According to this photocatalyst-containing material, as with the above embodiments of the photocatalyst formulation according to the first aspect of the present invention, the reactant or the intermediate can be securely bonded and held at the basic site or the acidic site, and the reactant or the intermediate can be placed within the catalytic reaction system based on the active oxygen species. This allows the catalytic reaction to proceed more efficiently on a surface coated with the paint as the photocatalyst-containing material or a surface with the glaze applied thereto, which in turn can enhance the percentage reduction of the reactant. Further, in the photocatalyst-containing material, when photocatalyst formulations containing the compound as the third component specified in the sixth to eighth preferred embodiments of the photocatalyst formulation according to the first aspect of the present invention are used, high antifouling effect based on high hydrophilicity can be advantageously realized on these surfaces. Furthermore, in the photocatalyst-containing material, when photocatalyst formulations containing the metal as the fourth component specified in the ninth to tenth preferred embodiments of the photocatalyst formulation according to the first aspect of the present invention are used, synergistic antimicrobial activity can be advantageously realized on these surfaces by the antimicrobial metal and photocatalyst.

In the photocatalyst-containing material according to the present invention, particularly the paint, a coating of the photocatalyst-containing material can be formed by the paint on inner or outer walls of building structures, such as existing buildings, houses, and bridges, and existing structures, such as guardrails and noise barriers of roads. Therefore, these structures can be easily modified so as to have high percentage reduction of the reactant and high antifouling effect.

According to a third aspect of the present invention, there is provided a photocatalytic material comprising a substrate layer and a surface layer provided on the surface of the substrate layer, said photocatalytic material being rendered photocatalytically active upon exposure to light, the surface layer comprising the photocatalyst formulation according to the first aspect of the present invention, the photocatalyst formulation according to each embodiment of the first aspect of the present invention, or the photocatalyst-containing material according to the second aspect of the present invention.

In the photocatalytic material according to the third aspect of the present invention, when the surface layer comprises a photocatalyst formulation or a photocatalyst-containing material comprising the compound as the third component or a combination of the compound as the third component with the metal as the fourth component, the surface layer may have a geometry satisfying any one of the following requirements (1) and (2):
(1) thickness of surface layer: about 0.01 to 3.0 microns; and
(2) the difference in color of the surface layer between before ultraviolet irradiation and after ultraviolet irradiation of the surface layer, with a 1% silver nitrate solution deposited thereon, for 5 min at an ultraviolet intensity on the surface layer of $1.2\ mW/cm^2$, $\Delta E$ is from 1 to 50.

In the photocatalytic material according to this embodiment, the surface layer contains the compound as the third component. As with the sixth to eighth preferred embodiments of the photocatalyst formulation according to the first aspect of the present invention, by virtue of the compound as the third component, the surface layer has a reduced contact angle and improved hydrophilicity that can realize high antifouling effect. When the thickness of the surface layer is not less than about 0.01 microns, the layer (surface layer) is not too thin and is advantageous in that the contact angle of the surface layer per se can be surely utilized as the contact angle of the material. Specifically, even though the substrate has a high contact angle, the surface layer provided on the substrate can reduce the contact angle as the material. Therefore, the material can exhibit high antifouling effect. On the other hand, when the thickness of the surface layer is not more than about 3.0 microns, the adhesion of the surface layer to the substrate can be maintained. This can advantageously prevent the separation of the surface layer (layer separation). This is true of the use of the compound as the third component in combination with the metal as the fourth component.

Silver ions in the silver nitrate solution deposited on the surface layer are reduced and precipitated to develop a color, as a result of receipt of excited electrons from the photocatalyst in the excitation upon exposure to ultraviolet light. Therefore, a color difference $\Delta E$ is observed between before ultraviolet irradiation and after ultraviolet irradiation of the surface layer. The more excited electrons produced, the larger the color difference $\Delta E$. The amount of the excited electron produced is a factor that governs the photoactivity of the photocatalyst. This enables the photocatalytic activity to be evaluated by using the color difference $\Delta E$. The excited electrons of the photocatalyst produce active oxygen species, such as hydroxy radical, in the air. Therefore, the higher the photocatalytic activity, that is, the larger the color difference $\Delta E$, the greater the amount of the active oxygen species, such as hydroxy radical.

The compound as the third component contained in the surface layer functions to hold the hydroxy radical produced by the excited electrons of the photocatalyst. The more the hydroxy radical produced, the higher the hydroxyl group density on the surface of the compound as the third component. This provides a lower contact angle with water and hence can enhance the hydrophilicity. Further, the more hydroxy radical produced, the more organic compounds decomposed. This is advantageous for the hydrophilicity. Therefore, when the surface layer has a color difference $\Delta E$ of not less than 1, it has a photocatalytic activity high enough to form high hydroxyl group density. Advantageously, this could surely reduce the contact angle of the surface layer to a level low enough to provide antifouling effect. On the other hand, when the amount of the photocatalyst, based on the binder, per surface unit area is increased, the color difference $\Delta E$ is increased. In this case, it is considered that the adhesion to the substrate is lowered causing the separation of the surface layer. For this reason, a surface layer having a color difference $\Delta E$ of not more than 50 is preferred from the viewpoint of preventing the separation of the surface layer.

According to a fourth aspect of the present invention, there is provided a photocatalytic material comprising a substrate layer and a surface layer provided on the surface of the substrate layer, said photocatalytic material being rendered photocatalytically active upon exposure to light, the surface layer having been formed using the photocatalyst formulation according to the first aspect of the present invention or the photocatalyst formulation according to each embodiment of the first aspect of the present invention on the surface of the substrate layer through a binder.

In the photocatalytic material according to the fourth aspect of the present invention, the binder is preferably one which is polymerized or melted below a temperature at which the quality of the material of the substrate layer is changed, to bond the photocatalyst formulation onto the surface of the substrate layer, or alternatively is preferably a glaze or a paint.

According to a fifth aspect of the present invention, there is provided a photocatalytic material comprising a substrate layer and a surface layer provided on the surface of the substrate layer, said photocatalytic material being rendered photocatalytically active upon exposure to light, the surface layer comprising $TiO_2$ as a photocatalyst and, in addition, $Al_2O_3$, $SiO_2$, and an antimicrobial metal.

As with the photocatalyst formulation according to the first aspect of the present invention, in the photocatalytic materials having the above constitution according to the third to fifth aspects of the present invention, on the surface of the surface layer provided on the substrate layer, the percentage reduction of the reactant can be enhanced, and the reactant or the intermediate can be surely placed within the catalytic reaction system. Therefore, on the surface of the surface layer in the photocatalytic material, the reactant can be efficiently reduced, and, at the same time, the opportunity for the reactant to participate in the catalytic reaction and the opportunity for the intermediate to undergo the catalytic reaction can be ensured, permitting the catalytic reaction to proceed more efficiently. Further, since the surface layer contains an antimicrobial metal on the surface layer, synergistic antimicrobial activity can be advantageously realized by the antimicrobial metal and photocatalyst.

When the photocatalytic materials according to the third and fourth aspect of the present invention are photocatalytic materials such that the photocatalyst is one that, upon exposure to light, produces excited electrons and positive holes which produce an active oxygen species in the presence of oxygen and water on the surface of the catalyst, and the other compound is at least one metal oxide selected from amphoteric metal oxides, basic metal oxides, and acidic metal oxides that are chemically bonded to the reactant or the intermediate to participate in the catalytic reaction based on the active oxygen species, the following advantage can be offered.

According to these photocatalytic materials, as with the above embodiments of the photocatalyst formulation according to the first aspect of the present invention, the reactant or the intermediate can be securely bonded and held at the basic site or the acidic site, and the reactant or the intermediate can be placed within the catalytic reaction system based on the active oxygen species. This allows the catalytic reaction to proceed more efficiently on the surface of the surface layer in the photocatalytic material, which in turn can enhance the percentage reduction of the reactant. Further, in the photocatalytic materials, when photocatalyst formulations or photocatalyst-containing materials containing the compound as the third component specified in the sixth to eighth preferred embodiments of the photocatalyst formulation according to the first aspect of the present invention are used, high antifouling effect based on high hydrophilicity can be advantageously realized on these surfaces. Furthermore, in the photocatalytic materials, when photocatalyst formulations or photocatalyst-containing materials containing the metal as the fourth component specified in the ninth to tenth preferred embodiments of the photocatalyst formulation according to the first aspect of the present invention are used, synergistic antimicrobial activity can be advantageously realized on these surfaces by the antimicrobial metal and photocatalyst.

In the photocatalytic materials according to the third to fifth aspects of the present invention, the following preferred embodiments may be adopted.

According to a first preferred embodiment, the substrate layer comprises a substrate selected from ceramics, resins, metals, glasses, earthenware, woods, calcium silicate boards, concrete boards, cement boards, cement extruded boards, plaster boards, and autoclave light-weight concrete boards.

According to this preferred embodiment, the photocatalytic material can photocatalytically act in places where these substrates are used, for example, inner and outer walls of building structures, such as buildings, houses, and bridges, and roads, and decomposes environmental pollutants, such as nitrogen oxides, sulfur oxides, and carbon dioxide, to purify the air. Further, when the photocatalyst formulation containing the compound as the third component is used, the photocatalytic material can exhibit high antifouling effect based on high hydrophilicity in the inner or outer walls of building, roads and the like.

According to a second preferred embodiment, the surface layer has been formed by heat treatment, for example, firing. According to this embodiment, a surface layer, which strongly adheres to the substrate layer, can be formed.

According to a third preferred embodiment, an antimicrobial metal or metal compound is anchored on the surface of the surface layer. According to this embodiment, during exposure to light, the antimicrobial activity of the photocatalyst per se in the surface layer is utilized, while in the absence of light, the antimicrobial activity of the metal or the metal oxide anchored on the surface of the surface layer is utilized. Therefore, the antimicrobial activity of the photocatalyst can be supplemented. Further, since the surface layer contains the other compound described above besides the photocatalyst, the surface layer, in addition to the antimicrobial action, can decompose environmental pollutants and purify the air through an improvement in efficiency of the catalytic reaction, in which the photocatalyst participates. Further, in the photocatalytic material, when photocatalyst formulations or photocatalyst-containing materials containing the compound as the third component specified in the sixth to eighth preferred embodiments of the photocatalyst formulation according to the first aspect of the present invention are used, high antifouling effect based on high hydrophilicity can be advantageously realized on these surface layers. Furthermore, in the photocatalytic materials, when photocatalyst formulations or photocatalyst-containing materials with the metal as the fourth component supported thereon specified in the ninth to tenth preferred embodiments of the photocatalyst formulation according to the first aspect of the present invention are used, synergistic antimicrobial activity can be advantageously realized by the metal as the fourth component. Therefore, the amount of the metal or metallic compound anchored on the surface of the surface layer can be minimized. Further, when the synergistic antimicrobial activity realized by the metal as the fourth component is high, the anchoring of the metal or metallic compound onto the surface of the surface layer can be omitted.

According to a sixth aspect of the present invention, there is provided a process for producing a photocatalytic material comprising a substrate layer and a surface layer provided on the surface of the substrate layer, said photocatalytic material being rendered photocatalytically active upon exposure to light, said process comprising the steps of:

providing the photocatalyst formulation according to the first aspect of the present invention or the photocatalyst formulation according to each embodiment of the first aspect of the present invention or a photocatalyst formulation dispersed sol with the photocatalyst formulation dispersed therein;

layering the photocatalyst formulation or the photocatalyst formulation dispersed sol on the surface of the substrate layer (step of layering); and forming the surface layer.

In this case, the photocatalyst formulation dispersed sol can be obtained by dispersing the photocatalyst formulation in a liquid, such as water or an alcohol. The process according to the sixth aspect of the present invention does not require any special step. Therefore, a novel photocatalytic material can be easily produced which, as described above in connection with the photocatalyst formulation according to the first aspect of the present invention, permits the reactant or the intermediate to be surely placed within the catalytic reaction system, whereby a catalytic reaction takes place with high efficiency on the surface layer. In this case, in forming the surface layer, suitable methods, for example, heat treatment or drying treatment, may be adopted according to the layered photocatalyst formulation or the photocatalyst formulation dispersed sol.

In the process according to the sixth aspect of the present invention, when the step of layering involves the step of putting, coating, or printing the photocatalyst formulation or the photocatalyst formulation dispersed sol on the surface of the substrate layer to form a layer of the photocatalyst formulation or the photocatalyst formulation dispersed sol, the following advantages can be offered.

Specifically, according to the process according to the sixth aspect of the present invention, a novel photocatalytic material can be easily produced which comprises a photocatalyst formulation and can create a catalytic reaction with high efficiency on a surface layer having a substantially even thickness. When the formation of a layered coating is contemplated, layering the photocatalyst formulation on the surface of the substrate layer may be carried out by a suitable coating method, such as spray coating, while when the formation of a layered print is contemplated, layering the photocatalyst formulation on the surface of the substrate layer may be carried out by a suitable printing method, such as roll printing.

According to a seventh aspect of the present invention, there is provided a process for producing a photocatalytic material comprising a substrate layer and a surface layer provided on the surface of the substrate layer, said photocatalytic material being rendered photocatalytically active upon exposure to light, said process comprising the steps of:

providing the photocatalyst formulation according to the first aspect of the present invention, the photocatalyst formulation according to each embodiment of the first aspect of the present invention or a photocatalyst formulation dispersed sol with the photocatalyst formulation dispersed therein;

layering a binder on the surface of the substrate layer to form a binder layer;

layering the photocatalyst formulation or the photocatalyst formulation dispersed sol on the surface of the binder layer; and heat-treating the assembly according to the properties of the binder to form the surface layer.

In the process according to the seventh aspect of the present invention, the surface layer can be formed on the surface of the binder layer so that, in the interface of the binder layer and the surface layer, the photocatalyst formulation in the surface layer is embedded and held in the binder layer. This permits the surface layer to be firmly anchored onto the binder layer and, at the same time, the photocatalyst formulation to be effectively brought into contact with the outside air. Further, a novel photocatalytic material can be provided which, as described above in connection with the photocatalyst formulation according to the first aspect of the present invention, the reactant or the intermediate is be surely placed within the catalytic reaction system, permitting the catalytic reaction to take place with high efficiency on the surface layer.

In this case, when the surface layer is formed using a glaze as the binder, the heat treatment may be carried out at a temperature 30 to 300° C. above the softening temperature of the glaze and below a temperature at which the quality of the substrate constituting the substrate layer is changed. The heating temperature at least 30° C. above the softening temperature of the binder (glaze) is advantageous in that an unnecessarily long period of time is not required for softening of the glaze by heating. Further, since the heating temperature is not a temperature more than 300° C. above the softening temperature of the glaze, rapid melting of the glaze can be avoided, preventing unfavorable phenomena, such as excessive embedding of the photocatalyst formulation, the creation of irregular surface, or creation of pinholes. Further, in forming the surface layer, the heat treatment is preferably carried out at a temperature of about 150 to about 1300° C. This enables an existing heating device to be used in the production of a novel photocatalytic material that creates the catalytic reaction with high efficiency. The heat treatment temperature of about 150° C. or above conforms to the heat treatment temperature of the conventional glazes, eliminating the need to use heating treatment conditions which are different from those in the prior art. Further, when the heat treatment temperature is about 1300° C. or below, the temperature conforms to the heat treatment temperature used in substrates requiring heat treatment, for example, in the production of tiles or ceramic wares, eliminating the need to change the heat treatment conditions.

When the surface layer is formed using a paint as the binder, the heat treatment may be carried out below a temperature at which the quality of the substrate constituting the substrate layer is changed. This advantageously enables the formation of the surface layer without changing the quality of the substrate.

In the processes according to the sixth and seventh aspects of the present invention, the step of forming the surface layer may be followed by the step of coating a solution containing an antimicrobial metal or metal compound dispersed therein on the surface of the surface layer and the step of anchoring the metal or a metal oxide on the surface of the surface layer.

In the process for producing a photocatalytic material according to this embodiment, a novel photocatalytic material can be easily produced wherein the surface layer can exhibit antimicrobial activity independently of whether the material is placed under light conditions or under dark conditions and, in addition, a highly efficient catalytic reaction takes place on the surface layer. Further, independently of whether the material is placed under light conditions or under dark conditions, this property of exhibiting the antimicrobial activity can be imparted after the surface layer is formed in the photocatalytic material.

In the processes according to the sixth and seventh aspects of the present invention, the step of layering may comprise layering the photocatalyst formulation or the photocatalyst formulation dispersed sol and then coating a solution containing an antimicrobial metal or metal compound dispersed therein, and the step of forming the surface layer comprises, simultaneously with the formation of the surface layer, anchoring the metal or metal oxide on the surface of the surface layer.

In the process for producing a photocatalytic material according to this embodiment, a novel photocatalytic material can be easily produced which has, from the first, both the property of exhibiting the antimicrobial activity independently of whether the material is placed under light conditions or under dark conditions, and the property of creating the catalytic reaction with high efficiency.

In the processes according to the sixth and seventh aspects of the present invention, the step of forming the surface layer may be followed by the step of coating an aqueous metal salt solution containing antimicrobial metal ions on the surface of the surface layer and the step of irradiating the surface layer with ultraviolet light to photoreduce the metal ions on the photocatalyst, thereby supporting and fixing the metal on the photocatalyst in the surface layer.

In the process for producing a photocatalytic material according to this embodiment, a novel photocatalytic material can be easily produced which, in the surface layer, can exhibit the antimicrobial activity, independently of whether the material is placed under light conditions or under dark conditions, and, at the same time, can catalyze a reaction in the surface layer with high efficiency. Further, a metal, which enhances the antimicrobial activity, is supported and fixed onto the photocatalyst in the surface layer through photoreduction and hence is less likely to be separated from the photocatalyst. Therefore, the property of supplementing the antimicrobial activity can be maintained for a long period of time. Further, independently of whether the material is placed under light conditions or under dark conditions, this property of exhibiting the antimicrobial activity can be imparted after the surface layer is formed in the photocatalytic material. When the photocatalyst formulation with the metal as the fourth component supported thereon according to the ninth and tenth embodiments in the photocatalyst formulation according to the first aspect of the present invention is used, the metal as the fourth component also can develop synergistic antimicrobial activity. Therefore, the amount of the metal supported on the surface of the surface layer through coating of an aqueous metal salt solution and subsequent ultraviolet irradiation can be minimized. Further, when the synergistic antimicrobial activity of the metal as the fourth component is high, the step of supporting the metal on the surface of the surface layer may be omitted.

According to an eighth aspect of the present invention, there is provided a process for producing a photocatalyst formulation comprising the photocatalyst that functions as a catalyst upon exposure to light, the other compound, the compound as the third component, and the metal as the fourth component, said process being characterized by comprising the steps of:

providing a photocatalyst dispersed sol containing, dispersed therein, among the photocatalyst, the other compound, and the compounds as the third component; and a process for producing a photocatalyst formulation comprising a photocatalyst that, upon exposure to light, functions as a catalyst, comprising the steps of:

providing a photocatalyst formulation dispersed sol with the photocatalyst formulation according to any one of the sixth to eighth preferred embodiments in the first aspect of the present invention dispersed therein; and mixing the photocatalyst formulation dispersed sol with an aqueous metal salt solution containing antimicrobial metal ions and supporting the metal as the fourth component on the photocatalyst.

According to a ninth aspect of the present invention, there is provided a process for producing the photocatalyst formulation comprising the photocatalyst that functions as a catalyst upon exposure to light, the other compound, the compound as the third component, and the metal as the fourth component, said process being characterized by comprising the steps of:

providing a photocatalyst dispersed sol containing, dispersed therein, at least the photocatalyst, and among the photocatalyst, the other compound and the compound as the third component; and mixing the photocatalyst dispersed sol with an aqueous metal salt solution containing antimicrobial metal ions, coprecipitating the metal salt and the photocatalyst formulation, and supporting the metal as the fourth component on the photocatalyst.

According to a tenth aspect of the present invention, there is provided a process for producing the photocatalyst formulation comprising the photocatalyst that functions as a catalyst upon exposure to light, the other compound, the compound as the third component, and the metal as the fourth component, said process being characterized by comprising the steps of:

providing a photocatalyst dispersed sol containing, dispersed therein, at least the photocatalyst, and among the photocatalyst, the other compound and the compound as the third component; and mixing the photocatalyst dispersed sol with an aqueous metal salt solution containing antimicrobial metal ions and then irradiating the mixture with ultraviolet light to photoreduce the metal ions, thereby supporting the metal as the fourth component on the photocatalyst.

In the processes for producing a photocatalyst formulation according to the eighth to tenth aspects of the present invention, a novel photocatalyst formulation can be easily produced which, in the surface layer formed using the photocatalyst formulation, can exhibit the antimicrobial activity, independently of whether the material is placed under light conditions or under dark conditions, and, at the same time, can develop a catalytic reaction in the surface layer with high efficiency. Further, in the process according to the eighth aspect of the present invention, what is required for previously supporting and fixing the metal, which contributes to supplementation of the antimicrobial activity, onto the photocatalyst, is merely to mix the photocatalyst dispersed sol with the aqueous metal salt solution. This can simplify the process. Further, in the process according to the ninth and tenth aspects of the present invention, coprecipitation or photoreduction is utilized in previously supporting and fixing a metal, which can supplement the antimicrobial activity, onto the photocatalyst. By virtue of this constitution, the metal is less likely to be separated from the photocatalyst, permitting the ability of supplementing the antimicrobial activity to be maintained for a long period of time. Further, in the process according to the tenth aspect of the present invention, what is required for supporting and fixing the metal is merely to apply ultraviolet light, and use of chemicals and the like is not required at all. This can simplify the process.

In the processes for producing a photocatalyst formulation according to the eighth to tenth aspects of the present invention, the photocatalyst dispersed sol may be a sol containing, dispersed therein, all the photocatalyst, the other compound, and the compound as the third component, that is, a sol containing, dispersed therein, the photocatalyst formulation according to the sixth to eighth preferred embodiments in the first aspect of the present invention. Further, the other compound and the compound as the third component may be dispersed in the photocatalyst dispersed sol after supporting the metal. Furthermore, when the photocatalyst formulation should be powdery from the viewpoint of the convenience of storage or the like, a sol may be dried which contains, dispersed therein, the photocatalyst, with the metal as the fourth component supported thereon, the other compound, and the compound as the third component.

The present invention may take the following other embodiments. Specifically, according to a first other embodiment of the present invention, there is provided a process for producing a formulation containing a photocatalyst that can function as a catalyst upon exposure to light, the process being characterized by comprising the steps of:

(A) providing a first sol containing particles of the photocatalyst dispersed therein;

(B) providing a second sol containing, dispersed therein, particles of the other compound that chemically bind to the reactant or to an intermediate which is produced before the reactant is converted to the final product of the catalytic reaction; and (C) mixing the first sol with the second sol.

In the process according to this first other embodiment, mixing the first sol with the second sol permits the photocatalyst and the other compound to be easily dispersed in a solvent. In the mixed sol, which has been subjected to step (C), neither only the photocatalyst agglomerates, nor only the other compound agglomerates, and the resultant sol is such that the photocatalyst and the other component constituting the photocatalyst formulation are substantially intimately mixed and dispersed. Therefore, this mixed sol is suitable for use as a photocatalyst formulation dispersed sol. This facilitates the formulation of, for example, a material which is used in a liquid state, for example, the formulation of the photocatalyst and the other compound into paints or glazes. Further, by virtue of the sol form, the first and second sols can be easily weighed. The mixing ratio of the photocatalyst to the other compound can be easily regulated by weighing the first and second sols. Further, removal of the solvent in the mixed sol by drying or other means can provide a solid, particulate formulation comprising a substantially intimate mixture of the photocatalyst with the other compound. In this case, preferably, an identical solvent is used for the first sol and the second sol, or solvents having the so called "good affinity" are used.

In the process according to the first other embodiment of the present invention:

step (A) may involve the step of preparing particles of the photocatalyst that, upon exposure to light, produces excited electrons and positive holes which produce an active oxygen species in the presence of oxygen and water on the surface of the catalyst; and step (B) may involve the step of providing as the other compound at least one metal oxide selected from amphoteric metal oxides, basic metal oxides, and acidic metal oxides that chemically bind to the reactant or to the intermediate in a catalytic reaction based on the active oxygen species and preparing particles of the metal oxide.

According to this second other embodiment, a photocatalyst formulation can be easily produced which comprises a substantially intimate mixture of a photocatalyst, capable of causing a catalytic reaction based on an active oxygen species, with the other compound capable of surely bonding and holding the reactant or the intermediate at the basic site or the acidic site.

In the process according to the first other embodiment, step (C) may involve the step of formulating the first sol with the second sol so that a/(a+b) is about 0.0001 to 0.8 wherein a represents the weight of the metal oxide and b represents the weight of the photocatalyst.

According to this third other embodiment, a photocatalyst formulation can be easily produced wherein the amount of the metal oxide (amphoteric metal oxide, basic meal oxide, or acidic metal oxide) is not too small and the amount of the photocatalyst is not too small in relationship with the metal oxide, so that lowering of the efficiency of the catalytic reaction can be avoided.

Further, in the process according to the first other embodiment, step (A) may involve the step of regulating particles of the photocatalyst to a diameter ranging from about 0.005 to 0.5 microns, and step (B) may involve the step of regulating particles of the metal oxide to a diameter ranging from about 0.005 to 0.5 microns.

According to this fourth other embodiment, the particle diameter can be easily regulated by subjecting the photocatalyst and the metal oxide (amphoteric metal oxide, basic metal oxide, or acidic metal oxide) to treatment by means of an existing grinding device, such as a ball mill, or by the sol-gel process. A photocatalyst formulation, which does not cause a lowering in efficiency of the catalytic reaction, can be easily produced without separating the reactant or the intermediate from the photocatalyst. Further, according to this embodiment, particles of the photocatalyst and particles of the metal compound having similar diameters can approach each other, and the reactant or the intermediate can approach the photocatalyst. This enables a photocatalyst formulation, which can provide high catalytic reaction efficiency, to be easily produced.

BRIEF DESCRIPTION OF THE DRAWINGS

FIG. 1 is a schematic diagram illustrating, in oxidation of nitrogen oxides with titanium dioxide as a photocatalyst, the progress of a catalytic reaction and the bonding of an intermediate, produced by the catalytic reaction, to alumina in the case where alumina is formulated with the titanium dioxide;

FIG. 2 is a schematic diagram illustrating, in oxidation of sulfur oxides with titanium dioxide as a photocatalyst, the bonding of an intermediate, produced by the catalytic reaction, to alumina in the case where alumina is formulated with the titanium dioxide;

FIG. 3 is a schematic diagram illustrating, in oxidation of carbon monoxide with titanium dioxide as a photocatalyst, the progress of a catalytic reaction and the bonding of an intermediate, produced by the catalytic reaction, to alumina in the case where alumina is formulated with the titanium dioxide;

FIG. 6 is a graph showing the results of a test on the conversion of ammonia by example tiles according to the first example of the present invention;

FIG. 7 is a graph showing the results of a test on conversion of sulfur dioxides by example tiles according to the first example of the present invention;

FIG. 13 is a graph showing the relationship between the thickness of the surface layer and the contact angle under light conditions in example tiles of a four component system (baked type) according to the sixth example;

FIG. 14 is a graph showing the relationship between the thickness of the surface layer and the antimicrobial activity in example tiles of a four component system (baked type) according to the sixth example of the present invention;

FIG. 15 is a graph showing the relationship between the thickness of the surface layer and the oil degradation activity in example tiles of a four component system (baked type) according to the sixth example;

FIG. 16 is a graph showing the relationship between the thickness of the surface layer and the NO oxidation activity in example tiles of a four component system (baked type) according to the sixth example;

FIG. 20 is a graph showing the relationship between the color difference ΔE and the oil degradation activity in example tiles of a four component system (paint type) according to the sixth example;

FIG. 21 is a graph showing the relationship between the color difference ΔE and the NO oxidation activity in example tiles of a four component system (paint type) according to the sixth example; and FIG. 22 is a graph showing the relationship between the color difference ΔE and the contact angle under light conditions in example tiles of a three component system (paint type) according to the seventh example.

PREFERRED EMBODIMENTS OF THE INVENTION

Figure 4:
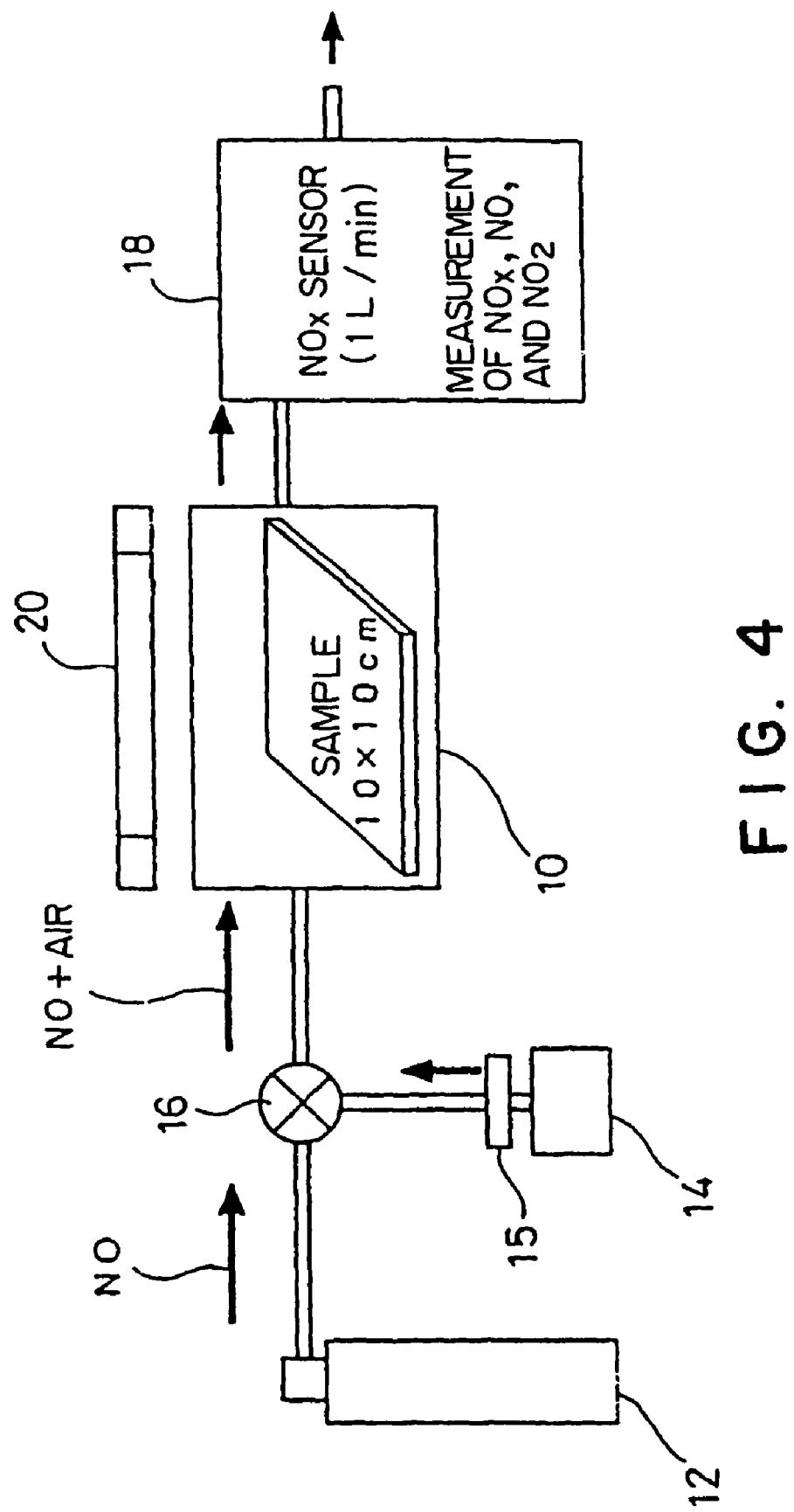
FIG. 4 is a schematic block diagram of a test apparatus used to measure the conversion of nitrogen oxides by example tiles according to the first example of the present invention.

Embodiments of the present invention will be described with reference to the following examples. Preparation of photocatalyst formulations used in the following examples will be described. Titanium dioxide (anatase form) was used as a photocatalyst which is formulated together with the other compound. Alumina as an amphoteric metal oxide and strontium oxide and barium oxide as basic metal oxides were used as metal oxides. Photocatalyst formulations were prepared through the following steps.

(i) Preparation of Photocatalyst and Particles of Metal Oxide

Starting materials for titanium dioxide, alumina, strontium oxide, and barium oxide were provided. They were pulverized by means of a grinding device, such as a ball mill, or subjected to a sol-gel process. Thus, fine particles of titanium dioxide, alumina, strontium oxide, and barium oxide were obtained. In this case, size regulation was carried out so that, for the particles of the compounds, the diameter is in the range of about 0.005 to 0.5 microns.

(ii) Preparation of Sol

Next, the materials for formulation thus prepared were dispersed in a solvent, such as water or an alcohol, to prepare a sol for each material for formulation. In this case, for each sol, the amount of the material to be dispersed (for example, the weight of the material for formulation/volume of the solvent) is specified.

(iii) Preparation of Photocatalyst Formulations

Thereafter, the titanium dioxide sol (photocatalyst sol) thus prepared was mixed with a metal oxide sol, that is, an alumina sol, a strontium oxide sol, or a barium oxide sol. Thus, a titanium dioxide/alumina mixed sol (Ti/Al sol), a titanium dioxide/strontium oxide mixed sol (Ti/Sr sol), and a titanium dioxide/barium oxide mixed sol (Ti/Ba sol) were obtained. In the preparation of the mixed sols, the photocatalyst sol and the metal oxide sol were weighed, and mixed sols with varied formulation proportions of the photocatalyst and the metal oxide were prepared by varying the weighed amount of the photocatalyst sol to be mixed and the weighed amount of the metal oxide sol to be mixed. Specifically, mixed sols with the formulation ratio defined as a/(a+b) (the "a/(a+b)" will be hereinafter referred to as "formulation ratio") being varied were prepared, wherein a represents the weight of the metal oxide in each mixed sol and b represents the weight of the photocatalyst in each mixed sol.

Besides the above steps (i) to (iii), particles of alumina or the like, which have been regulated to a desired particle size, may be added to and dispersed in the photocatalyst sol to prepare a Ti/Al sol or the like. Further, the photocatalyst particles, which have been regulated to a desired particle size, and particles of alumina or the like may be alternately or simultaneously dispersed in the solvent to prepare a Ti/Al sol or the like with the photocatalyst particles and alumina or the like being originally dispersed therein.

Next, photocatalytic materials using the photocatalyst formulations (Ti/Al mixed sol, Ti/Sr mixed sol, and Ti/Ba mixed sol) thus prepared will be described. In the present example (first example), tiles were used as the photocatalytic material and produced as follows.

An unglazed tile was provided as a substrate. Each of the mixed sols having a specified concentration was spray-coated onto the surface of the tile. In the spray coating, the coverage, that is, the spray time, was regulated so that the thickness of the photocatalyst formulation layer, on the surface of the tile, after firing was about 0.85 microns. The tiles, which had been spray-coated with the mixed sols were then fired at a temperature determined by taking into consideration the melt temperature of silica or the like formulated for fixing the photocatalyst and the melting temperature of titanium dioxide and each metal oxide (about 800° C. in this example) for about 60 minutes. Thus, final photocatalytic materials comprising a surface layer containing the sol suspension (photocatalyst and alumina or the like) provided on the surface of a substrate (tile) were obtained. These photocatalytic materials were evaluated as follows. The evaluation was carried out in terms of the effectiveness of reducing nitrogen oxides, ammonia, and sulfur dioxide as harmful materials in the air or in the room. The evaluation test will be briefly described. At the outset, an evaluation test on conversion on nitrogen oxides will be described. It should be noted that, for the spray coating of the mixed sol, spin coating, dip coating and the like may be, of course, adopted instead of the spray coating.

(1-1) Evaluation Test 1: Effect of Alumina and the Like on Conversion of Nitrogen Oxides For comparison with products according to the examples of the present invention, a photocatalytic tile using a photocatalyst formulation, containing no alumina, strontium oxide, and barium oxide, with only titanium dioxide being formulated therein (a comparative tile) and photocatalytic tiles according to the examples of the present invention (example tiles) were prepared as follows. The comparative tile was prepared by spray-coating a photocatalyst sol having a titanium dioxide content of 7.5% by weight onto the surface of the tile and firing the coated tile under the above conditions (about 800° C.; for 60 min). In the spray coating, the coating time and the like were determined so that the weight of titanium dioxide on the surface of the tile after firing was about $3.3 \times 10^{-4}$ g/cm$^2$ (thickness of titanium dioxide layer: about 0.85 microns). The example tiles were the following Ti/Al tile, Ti/Sr tile, and Ti/Ba tile.

The Ti/Al tile was prepared by spray-coating a Ti/Al sol having a titanium dioxide content of 7.5% by weight and an alumina formulation ratio regulated to 1/11 in terms of the formulation ratio a/(a+b) (a Ti/Al sol with the weight ratio of titanium dioxide to alumina being 0.1) in the same manner as described above in connection with the comparative tile and firing the coated tile in the same manner as described above in connection with the comparative tile. The Ti/Sr tile was prepared by spray-coating a Ti/Sr sol comprising titanium dioxide and strontium oxide in the same formulation ratio as described above in connection with the Ti/Al tile and firing the coated tile in the same manner as described above in connection with the comparative tile. The Ti/Ba tile was also prepared in the same manner as described above. The comparative tile has only titanium dioxide on the surface of the tile and exhibits catalytic activity as a standard for comparison. Therefore, comparison of the comparative tile with each of the example tiles shows whether or not an improvement in catalytic activity has been attained by formulating the metal oxide and the degree of the improvement. The comparative tile comprises a tile having thereon a surface layer consisting of titanium dioxide alone. On the other hand, each of the example tiles comprises a tile having thereon a surface layer formed of a formulation of titanium dioxide and alumina or strontium oxide or barium oxide.

The comparative tile and the example tiles were tested as follows. In the test, a sample piece having a size of 10 cm square for each of the comparative tile and the example tiles was used. For each of the sample pieces, the effect of converting nitrogen oxides was measured in a testing apparatus shown in FIG. 4. In this testing apparatus, a cylinder 12 filled with nitrogen monoxide gas having a constant concentration is provided upstream of a hermetically sealed glass cell 10 in which the sample piece is placed. NO gas from the cylinder 12 is mixed with air, which has been sucked through an air pump 14 and adjusted to desired humidity by means of a humidity controller 15, through a flow rate control valve 16. The NO gas (test gas) having a predetermined concentration (about 0.95 ppm) is flowed at a constant rate (1 liter/min) through the flow control valve 16 into the glass cell 10. A concentration meter (NOx sensor) 18 for measuring the concentration of nitrogen oxides in the gas, which has been passed through the cell, is provided downstream of the glass cell 10. The NOx sensor 18 is constructed so that the concentration of NO and the concentration of nitrogen dioxide ($NO_2$ concentration) in the gas are measured at any time, the measured value of the NO concentration is added to the measured value of the $NO_2$ concentration, and the sum of both the concentrations is output as the nitrogen oxide concentration (NOx concentration). The testing apparatus is provided with a lamp 20 for applying ultraviolet light (wavelength 300 to 400 nm) into the glass cell 10. The lamp 20 is lighted with control so that the intensity of the ultraviolet light on the sample piece is 1.2 mW/cm$^2$. The sample piece was placed in the glass cell 10 of the testing apparatus, that is, placed under an environment which undergoes ultraviolet irradiation. For each of the comparative tile and the example tiles, the $NO_2$ concentration and the NOx concentration were plotted against the elapsed time from the initiation of the flow of the test gas. The results are shown in FIG. 5. The lamp 20 was not lighted until the NOx concentration (NO concentration) on the outlet side has become stable after the initiation of the flow of the test gas.

In the evaluation test 1, if a reaction for oxidizing nitrogen monoxide does not take place, for example, if the glass cell 10 is placed in a dark room so as not to produce active oxygen species by titanium dioxide in the surface layer and to cause a catalytic reaction, the test gas is conveyed into the NOx sensor 18 without reacting. Therefore, in this case, the output of the NOx sensor 18 is identical to the test gas concentration (CNO/in) for the NO concentration (CNO/out), the $NO_2$ concentration (CNO$_2$/out) is zero with the NOx concentration (CNOx/out) being CNO/out, that is, identical to CNO/in. However, when NO is oxidized by a catalytic reaction based on active oxygen species produced by titanium dioxide in the surface layer, the NO concentration is reduced from CNO/in by an amount of NO which has been oxidized. Further, when $NO_2$ produced by the oxidation of NO leaves the surface of the tile, the $NO_2$ concentration is increased by the amount of $NO_2$ leaving the surface. The degree of conversion of NOx is determined from the relationship between the reduction in NO and the increase in $NO_2$.

As shown in FIG. 5, for the comparative tile, the NOx concentration rapidly lowers upon the initiation of the test. After about 5 minutes has elapsed from the initiation of the test, the NOx concentration increased and approached the test gas concentration. Further, for the comparative tile, the $NO_2$ concentration gradually increased after the initiation of the test and, 30 min after the initiation of the test, reached about 0.18 ppm. The NOx concentration and the $NO_2$ concentration were increased in substantially the same fashion. These indicate that, for the comparative tile, the photocatalyst reaction by titanium dioxide in the surface layer proceeds to oxidize NO, resulting in reduced NO concentration. In this case, an increase in $NO_2$ concentration inhibits the reduction in the total NOx. Therefore, for the comparative tile, since $NO_2$ leaves the surface of the tile, further oxidation of $NO_2$ on the surface of the tile is not significant. The NOx concentration 30 min after the initiation of the test was about 0.66 ppm, and, hence, the reduction in NOx for the comparative tile was about 30.5% ((0.95−0.66)/0.95).

On the other hand, for all the example tiles of Ti/Al tile, Ti/Sr tile, and Ti/Ba tile, as with the comparative tile, the NOx concentration rapidly lowered upon the initiation of the test. Thereafter, the NOx concentration was maintained at a value slightly higher than the minimum concentration. Further, for the example tiles, the $NO_2$ concentration was not significantly increased after the initiation of the test and, even 30 min after the initiation of the test, was as low as about 0.05 ppm. From these facts, it can be first said that, for the example tiles, the photocatalytic reaction by titanium dioxide in the surface layer proceeds to oxidize NO, resulting in lowered NO concentration. Further, $NO_2$ is bonded to alumina, strontium oxide, and barium oxide and hence is not likely to leave the surface of the tile, and further oxidation of $NO_2$ with titanium dioxide actively proceeds, so that the $NO_2$ concentration is not increased. For this reason, for the example tiles, NOx could be reduced with very high efficiency. The NOx concentration 30 min after the initiation of the test was about 0.45 ppm, and, hence, the reduction in NOx in the example tiles was about 52.6% ((0.95−0.45)/0.95), that is, was substantially twice that of the comparative tile. For the example tiles, the above test was continued. As a result, it was found that the high reduction in NOx was maintained. The test was finished 12 hr after the initiation of the test. The surface of the example tiles was washed with water, and the wash liquid was analyzed for materials contained therein. As a result, the presence of nitric acid was confirmed.

Further, all the example tiles had an excellent surface without unacceptable irregularities. A sliding abrasion test was carried out using a plastic eraser according to JIS A 6808. As a result, for all the example tiles, after reciprocating sliding about 40 times, the surface layer neither deteriorated nor separated, indicating that the abrasion resistance was excellent. This means that the photocatalyst formulation produced by mixing sols as described above can be applied not only to fired paints and glazes but also to firing, printing, binders and the like. Further, the photocatalyst formulation and the photocatalytic material, which can highly reduce nitrogen oxides by virtue of the photocatalytic activity, can be easily produced by mixing sols as described above.

(1-2) Evaluation Test 1: Effect of Alumina and the Like on Reduction in Ammonia

Also for ammonia, the reduction by the comparative tile, the Ti/Al tile, and the Ti/Sr tile was investigated using the same apparatus and method as described above in connection with the nitrogen oxides. In this case, the test gas flowed into the glass cell 10 was about 4 ppm of ammonia gas. The concentration of ammonia in the gas, which has been passed through the cell, was measured with a concentration meter (a gas detector tube) provided downstream of the cell. For the comparative tile and the example tiles (Ti/Al tile and Ti/Sr tile), the ammonia concentration was plotted against the elapsed time from the initiation of the flow of the test gas. The results are shown in FIG. 6.

As shown in FIG. 6, for all the comparative tile and the example tiles, the ammonia concentration lowered upon the initiation of the test. With the elapse of time, the example tiles provided lower ammonia concentration than the comparative tile. About 10 min after the initiation of the test, the tiles provided respective substantially constant ammonia concentrations. Specifically, the ammonia concentration was about 3.5 ppm for the comparative tile, about 2.5 ppm for the Ti/Al tile, and about 2.6 ppm for the Ti/Sr tile. The reduction in ammonia was about 12.5% ((4−3.5)/4) for the comparative tile, about 37.5% ((4−2.5)/4) for the Ti/Al tile, and about 35% ((4−2.6)/4) for Ti/Sr tile. From these facts, it is apparent that, for the comparative tile, the photocatalytic reaction by titanium dioxide in the surface layer proceeds to develop chemical conversion of ammonia to NO, $NO_2$ and the like, reducing ammonia to some extent, whereas, for both the example tiles, Ti/Al tile and Ti/Sr tile, the reduction in ammonia was higher than that for the comparative tile. The reason for this is believed to be as follows.

If the reaction for converting ammonia to other materials (chemical conversion) does not take place, the test gas flows into the gas detector tube without causing any reaction. In this case, the measured value of the ammonia concentration is identical to that in the test gas. However, when ammonia is catalytically reacted based on active oxygen species produced by titanium dioxide in the surface layer and converted to other materials, the ammonia concentration is reduced from the concentration of ammonia in the test gas by an amount of ammonia which has been converted. For this reason, for all the comparative tile and the example tiles, the ammonia concentration lowered immediately after the initiation of the test. In this case, since ammonia is catalytically reacted based on active oxygen species, nitrogen constituting ammonia is oxidized to give NO and $NO_2$ as intermediates. It is considered that, as described above, NO is oxidized to $NO_2$ by the active oxygen species and $NO_2$ is further oxidized by the active oxygen species and consequently chemically converted to nitric acid, resulting in enhanced chemical conversion of ammonia to NO and $NO_2$ through the catalytic reaction of ammonia based on the active oxygen species, which can enhance the reduction in ammonia.

The example tiles are different from the comparative tile in that, as described above, alumina or strontium oxide, which bonds to $NO_2$ to prevent $NO_2$ from leaving the surface of the tile, has been formulated. For the comparative tile, $NO_2$ produced from ammonia leaves the surface of the tile, and, for this reason, further oxidation of $NO_2$ by the active oxygen species to chemically convert $NO_2$ to nitric acid does not significantly proceed. By contrast, for the example tiles, $NO_2$ produced from ammonia does not leave the surface of the tiles, and this promotes further oxidation of $NO_2$ to nitric acid by the active oxygen species. For this reason, for the example tiles, as described above, the reduction in ammonia was enhanced. It is considered that this has created better reduction in ammonia by the example tiles relative to that by the comparative tile.

(1-3) Evaluation Test 1: Effect of Alumina and the Like on Reduction in Sulfur Dioxide Also for sulfur dioxide, the reduction by the comparative tile and the Ti/Al tile was investigated using the same apparatus and method as described above in connection with the nitrogen oxides. In this case, the test gas flowing into the glass cell 10 was about 10 ppm sulfur dioxide gas. The concentration of sulfur dioxide in the gas, which passed through the cell, was measured with a concentration meter (a gas detector tube) provided downstream of the cell. For the comparative tile and the example tile (Ti/Al tile), the sulfur dioxide concentration was plotted against the elapsed time from the initiation of the flow of the test gas. The results are shown in FIG. 7.

As shown in FIG. 7, for both the comparative tile and the example tile, the sulfur dioxide concentration lowered upon the initiation of the test. With the elapse of the time, the example tile provided lower sulfur dioxide concentration than the comparative tile. About 30 min after the initiation of the test, the sulfur dioxide concentration was about 7.7 ppm for the comparative tile and about 2.7 ppm for the Ti/Al tile. Thus, the reduction in sulfur dioxide was about 23% ((10−7.7)/10) for the comparative tile and about 73% ((10−2.7)/10) for the Ti/Al tile. From these facts, it is apparent that, for the comparative tile, the photocatalytic reaction by titanium dioxide in the surface layer proceeds to develop chemical conversion of sulfur dioxide, sulfuric acid, sulfurous acid or the like, reducing sulfur dioxide to some extent, whereas, for the Ti/Al tile (example tile), the reduction in sulfur dioxide was higher than that for the comparative tile. The reason for this is believed to be as follows.

The reason why, for both the comparative tile and the example tile, the sulfur dioxide concentration is lowered is that, as with the case of nitrogen monoxide and ammonia, sulfur dioxide is catalytically reacted based on active oxygen species produced by titanium dioxide in the surface layer and converted to sulfuric acid or sulfurous acid. In this case, the sulfur dioxide concentration is reduced from the concentration of sulfur dioxide in the test gas by an amount of sulfur dioxide which has been converted. Sulfur dioxide as the reactant is an acid gas. Therefore, as explained with reference to FIG. 2, sulfur dioxide, which is the reactant in this evaluation test, is chemically bonded and adsorbed onto alumina as a basic metal oxide. For this reason, for the comparative tile free from alumina, sulfur dioxide is oxidized by the active oxygen species and chemically converted to sulfuric acid or sulfurous acid in such a state that it is not adsorbed onto the surface of the tile. Therefore, this reaction proceeds relatively mildly. In contrast, for the example tile, sulfur dioxide is oxidized by the active oxygen species and converted to sulfuric acid or sulfurous acid in such as state it is adsorbed onto the surface of the tile. This promotes the reaction. For this reason, for the example tile, as described above, the reduction in sulfur dioxide was enhanced. It is believed that this has enhanced the reduction in sulfur dioxide by the example tile relative to that by the comparative tile.

Next, the relationship between the proportion of alumina or the like, which has been formulated together with the photocatalyst, and the effect of reducing nitrogen oxides was evaluated by the following two methods. This evaluation was carried out by taking alumina as an example.

(2) Evaluation Test 2: Effect of Proportion of Alumina on Reduction in Nitrogen Oxides—Part 1

At the outset, for comparison with products according to the examples of the present invention, a comparative tile and photocatalytic tiles of example (example tiles), which were similar to those used in the evaluation test 1, were provided as follows. The comparative tile was prepared by spray-coating a photocatalyst sol having a titanium dioxide content of 7.5% by weight onto the surface of the tile and firing the coated tile under the above conditions (about 800° C. for 60 min). In the spray coating, the coating time and the like were determined so that the weight of titanium dioxide on the surface of the tile after firing was about $3.3 \times 10^{-4}$ g/cm$^2$ (thickness of titanium dioxide layer: about 0.85 microns). The example tile was the following Ti/Al tile.

The Ti/Al tile was prepared by spray-coating a photocatalyst sol having a titanium dioxide content of 7.5% by weight, which was the same as that of the comparative tile, and an alumina formulation ratio regulated to 0.0001 to 0.8 in terms of the formulation ratio $a/(a+b)$ and firing the coated tile in the same manner as described above in connection with the comparative tile. Specifically, various Ti/Al tiles were fired wherein the weight of titanium dioxide on the surface of the tile after firing was identical to that in the comparative tile and about $3.3 \times 10^{-4}$ g/cm$^2$ while the weight of alumina on the surface of the tile after firing was varied. These Ti/Al tiles were used as example tiles in the evaluation test 2. When the formulation ratio $a/(a+b)$ is 0.01, $a=b/99$. Therefore, in this case, the weight of alumina on the surface of the tile after firing is about $3.3 \times 10^{-6}$ g/cm$^2$. On the other hand, when the formulation ratio $a/(a+b)$ is 0.5, $a=b$. Therefore, in this case, the weight of alumina on the surface of the tile after firing is about $3.3 \times 10^{-4}$ g/cm$^2$. Also in this evaluation test 2, since the comparative tile exhibits standard catalytic activity, comparison of the comparative tile with the Ti/Al tiles with the amount of alumina formulated being varied reveals the effect of the amount of alumina formulated on an improvement in catalytic activity where the amount of the photocatalyst is identical.

Figure 8:
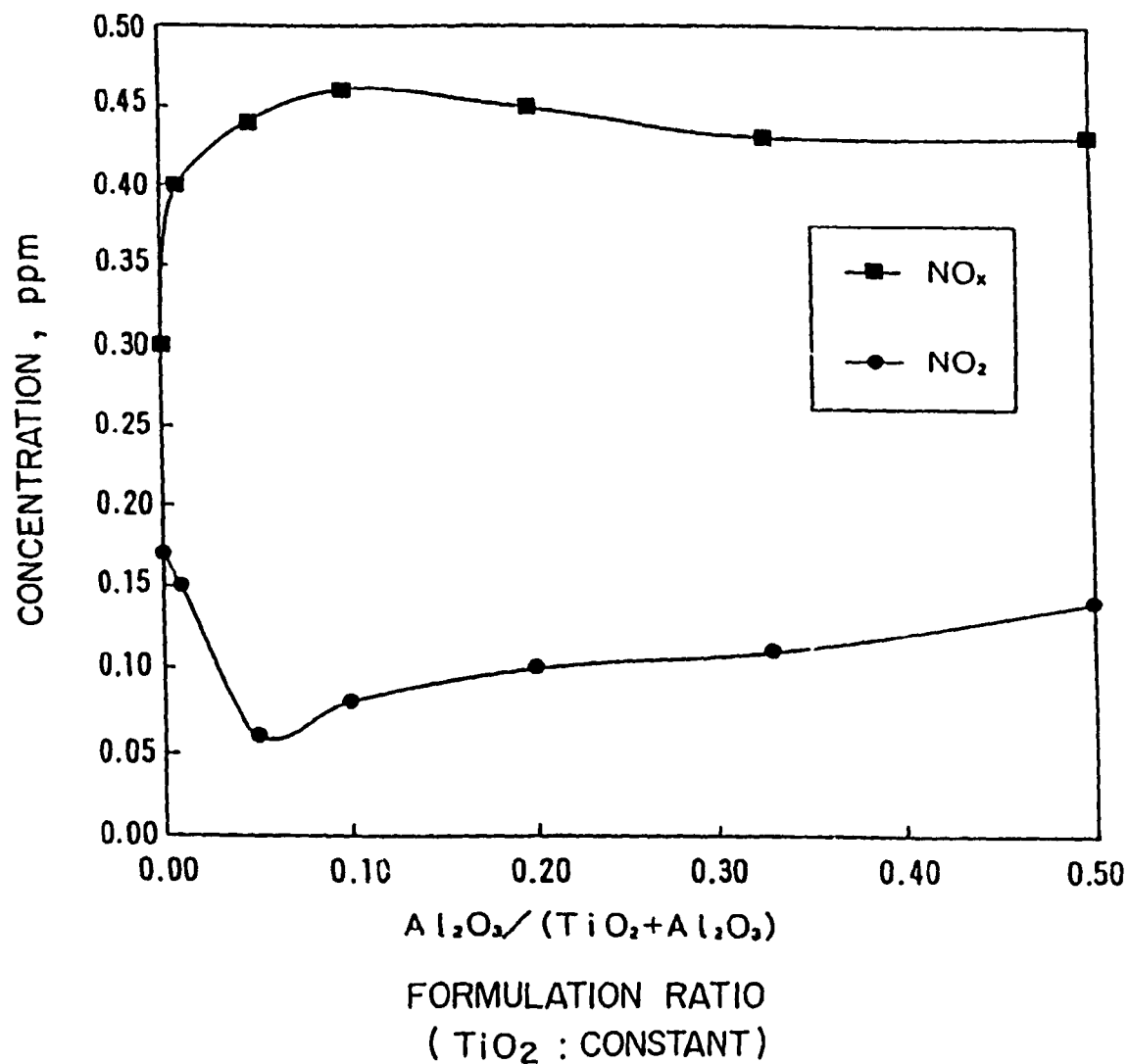
FIG. 8 is a graph showing the results of a test on conversion of nitrogen oxides by example tiles according to the first example of the present invention.

In this evaluation test 2, the same testing apparatus as used in the evaluation test 1 was used, and, 30 min after the initiation of the test, that is, at the time of initiation of the flow of a test gas having a predetermined concentration (about 0.95 ppm) at a constant rate and the initiation of lighting of the lamp 20, the NO$_2$ concentration and the NOx concentration were measured for the comparative tile and the example tiles. For each of the tiles, the amount of NOx removed, determined by subtracting the measured value of the NOx concentration from the NO concentration of the test gas, and the measured value of the NO$_2$ concentration were plotted. The results are shown in FIG. 8. For the comparative tile, since alumina had not been formulated at all, the formulation ratio $a/(a+b)$ was zero.

In FIG. 8, the results on the comparative tile ($a/(a+b)=0$) are plotted on the Y axis in the graph. As is apparent from FIG. 8, for the comparative tile, the NO$_2$ concentration was about 0.17 ppm, while the amount of NOx removed was about 0.3 ppm. Although the NOx concentration was lowered to a value lower than the concentration of NOx in the test gas, the presence of NO$_2$ not contained in the test gas is detected. This is because, as described above, the photocatalytic reaction by titanium dioxide in the surface layer proceeds and NO$_2$ leaves the surface of the tile.

In contrast, for the Ti/Al tile of which the formulation ratio $a/(a+b)$ was represented on the X coordinate axis, when the amount of alumina formulated was small, that is, the formulation ratio $a/(a+b)$ was 0.01, the NO$_2$ concentration was about 0.15 ppm, while the amount of NOx removed was about 0.4 ppm. For the Ti/Al tile wherein the amount of alumina formulated was identical to that of titanium dioxide, that is, the formulation ratio $a/(a+b)$ was 0.5, the NO$_2$ concentration was about 0.14 ppm, while the amount of NOx removed was about 0.43 ppm. For the Ti/Al tile wherein the formulation ratio $a/(a+b)$ was 0.05 to 0.2, the NO$_2$ concentration was about 0.06 to 0.13 ppm, while the amount of NOx removed was about 0.44 to 0.46 ppm. Thus, as compared with the comparative tile, these Ti/Al tiles provided much lower NO$_2$ concentration and much larger amount of NOx removed. Also for the Ti/Al tile wherein the formulation ratio $a/(a+b)$ was 0.0001, the results (NO$_2$ concentration is about 0.155 ppm; amount of NOx removed is about 0.36 ppm) were similar to the Ti/Al tile wherein the formulation ratio $a/(a+b)$ was 0.01. The results on this Ti/Al tile were not indicated in this drawing because the plot on the X coordinate axis for the Ti/Al tile was close to zero.

As is apparent from these facts, when the formulation ratio $a/(a+b)$ is in the range of 0.0001 to 0.5, the formulation of alumina can prevent NO$_2$ from leaving the surface of the tile, realizing higher NO$_2$ reduction and, in its turn, higher NOx reduction than for the comparative tile. A formulation ratio $a/(a+b)$ in the range of 0.05 to 0.2 is particularly preferred because much higher NOx reduction than the comparative tile can be attained. In addition, even when the amount of alumina formulated is very small, that is, even when the formulation ratio $a/(a+b)$ is 0.0001, high NOx reduction can be provided.

Further, the Ti/Al tiles with the formulation ratio $a/(a+b)$ being varied also had a good surface and possessed excellent abrasion resistance.

(3) Evaluation Test 3: Effect of Proportion of Alumina on Reduction in Nitrogen Oxides—Part 2

In this evaluation test 3, the total amount of titanium dioxide as the photocatalyst and alumina (the sum of the amounts of both the materials formulated) was constant with the proportion of titanium dioxide to alumina being varied to examine the effect of reducing nitrogen oxides.

At the outset, for comparison with products according to the examples of the present invention, a comparative tile and photocatalytic tiles of examples (example tiles), which were similar to those used in the evaluation test 1, were provided as follows. The comparative tile was identical to the comparative tile used in the evaluation test 2, and the weight of titanium dioxide on the surface of the tile after firing was about $3.3 \times 10^{-4}$ g/cm$^2$. A simple tile (a tile not having photocatalytic activity) using a formulation containing only alumina without any photocatalyst was also provided wherein the weight of alumina on the surface of the tile was about $3.3 \times 10^{-4}$ g/cm$^2$. The following Ti/Al tiles were provided as the example tiles.

The Ti/Al tiles were prepared by spray-coating a Ti/Al sol with the total amount of titanium dioxide and alumina being the same as that in the comparative tile, that is, 7.5% by weight, and having an alumina formulation ratio regulated to 0.05 to 0.95 in terms of the formulation ratio $a/(a+b)$ in the same manner as described above in connection with the comparative tile and firing the coated tiles in the same manner as described above in connection with the comparative tile. Specifically, various Ti/Al tiles were fired wherein the weight of titanium dioxide on the surface of the tile after firing was reduced from about $3.3 \times 10^{-4}$ g/cm$^2$ with increasing the weight of alumina. These Ti/Al tiles were used as the example tiles in the evaluation test 3. When the formulation ratio $a/(a+b)$ is 0.05, $a+b$ corresponds to the above $3.3 \times 10^{-4}$ g/cm$^2$. Therefore, the weight a of alumina on the surface of the tile after firing is about $1.65 \times 10^{-5}$ g/cm$^2$, while the weight b of titanium dioxide is about $3.135 \times 10^{-4}$ g/cm$^2$. On the other hand, when the formulation ratio a/(a+b) is 0.95, the weight a of alumina is about $3.135 \times 10^{-4}$ g/cm$^2$, while the weight b of titanium dioxide is about $1.65 \times 10^{-5}$ g/cm$^2$. Also in this evaluation test 3, since the comparative tile exhibits standard catalytic activity, comparison of the comparative tile with the Ti/Al tiles with the amounts of titanium dioxide and alumina formulated being varied reveals the effect of the amounts of titanium dioxide and alumina formulated on an improvement in catalytic activity.

Figure 9:
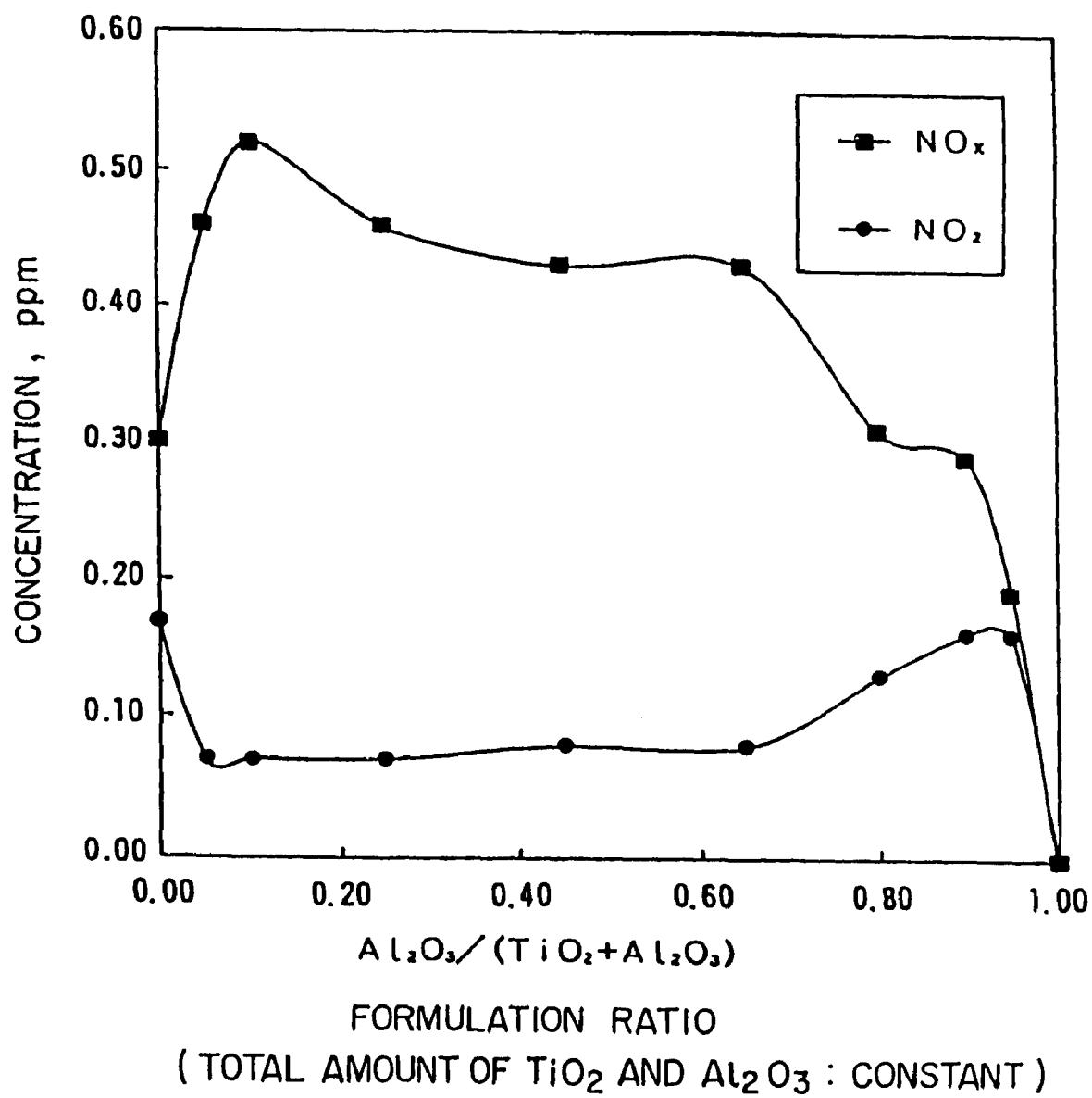
FIG. 9 is a graph showing the results of a test on conversion of nitrogen oxides by example tiles according to the first example of the present invention.

In this evaluation test 3, the same testing apparatus as used in the evaluation test 1 was used, and the NO$_2$ concentration and the amount of NOx removed were plotted in the same manner as the evaluation test 2. The results are shown in FIG. 9. For the comparative tile, since alumina had not been formulated at all, the formulation ratio a/(a+b) was zero. For the tile which does not exhibit any photocatalytic activity, since titanium dioxide had not been formulated at all, the formulation ratio a/(a+b) was 1.

In FIG. 9, the results on the comparative tile (a/(a+b)=0) were plotted on the Y axis in the graph. As is apparent from FIG. 9, for the comparative tile, the NO$_2$ concentration was about 0.17 ppm, while the amount of NOx removed was about 0.3 ppm. The reason why the presence of NO$_2$ not contained in the test gas was detected despite lowering of the NOx concentration to a value lower than the concentration of NOx in the test gas, is as described above in connection with the evaluation test 2. For the simple tile which does not exhibit any photocatalytic activity, the results were plotted on the X coordinate axis of the graph. As is apparent from the graph, both the NO$_2$ concentration and the amount of the NOx removed were, of course, zero.

In contrast, for the Ti/Al tile of which the formulation ratio a/(a+b) is indicated on the X coordinate axis of the graph, when the amount of alumina formulated was small, that is, the formulation ratio a/(a+b) was 0.05, the NO$_2$ concentration was about 0.07 ppm, while the amount of NOx removed was about 0.46 ppm. For the Ti/Al tile wherein the amount of alumina formulated was larger than that of titanium dioxide formulated and the formulation ratio a/(a+b) was 0.8, the NO$_2$ concentration was about 0.13 ppm, while the amount of NOx removed was about 0.32 ppm. For the Ti/Al tile wherein the formulation ratio a/(a+b) was 0.05 to 0.65, the NO$_2$ concentration was about 0.07 to 0.09 ppm, while the amount of NOx removed was about 0.43 to 0.52 ppm. Thus, as compared with the comparative tile, these Ti/Al tiles provided much lower NO$_2$ concentration and much larger amount of NOx removed. For the Ti/Al tiles wherein the amount of alumina formulated is much larger than that of titanium dioxide formulated and the formulation ratio a/(a+b) is 0.9 or more, the NO$_2$ concentration and the amount of NOx removed were not more than those for the comparative tile.

As is apparent from the above facts, when the formulation ratio a/(a+b) is in the range of 0.0001 to 0.8 with the total amount of titanium dioxide and alumina being constant, the formulation of alumina can prevent NO$_2$ from leaving from the surface of the tile, realizing higher NO$_2$ reduction and, in its turn, higher NOx reduction than for the comparative tile. A formulation ratio a/(a+b) in the range of 0.05 to 0.6 is particularly preferred because much higher NOx reduction than for the comparative tile can be attained. When the formulation ratio a/(a+b) is less than 0.0001 or exceeds 0.8, NOx reduction similar to that in the comparative tile can be provided. However, in particular, when the formulation ratio a/(a+b) is not less than 0.9, the amount of titanium dioxide as the photocatalyst is so small that titanium dioxide particles are surrounded by alumina particles without leaving any space. It is expected that this prevents light from reaching the titanium dioxide, resulting in lowered photocatalytic activity.

Further, the Ti/Al tiles with the formulation ratio a/(a+b) being varied also had a good surface and possessed excellent abrasion resistance.

In the first example, anatase form of titanium dioxide was used as the photocatalyst, and alumina as an amphoteric metal oxide and strontium oxide and barium oxide as basic metal oxides were used as the metal oxide to be formulated together with the photocatalyst. The NOx reduction, however, can be, of course, provided by other photocatalysts in combination with other metal oxides. For example, regarding the titanium dioxide as the photocatalyst, the crystal form may be rutile or brookite. Further, use of photocatalysts, such as ZnO, V$_2$O$_5$, WO$_3$, SnO$_2$, SrTiO$_3$, Bi$_2$O$_3$, and Fe$_2$O$_3$ can also provide the effect of reducing NOx. Furthermore, the effect of reducing NOx can be provided by using zinc oxide and tin oxide (as amphoteric metal oxides) and magnesium oxide, calcium oxide, rubidium oxide, sodium oxide, and potassium oxide (as basic metal oxides) instead of alumina, strontium oxide, and barium oxide as the metal oxide. When the gas to be reduced is a basic gas, phosphorus oxide (acidic metal oxide) may be used in addition to the amphoteric metal oxides.

Next, the second example will be described. In this second example, the procedure for forming the surface layer of a photocatalyst formulation, comprising a photocatalyst, such as titanium dioxide, and a specific metal oxide, such as alumina, provided on the surface of the tile is different from that in the first example. In the second example, a substrate on which a surface layer is to be formed is first provided. Substrates usable herein include ceramics, resins, metals, glasses, earthenware, woods, calcium silicate boards, concrete boards, cement boards, cement extruded boards, plaster boards, and autoclave light-weight concrete boards. Where the substrate is one used in building structures, such as buildings, houses, and bridges, and noise barriers of roads, environmental pollutants, such as nitrogen oxides, can be advantageously converted on these building structures to purify the air.

A binder layer is then formed on the surface of the substrate. For the formation of the binder layer, a binder material having a softening temperature below a temperature at which the quality of the substrate is changed, is selected. The binder layer is formed using the selected binder material by a suitable method compatible with the properties of the binder. For example, when the substrate is a tile, an enamel, or a pottery, a glaze layer or a print layer for conducting coloring or the like on the surface may be as such utilized as the binder layer. After the formation of the binder, a photocatalyst formulation layer, which later serves as the surface layer, is formed by coating or printing a sol, such as a Ti/Al sol in the first example, on the surface of the binder layer, or by applying a particle mixture, of titanium dioxide particles with alumina particles, obtained by removing the solvent from the sol. Alternatively, a photocatalyst formulation layer may be formed on a separately formed binder layer followed by mounting of the binder layer on the surface of the substrate. What is required here is that the photocatalyst formulation layer is formed on the binder layer in such a manner that these two layers are not separated from each other upon subsequent firing.

Thereafter, when the binder layer is formed of a layer of a glaze, the heat treatment is carried out under an environment having a temperature 30 to 300° C. above the softening temperature of the binder material (glaze) and below a temperature at which the quality of the substrate is changed. The heat treatment permits the binder material (glaze) to be melted and solidified. Consequently, the binder layer is strongly fixed onto the surface of the tile, and, at the same time, a surface layer constituted by the photocatalyst formulation layer is formed. In this case, at the boundary between the surface layer and the binder layer, photocatalyst formulation particles (titanium dioxide particles and alumina particles) in the surface layer settle in the binder layer in the course of the melting of the binder material. The particles are embedded and held in the binder layer, and this permits the surface layer to be strongly fixed onto the binder layer. Further, in the photocatalyst formulation layer, adjacent particles are bonded to one another through intermolecular force among particles and by sintering upon firing to form the surface layer. In this surface layer, titanium dioxide particles and alumina particles are exposed on the surface thereof. This permits the surface layer to be strongly fixed onto the binder layer and, at the same time, permits titanium dioxide particles and alumina particles to effectively come into contact with the outside air. Therefore, in the process according to the second example, building structure materials and the like can be easily produced which have a surface layer capable of inducing a photocatalytic reaction with high efficiency.

In this case, the heating temperature at least 30° C. above the softening temperature of the binder material is advantageous in that an unnecessary amount of time is not required for softening the binder material and there is no adverse effect on settlement and holding of the titanium dioxide and alumina particles. Further, since the heating temperature is not higher than 300° C. above the temperature at which the binder undergoes a change in quality, rapid melting of the binder material can be advantageously avoided, preventing problems such as excessive settlement of titanium dioxide and alumina particles, creation of irregularities on the surface, and creation of pinholes. The heating temperature is preferably 50 to 150° C. above the softening temperature of the binder material.

Also in the second example, regarding the titanium dioxide as the photocatalyst, the crystal form may also be rutile or brookite. Further, $ZnO$, $V_2O_5$, $WO_3$, $SnO_2$, $SrTiO_3$, $Bi_2O_3$, and $Fe_2O_3$ can also be used as the photocatalyst. When the gas to be reduced is an acid gas, such as NOx, it is possible to use zinc oxide and tin oxide (as amphoteric metal oxides), magnesium oxide, calcium oxide, rubidium oxide, sodium oxide, and potassium oxide (as basic metal oxides) instead of alumina as the metal oxide. When the gas to be reduced is a basic gas, phosphorus oxide (acidic metal oxide) may be used in addition to the amphoteric metal oxides.

Next, other examples will be described. In the first and second examples, the photocatalyst and the specific compound described above hold a reactant (for example, NO) or an intermediate (for example, $NO_2$) within the catalytic reaction system to ensure the opportunity for the reactant to undergo the catalytic reaction or the opportunity for the intermediate to further undergo the catalytic reaction, whereby the effect of reducing harmful materials, such as NOx, is attained. In the following examples, besides the specific compounds described above, other compounds are added to further improve the effect of reducing NOx or attain effects which have not been described above.

The third example will be described. The third example demonstrates a photocatalytic material that can provide an efficient catalytic reaction and, at the same time, has antimicrobial activity created upon production of active oxygen species by the photocatalyst. In producing the photocatalytic material, two sols are provided. One of the sols is a Ti/Al sol with alumina, together with titanium dioxide, being formulated therein at the formulation ratio, described above, which can provide an efficient catalytic reaction. The other sol is a third sol with particles of copper (Cu), copper oxide, silver (Ag), or silver oxide being dispersed therein. Next, the Ti/Al sol is coated on the surface of a tile, and the coating is fired to form a Ti/Al layer. Thereafter, the third sol is coated on the surface of the Ti/Al layer provided on the surface of the tile, and the third sol component is fixed onto the surface of the Ti/Al layer by photoreduction or the like. This tile is a tile of the third example. The tile of the third example has a surface layer with titanium dioxide as the photocatalyst, together with alumina, being fixed thereon, and copper or other particles are fixed onto the surface layer. In the preparation of the third sol, the coverage is regulated so that the photocatalyst is satisfactorily exposed to light. For example, a weight of copper of about 0.8 to 2.0 $\mu g/cm^2$ after firing suffices for satisfactory results. The tile of the third example and the comparative tile used in the above evaluation tests were evaluated for the following antimicrobial activity. The antimicrobial activity was evaluated based on whether or not the tile has the effect of killing *Escherichia coli* (*Escherichia coli* w3110 strain).

Figure 10:
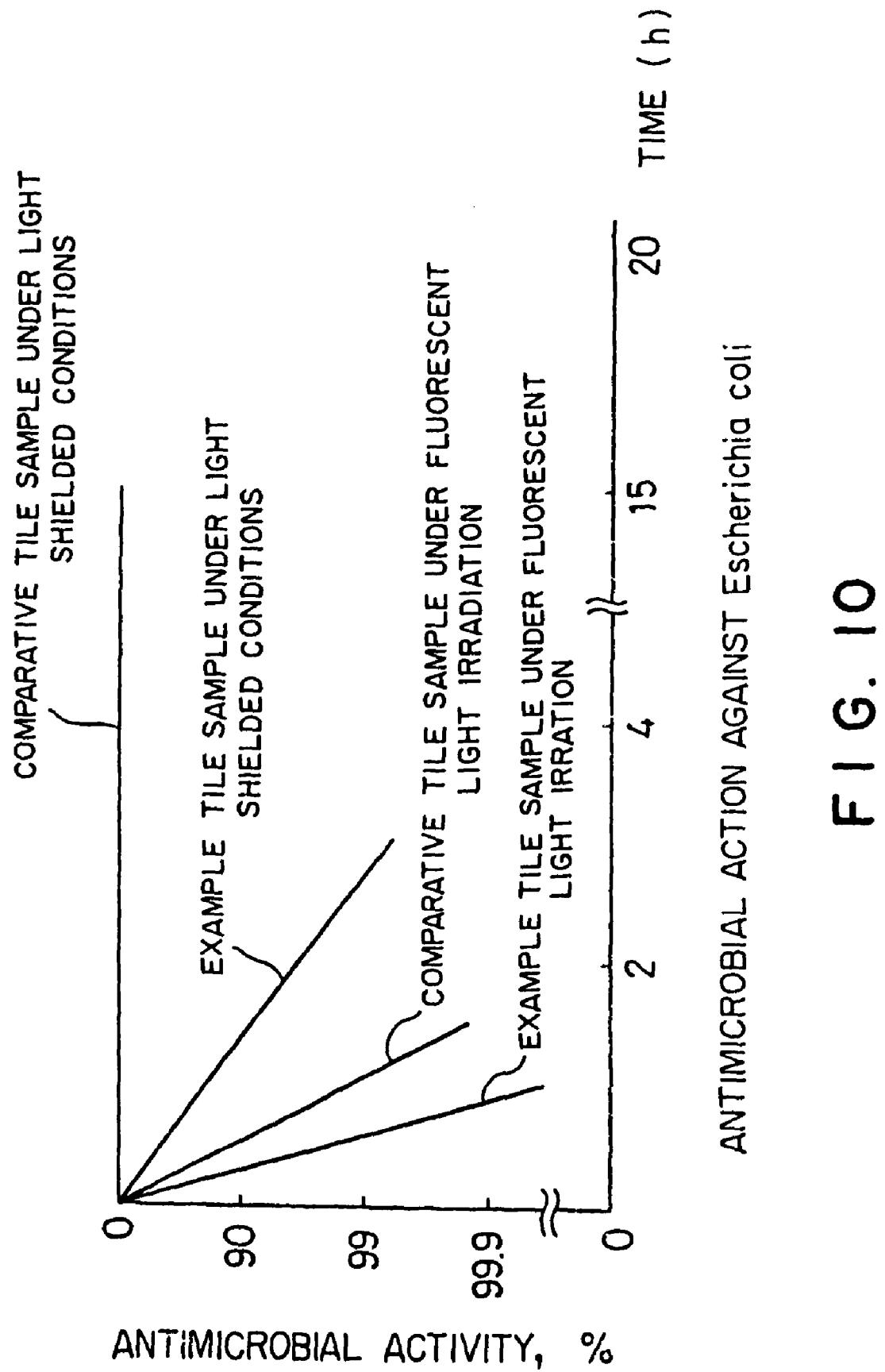
FIG. 10 is a graph showing the results of a test on the antimicrobial effect by example tiles according to the third example of the present invention.

At the outset, the surface of the tile of the third example and the surface of the comparative tile were sterilized with 70% ethanol. Thereafter, 0.15 ml (1 to $5 \times 10^4$ CFU) of a suspension of the *Escherichia coli* was dropped onto the surface of the tiles. A glass plate was put on the surface of the tiles so that the *Escherichia coli* came into intimate contact with the surface of the tiles. Thus, samples were prepared. In this case, a pair of samples were prepared for each of the tiles. One sample for each of the example tile of the third example and the comparative tile was irradiated with light from a fluorescent lamp through the glass plate. The other sample for each of the example tile of the third example and the comparative tile was placed under a light shielded environment. The survival rate of *Escherichia coli* in the samples under fluorescent light irradiation conditions (under light conditions) and the samples under light shielded conditions (under dark conditions) was measured versus time. The antimicrobial activity (proportion of *Escherichia coli* which have been killed or subjected to stopping of the growth) determined from the survival rate was plotted against the elapsed time. The results are shown in FIG. 10. In the measurement of the survival rate, the suspension of *Escherichia coli* in each of the samples was wiped with a sterilized gauze and collected in 10 ml of physiological saline, and the survival rate of *Escherichia coli* in the physiological saline was measured and regarded as the survival rate in the sample.

As is apparent from FIG. 10, under fluorescent light irradiation conditions, both the example tile of the third example and the comparative tile had high antimicrobial activity. This is probably because, under fluorescent light irradiation conditions, active oxygen species were produced by titanium dioxide in the surface layer and decomposed organic components of *Escherichia coli* to kill or stop the growth of *Escherichia coli*. Under light shielded conditions, the comparative tile did not produce the active oxygen species and hence had substantially no antimicrobial activity, whereas the example tile of the third example had relatively high antimicrobial activity even under light shielded conditions because Cu or other particles fixed onto the surface exhibited antimicrobial action even under light shielded conditions. Thus, in the example tile of the third example, under light shielded conditions, the antimicrobial action, which cannot be attained by titanium dioxide as the photocatalyst due to the light shielded state, can be attained by Cu or other particles, and hence can supplement the antimicrobial action of the photocatalyst.

Also in the third example, regarding the titanium dioxide as the photocatalyst, the crystal form may be rutile or brookite.

Further, $ZnO$, $V_2O_5$, $WO_3$, $SnO_2$, $SrTiO_3$, $Bi_2O_3$, and $Fe_2O_3$ can also be used as the photocatalyst. Zinc oxide and tin oxide (as amphoteric metal oxides), magnesium oxide, calcium oxide, rubidium oxide, sodium oxide, and potassium oxide (as basic metal oxides), and phosphorus oxide (as acidic metal oxide) may be used instead of alumina as the metal oxide. Copper oxide, silver (Ag), silver oxide, and metals, which as such have antimicrobial activity (even low antimicrobial activity), such as palladium, nickel, cobalt, platinum, gold, aluminum, iron, zinc, chromium, rhodium, and ruthenium, can be preferably used instead of copper. Next, the fourth and fifth examples will be described. The formulation of the fourth example is of a four component system comprising the photocatalyst and alumina or other metal oxide (amphoteric metal oxide, basic metal oxide, or acidic metal oxide) as with the first and second examples, and, in addition, a compound other than described above and the metal, such as copper or silver, as used in the third example. The formulation of the fifth example is of a three component system comprising the photocatalyst, alumina or other metal oxide (amphoteric metal oxide, basic metal oxide, or acidic metal oxide), and, in addition, a compound other than described above.

In the fourth example, the metal used in combination with the other ingredients is preferably a metal having a reduction potential above the potential (−3.2 V) of free electrons liberated from titanium dioxide as the photocatalyst, because the metal can be supported on titanium dioxide by the reduction potential (supporting by reduction). Specific examples of such metals usable herein include transition metals, such as silver, copper, palladium, iron, nickel, chromium, cobalt, platinum, gold, lithium, calcium, magnesium, aluminum, zinc, rhodium, and ruthenium. Among them, silver, copper, palladium, platinum, and gold are particularly preferred because they have a positive reduction potential and hence are likely to be reduced. In use of these metals in combination with the other ingredients, methods for supporting the metal onto the photocatalyst will be described. Methods usable for supporting the metal onto the photocatalyst are as follows.

(i) Simple mixing: An aqueous metal salt solution containing a contemplated metal species is added to and mixed with a photocatalyst sol to adsorb metal ions onto the surface of photocatalyst particles, thereby supporting the metal onto the photocatalyst.

(ii) Coprecipitation: An aqueous metal salt solution containing a contemplated metal species is added to a photocatalyst sol, followed by addition of a precipitant or heating to simultaneously precipitate the metal salt and the photocatalyst, that is, to cause coprecipitation. Thus, metal ions are supported onto the surface of particles of the photocatalyst.

(iii) Supporting before photoreduction: An aqueous metal salt solution containing a contemplated metal species is added to a photocatalyst sol, and the mixture is irradiated with ultraviolet energy. Thus, the metal is supported onto the surface of particles of the photocatalyst by utilizing photoreduction of the metal ions.

(iv) Supporting after photoreduction: An aqueous metal salt solution containing a contemplated metal species is coated onto a photocatalyst film, followed by irradiation with ultraviolet energy. Thus, the metal is supported onto the surface of the photocatalyst film by utilizing photoreduction of the metal ions.

(v) Vapor deposition: A contemplated metal in a particulate or compound form is supported by chemical or physical vapor deposition.

(vi) Others: Ions of a contemplated metal species are added before the photocatalyst is granulated by the sol-gel process, followed by coprecipitation or the like to form photocatalyst/metal ions.

Silicon dioxide (silica) was used as the compound used in combination with the photocatalyst and the metal oxide, such as alumina. $ZrO_2$, $GeO_2$, $ThO_2$, $ZnO$ and other oxides may be used instead of silica.

In the fourth example, the simple mixing, the supporting before photoreduction, or the coprecipitation was adopted, and photocatalysts with metals supported thereon by this method were used.

In the photocatalytic tile (example tile) according to the fourth example, photocatalyst sols containing a photocatalyst (titanium dioxide), with silver or copper supported thereon, dispersed therein by simple mixing, supporting before photoreduction, or coprecipitation were provided. In the same manner as described above in connection with the evaluation test 1 in the first example, sols of two other ingredients (alumina and silica) were mixed with photocatalyst sols with a metal supported on the photocatalyst (photocatalyst/metal), and the mixture was stirred. The mixed sols were spray-coated onto the tile, followed by firing. Thus, example tiles of the fourth example were prepared which were of a four component system of photocatalyst/metal/alumina/silica wherein the "metal" is silver or copper. In this case, in order to investigate the influence of additionally formulated metal and silica, a tile of a two component system of photocatalyst/metal (silver or copper) (reference tile) was also prepared. Example tiles of the fifth example were prepared as follows. A photocatalyst sol containing a photocatalyst (titanium dioxide) alone as described in the first example was provided. In the same manner as described above in connection with the evaluation test 1 in the first example, sols of two other ingredients (alumina and silica) were mixed with the photocatalyst sol, and the mixture was stirred. The mixed sol was spray-coated onto the tile, followed by firing. Thus, example tiles of the fifth example were prepared which were of a three component system of photocatalyst/alumina/silica. The example tiles and reference tile of the fourth and fifth examples, the example tile of the first example, and the comparative tile were evaluated for NOx reduction. The example tile of the first example and the comparative tile were those as described above in connection with the evaluation test 1 in the first example. For the example tile of the first example, the formulation ratio a/(a+b) was 1/11. For the example tile of the fourth example, the formulation ratio $(SiO_2/(TiO_2+Al_2O_3+SiO_2))$ was 1/11. For the example tile of the fifth example, the formulation ratio $(Al_2O_3/(TiO_2+Al_2O_3+SiO_2))$ was 1/11. Regarding the reference tile of a two component system, the weight ratio of the metal to $TiO_2$ was 0.001 ($Ag/TiO_2$) for the reference tile of a two component system with silver formulated therein and 0.01 ($Cu/TiO_2$) for the reference tile of a two component system with copper formulated therein.

Figure 5:
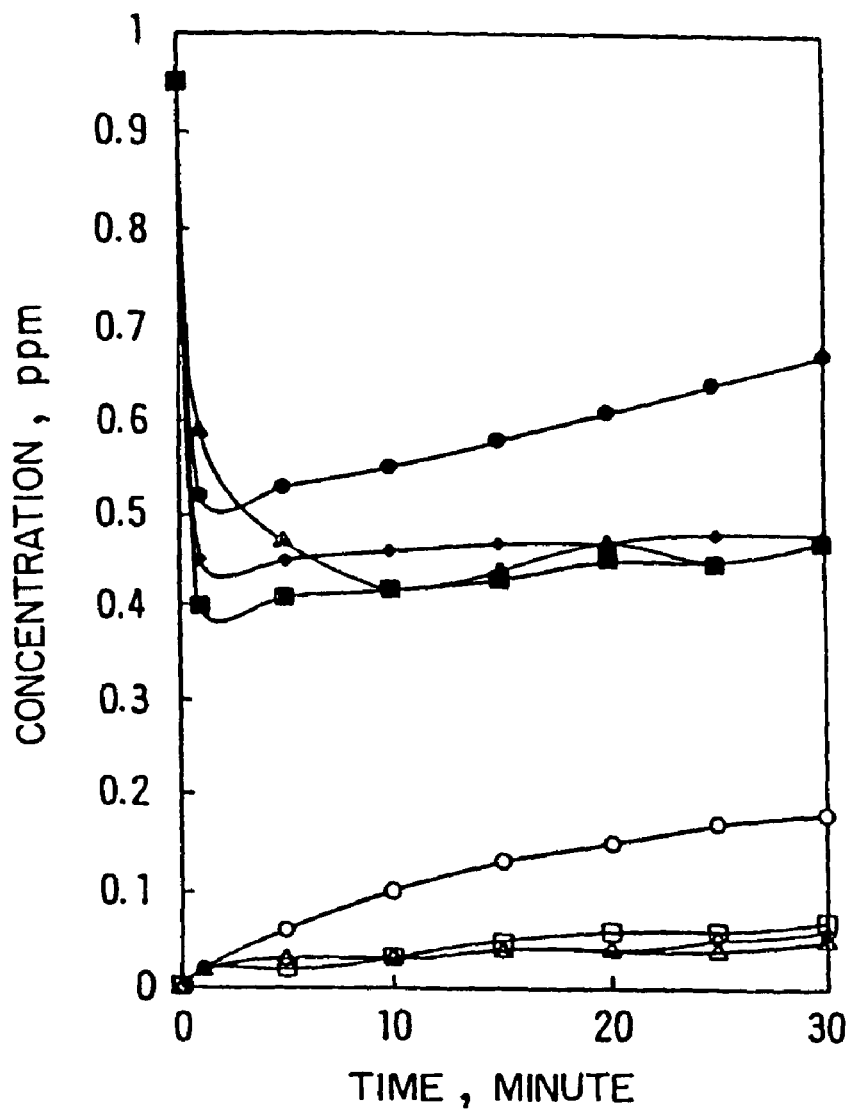
FIG. 5 is a graph showing the results of a test on conversion of nitrogen oxides by example tiles according to the first example of the present invention.
Figure 5:
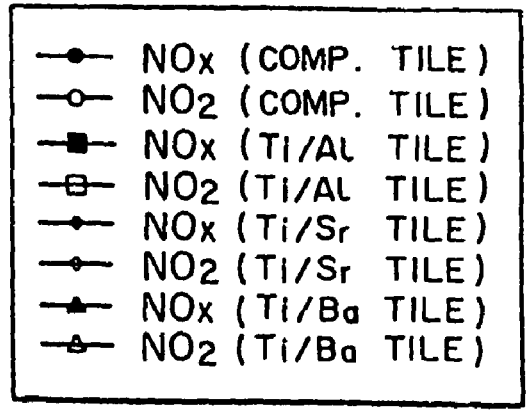

For these tiles, CNO/out and $CNO_2$/out were measured using a testing apparatus shown in FIG. 4 in the same manner as described above in connection with the evaluation test 1 in the first example. (CNO/in-CNO/out), $CNO_2$/out, and NOx reduction 30 min after the initiation of light irradiation were determined from the measured values of CNO/out and $CNO_2$/out and the known test gas concentration (CNO/in). The results are summarized in Table 1.

TABLE 1

| Classification | Formulation | Metal-supporting method | (CNO/in-CNO/out) | $CNO_2$/out | NOx reduction, % |
|---|---|---|---|---|---|
| Comparative tile | $TiO_2$ | | 0 | 0.19 | 30.5 |
| Tile of Ex. 1 | $TiO_2 + Al_2O_3$ | | 0.55 | 0.05 | 52.6 |
| Reference tile (2 components) | $TiO_2 + Ag$ | Simple mixing | 0.46 | 0.17 | 30.5 |
| Reference tile (2 components) | $TiO_2 + Ag$ | Supporting before photoreduction | 0.75 | 0.27 | 50.5 |
| Reference tile (2 components) | $TiO_2 + Cu$ | Simple mixing | 0.48 | 0.17 | 32.6 |
| Reference tile (2 components) | $TiO_2 + Cu$ | Supporting before photoreduction | 0.6 | 0.22 | 40 |
| Reference tile (2 components) | $TiO_2 + Cu$ | Coprecipitation | 0.5 | 0.17 | 33 |
| Tile of Ex. 5 (3 components) | $TiO_2 + Al_2O_3 + SiO_2$ | | 0.53 | 0.05 | 50.5 |
| Tile of Ex. 4 (4 components) | $TiO_2 + Al_2O_3 + SiO_2 + Ag$ | Supporting before photoreduction | 0.62 | 0.11 | 53.7 |
| Tile of Ex. 4 (4 components) | $TiO_2 + Al_2O_3 + SiO_2 + Cu$ | Supporting before photoreduction | 0.59 | 0.13 | 48.4 |

CNO/in-CNO/out represents the amount of NO oxidized to $NO_2$ or $NO_3^-$ (amount of NO reduced) and is a value indicative of the NO oxidizing activity. $CNO_2$/out represents the amount of $NO_2$ which has been released into the outside of the system. The smaller the $CNO_2$/out, the higher the capability of preventing $NO_2$ from being released from the system, that is, the higher the capability of adsorbing $NO_2$. For this reason, as is apparent from Table 1, the example tile of the fourth example exhibited NO oxidation activity equal to or higher than that of the first example and could realize high NOx reduction. In particular, the example tile of the fourth example with silver formulated therein had high CNO/in-CNO/out, that is, high NO oxidation activity, and low $CNO_2$/out, that is, high $NO_2$ adsorption activity. Thus, the example tile of the fourth example had a combination of good oxidation activity with good adsorption activity.

The results of the test for the reference tile show that supporting before photoreduction enables NO oxidation activity and NOx reduction, substantially equal to those in the first example, to be realized even in the case of the two component system of titanium dioxide and metal. As is apparent from the results of the test for the example tile of the fifth example, formulation of silica could provide NO oxidation activity and NOx reduction substantially equal to those in the first example, indicating that formulation of silica posed no problem associated with NOx reduction.

In the fourth and fifth examples, regarding the titanium dioxide as the photocatalyst, the crystal form may also be rutile or brookite. Further, ZnO, $V_2O_5$, $WO_3$, $SnO_2$, $SrTiO_3$, $Bi_2O_3$, and $Fe_2O_3$ can also be used as the photocatalyst. When the gas to be reduced is an acid gas, such as NOx, it is possible to use zinc oxide and tin oxide (as amphoteric metal oxides), magnesium oxide, calcium oxide, rubidium oxide, sodium oxide, and potassium oxide (as basic metal oxides) instead of alumina as the metal oxide. When the gas to be reduced is a basic gas, phosphorus oxide (acidic metal oxide) may be used in addition to the amphoteric metal oxides. Further, the above metals may be used instead of silver and copper, and the above oxides may be used instead of silica.

Next, the sixth and seventh examples will be described. As with the formulation of the fourth example, the formulation of the sixth example was of a four component system comprising a combination of a photocatalyst typified by titanium dioxide, an amphoteric, basic, or acidic metal oxide typified by alumina, the metal described above in connection with the fourth example, such as copper, silver, palladium, iron, nickel, chromium, cobalt, platinum, gold, rhodium, or ruthenium, and the other compound (oxide) described above in connection with the fourth example, such as silica. The formulation of the seventh example was of a three component system comprising a combination of a photocatalyst, an amphoteric, basic, or acidic metal oxide typified by alumina, and the other compound (oxide) described above in connection with the fourth example, such as silica. The formulations of the sixth and seventh examples aimed to improve the activity of decomposition including the decomposition of environmental pollutants, such as NOx and to prevent pollution.

As with the fourth example, in the sixth example, photocatalyst sols containing a photocatalyst (titanium dioxide), with silver or copper supported thereon, dispersed therein by simple mixing or supporting before photoreduction were provided. As with the fourth example, the example tile of the sixth example was prepared in the same manner as described above in connection with the evaluation test 1 in the first example. As with the fifth example, the example tile of the seventh example was prepared by mixing the photocatalyst sol with a sol of other ingredients (alumina and silica), stirring the mixture, spray-coating the mixed sol onto the tile, and firing the coated tile. Separately, in order to investigate the influence of additionally formulated metal and silica, tiles (reference tiles) were prepared for a two component system of photocatalyst/metal (silver or copper), a two component system of photocatalyst/silica, and a three component system of photocatalyst/metal (silver or copper)/silica. In this case, in coating the photocatalyst sol onto the substrate (tile), spin coating, dip coating and other coating means may be used instead of the spray coating. The fixation of the photocatalyst sol onto the surface of the substrate was carried out by firing as used in the evaluation test 1 of the first example (baked type), or by mixing a silicone resin with the photocatalyst sol and curing the silicone resin at a relatively low temperature (paint type). The example tiles of the sixth and seventh examples, the reference tile, and the comparative tile were evaluated. The comparative tile used was the same as that described above in connection with the evaluation test 1 in the first example.

The formulation ratio ($SiO_2/(TiO_2+Al_2O_3+SiO_2)$) for the example tile of the sixth example was 1/10. The formulation ratio ($Al_2O_3/(TiO_2+Al_2O_3+SiO_2)$) for the example tile of the seventh example was 1/10. The formulation ratio (SiO$_2$/(TiO$_2$+SiO$_2$)) for the reference tile of a two component system of photocatalyst/silica was 1/5. Regarding the reference tile of the two component system of photocatalyst/metal, the weight ratio of the metal to TiO$_2$ was 0.001 (Ag/TiO$_2$) for the reference tile of a two component system with silver formulated therein and 0.01 (Cu/TiO$_2$) for the reference tile of a two component system with copper formulated therein. For the reference tile of the three component system of photocatalyst/metal/silica, the weight ratio of the metal to TiO$_2$ was the same as that in the reference tile (0.001 (Ag/TiO$_2$) and 0.01 (Cu/TiO$_2$)), and the formulation ratio (SiO$_2$/(TiO$_2$+SiO$_2$)) was 1/5.

At the outset, in order to investigate the influence of additionally formulated metal, the reference tiles of a two component system of photocatalyst/metal (silver or copper) will be described. For the reference tiles of the two component system, in the case of baked type, various metal salts (special grade reagent, manufactured by Wako Pure Chemical Industries, Ltd.) were formulated in a titanium oxide sol (STS-11, manufactured by Ishihara Sangyo Kaisha Ltd.). The metal salt was formulated in an amount of 0.001 to 10% based on titanium oxide (on a solid basis) in the titanium oxide sol. Thereafter, silver or copper was supported on the photocatalyst by simple mixing, supporting before photoreduction, or coprecipitation. In the supporting before photoreduction, after an aqueous solution of a metal salt, that is, a silver or copper salt, was mixed with the titanium oxide sol, the mixture was exposed to ultraviolet light at an intensity of 1 mW/cm$^2$ for 2 hr. Thus, a sol of the photocatalyst with the metal supported thereon was prepared. In the case of the coprecipitation, a TiOSO$_4$ solution was provided as a starting compound, and an aqueous metal salt solution was added to this solution, followed by hydrolysis to prepare a sol of the photocatalyst with the metal supported thereon. Thereafter, these photocatalyst sols were spray coated on the surface of the tile so as to give a coating having a thickness of about 0.8 μm in terms of the thickness after firing. The coated tiles were fired at 600 to 900° C. (about 800° C. for the reference tiles) to obtain reference tiles of the two component system (baked type).

In the case of paint type, various metal salts (special grade reagent, manufactured by Wako Pure Chemical Industries, Ltd.) were formulated in a titanium oxide sol (TA-15, manufactured by Nissan Chemical Industries Ltd.). The metal salt was formulated in an amount of 0.001 to 1% based on titanium oxide (on a solid basis) in the titanium oxide sol. Thereafter, the photocatalyst sol with silver or copper supported thereon by simple mixing or supporting before photoreduction and a silicone resin as a binder were mixed together in a solid content ratio of titanium oxide to silicone resin of 7:3. The mixtures were spin-coated on the surface of the tile, and the coated tiles were heated at 150° C. to obtain reference tiles of the two component system (paint types).

The reference tiles of the two component system (baked type and paint type) were evaluated for the chemical decomposition activity. The decomposition activity can be directly evaluated in terms of antimicrobial activity and oil decomposition. In this case, the antimicrobial activity was evaluated in terms of killing/growth inhibitory activity against *Escherichia coli* w3110 as described above in the third example. In this case, the antimicrobial activity of the tile having a photocatalyst layer formed of a photocatalyst (titanium dioxide) alone was taken as 1. The oil decomposition was determined as follows. A salad oil was coated onto a sample at a coverage of 1 mg/100 cm$^2$, and the coated sample was irradiated with ultraviolet light at an intensity of 1 mW/cm$^2$ for 7 days. The gloss of the sample was measured before oil coating, immediately after oil coating, and at the end of the irradiation. The oil decomposition was determined according to the following numerical formula:

Oil decomposition (%)=100×{(Gloss at end of irradiation)−(Gloss immediately after oil coating)}/{(Gloss before oil coating)−(Gloss immediately after oil coating)}

The decomposition of chemical materials by a photocatalyst is derived mainly from oxidation of the chemical materials with active oxygen species released from the photoexcited photocatalyst. Therefore, the oxidation activity of the photocatalyst can be used as an index of one of the activities of the photocatalyst for decomposing chemical materials. Here, the NO oxidation activity of various thin photocatalyst films was also evaluated in terms of the conversion of nitrogen monoxide (NO) to nitrogen dioxide (NO$_2$) by oxidation as a model reaction. In order to determine the NO oxidation activity, CNO/out was measured using a testing apparatus shown in FIG. 4 in the same manner as described above in connection with the evaluation test 1 of the first example. CNO/in-CNO/out was determined against the elapsed time after light irradiation from the measured CNO/out and the known test gas concentration (CNO/in), and the total number of moles of NO, which has been oxidized in a period between the initiation of light irradiation and one hr after the initiation of light irradiation, was calculated as CNO/in-CNO/out and regarded as the NO oxidation activity. In this case, the flow rate of NO gas (test gas) was 2 liters/mm, and the sample piece had a size of 5×50 cm$^2$.

For the reference tiles (baked type and paint type) of two component system, the antimicrobial activity, the oil decomposition, and the NO oxidation activity are summarized in Table 2. As is apparent from the above description, the antimicrobial activity, the oil decomposition, and the NO oxidation activity shown in Table 2 were measured in such a manner that the tiles were placed under light conditions.

TABLE 2

| Metal added | M/TiO$_2$, % | Metal-supporting method | Antimicrobial activity | Oil decomposition, % | NO oxidizing activity/μmol hr |
|---|---|---|---|---|---|
| PART 1 Evaluation of decomposition activity for baked type reference tiles | | | | | |
| Free | 0.000 | — | 1.0 | 30 | 1.9 |
| Cu | 0.001 | Supporting before photoreduction | 1.2 | 40 | 1.6 |
| | 0.010 | Supporting before photoreduction | 1.5 | 50 | 2.0 |
| | 0.100 | Supporting before photoreduction | 1.5 | 50 | 2.0 |

TABLE 2-continued

| Metal added | M/TiO$_2$, % | Metal-supporting method | Antimicrobial activity | Oil decomposition, % | NO oxidizing activity/µmol hr |
|---|---|---|---|---|---|
| | 1.000 | Supporting before photoreduction | 2.0 | 60 | 2.4 |
| | 1.000 | Simple mixing | 1.5 | 50 | 1.9 |
| | 10.000 | Supporting before photoreduction | 1.2 | 30 | 1.2 |
| | 1.000 | Coprecipitation | 1.6 | 50 | 2.0 |
| Ag | 0.100 | Supporting before photoreduction | 2.5 | 50 | 3.3 |
| | 0.100 | Simple mixing | 1.5 | 35 | 1.9 |
| Pd | 0.100 | Supporting before photoreduction | 2.0 | 60 | 2.4 |
| Fe | 0.100 | Supporting before photoreduction | 1.5 | 65 | 2.4 |
| PART 2 Evaluation of decomposition activity for paint type reference tiles | | | | | |
| Free | 0.000 | — | 1.0 | 50 | 0.6 |
| Cu | 0.001 | Supporting before photoreduction | 1.2 | 50 | 0.5 |
| | 0.010 | Supporting before photoreduction | 1.5 | 70 | 0.6 |
| | 0.100 | Supporting before photoreduction | 2.0 | 90 | 0.6 |
| | 1.000 | Supporting before photoreduction | 2.0 | 90 | 0.7 |
| | 1.000 | Simple mixing | 1.8 | 55 | 0.6 |
| | 1.000 | Coprecipitation | 1.9 | 60 | 0.6 |
| Ag | 0.100 | Supporting before photoreduction | 3.0 | 80 | 1.0 |
| | 0.100 | Simple mixing | 2.5 | 55 | 0.6 |

From Table 2, it is apparent that, for a copper-loaded system in baked type reference tiles, tiles with 1% copper supported onto TiO$_2$ prepared by supporting before photoreduction had the best antimicrobial activity, oil decomposition, and NO oxidation activity. Also for a silver-loaded system, supporting before photoreduction rather than simple mixing had the best antimicrobial activity, oil decomposition, and NO oxidation activity. For addition of any metal in the table, all the antimicrobial activity, the oil decomposition, and the NO oxidation activity were superior to those in the metal-unloaded system, indicating that metals, such as copper, silver, palladium, and iron, supported on TiO$_2$ contributed to an improvement in decomposition activity of TiO$_2$. For a copper-loaded system in baked type, tiles with 0.1 to 1% copper supported onto TiO$_2$ prepared by supporting before photoreduction had the highest antimicrobial activity. Further, it was found that the silver-loaded system has higher antimicrobial activity than the copper-loaded system.

From the above results, it is apparent that, for baked type reference tiles and paint type reference tiles, supporting metals, such as copper, silver, palladium, and iron, on TiO$_2$ can improve the decomposition activity. That is, the above metals clearly have the function of improving the decomposition activity of TiO$_2$. Further, for metal-supporting method, supporting before photoreduction is superior in decomposition activity to simple mixing. Furthermore, regulation of the amount of the metal supported can vary the decomposition activity of TiO$_2$.

The antimicrobial activity of baked type reference tiles of two component system, when placed under dark conditions, was also investigated. As a result, for a reference tile with 0.1% copper supported on TiO$_2$ by simple mixing, the antimicrobial activity was about 0.3. Also for a reference tile with 1% copper supported on TiO$_2$ by simple mixing, the antimicrobial activity was about 0.3. Also for a reference tile with 0.1% silver supported on TiO$_2$ by simple mixing, the antimicrobial activity was about 0.3. Under dark conditions, since the photocatalyst is not activated, the antimicrobial activity of the reference tile is provided by the supported metal per se. When the fact that the antimicrobial activity of the metal-unloaded tile, that is, the tile using the photocatalyst alone, is substantially zero is taken into consideration, it can be said that, under light conditions, the antimicrobial activity of these reference tiles exceeds the antimicrobial activity of the metal per se and the antimicrobial activity of the tile using the photocatalyst alone (1 from Table 2) For example, the antimicrobial activity of the reference tile with 0.1% copper supported on TiO$_2$ by simple mixing is 1.5 from Table 2. This value exceeds the sum of the antimicrobial activity (0.3) of copper per se and the antimicrobial activity (1) of the tile using the photocatalyst alone. Therefore, it can be said that supporting copper on TiO$_2$ can provide larger effect than a simple combination of copper with TiO$_2$.

Based on the above effect of the reference tiles, the example tiles of the sixth and seventh examples will be described. In the sixth and seventh examples, hydrophilicity, which is an additional evaluation item, was also evaluated. At the outset, prior to hydrophilicity test and other tests, the relationship between the hydrophilicity and the fouling of the surface will be described.

In recent years, it has been found that imparting hydrophilicity to the surface can prevent fouling of the surface (Kobunshi (Polymer), Vol. 44, May, 1995, p. 307) The hydrophilicity can be expressed in terms of the contact angle of the surface with water. The lower the contact angle, the better the wettability of the surface by water. In this case, water, which has come into contact with the hydrophilic surface, is less likely to stay on the contact surface. When water is less likely to stay on the contact surface, contaminants, such as city dust, contained in rainwater and the like, together with water, run down from the hydrophilic surface to enhance the effect of preventing fouling.

For this reason, a proposal has been made on coating of a hydrophilicity-imparted graft polymer onto outer walls of buildings and the like to prevent fouling of the walls by the graft polymer coating. Since, however, the hydrophilicity of the graft polymer coating in terms of the contact angle of the graft polymer coating with water is about 30 to 40°, water tends to stay on the surface. Therefore, the antifouling effect and the antifogging effect are not necessarily satisfactory. Inorganic dust typified by clay mineral has a contact angle with water of about 20 to 50° and hence has affinity for the graft polymer having the above contact angle and is likely to be deposited onto the surface of the graft polymer. This also makes it difficult for the coating and film of the graft polymer to exhibit the effect of highly preventing the surface from being fouled particularly by inorganic dust.

When the contact angle is rendered smaller than that of inorganic dust, such as city dust having high lipophilic component content, and clay minerals, the antifouling effect can be further enhanced without affinity of the dust for the surface of the substrate. As the contact angle approaches 0°, the hydrophilicity increases and water is likely to diffuse in a film form and likely to flow on the surface of the substrate, permitting not only the city dust but also the inorganic dust, together with water, to easily run down the surface of the substrate. In this case, the contact angle is more preferably not more than about 20° and is close to zero from the viewpoint of enhancing the antifouling effect.

Based on the above problem, the example tiles of the sixth and seventh examples of the present invention using a photocatalyst have been studied. Since hydroxy radical is produced by the catalytic reaction of the photocatalyst, the contact angle, of the tiles with water, 5 which is an indicative of the hydrophilicity was measured. The test will be summarized below.

Sample pieces having a suitable size (bake type) of the example tiles of the sixth and seventh examples, the reference tiles of two component system and three component system, and the comparative tiles as described above were provided. The contact angle of a water droplet on the sample piece was measured after application of ultraviolet light (wavelength: 320 to 380 nm; amount of light received by the sample piece: about 1 mW/cm$^2$) from an ultraviolet irradiation lamp for about 24 hr (under light conditions) upon the production of the tile and after the sample piece was placed in a dark place for a period of time long enough to substantially completely stop the activity of the photocatalyst (under dark conditions) The results of measurement are summarized in Table 3.

TABLE 3

| | | Baked type | | | | | |
|---|---|---|---|---|---|---|---|
| | | Hydrophilicity (contact angle with water) | | Oxidization decomposition activity | | | |
| Classification | Formulation | Light | Dark | Antimicrobial activity | Oil decomposition, % | NO oxidation activity/ μmol hr | Mohs hardness of thin film |
| Comp. Tile | $TiO_2$ | 10 | 27 | 1.0 | 30 | 1.9 | 4 |
| Tile of Ex. 7 (3 components) | $TiO_2 + Al_2O_3 + SiO_2$ | 3 | 20 | 1.0 | 30 | 1.9 | 6 |
| Reference tile (2 components) | $TiO_2 + Ag$ | 10 | 25 | 2.5 | 50 | 3.3 | 4 |
| Reference tile (2 components) | $TiO_2 + Cu$ | 10 | 27 | 1.5 | 50 | 2.4 | 4 |
| Tile of Ex. 6 (4 components) | $TiO_2 + Al_2O_3 + SiO_2 + Ag$ | 3 | 20 | 2.5 | 50 | 3.3 | 6 |
| Tile of Ex. 6 (4 components) | $TiO_2 + Al_2O_3 + SiO_2 + Cu$ | 6 | 20 | 1.5 | 50 | 2.4 | 6 |
| Tile of Ex. 6 (4 components) | $TiO_2 + Al_2O_3 + SiO_2 + Pd$ | 3 | 20 | 2.8 | 55 | 6.0 | 6 |
| Tile of Ex. 6 (4 components) | $TiO_2 + Al_2O_3 + SiO_2 + Fe$ | 3 | 20 | 1.5 | 50 | 3.0 | 6 |
| Tile of Ex. 6 (4 components) | $TiO_2 + Al_2O_3 + SiO_2 + Ni$ | 3 | 20 | 2.5 | 50 | 3.1 | 6 |
| Tile of Ex. 6 (4 components) | $TiO_2 + Al_2O_3 + SiO_2 + Cr$ | 3 | 20 | 1.5 | 50 | 2.4 | 6 |
| Tile of Ex. 6 (4 components) | $TiO_2 + Al_2O_3 + SiO_2 + Co$ | 3 | 20 | 1.5 | 30 | 1.7 | 6 |
| Tile of Ex. 6 (4 components) | $TiO_2 + Al_2O_3 + SiO_2 + Pt$ | 3 | 20 | 2.8 | 60 | 6.0 | 6 |
| Tile of Ex. 6 (4 components) | $TiO_2 + Al_2O_3 + SiO_2 + Au$ | 3 | 20 | 1.5 | 50 | 2.4 | 6 |
| Tile of Ex. 6 (4 components) | $TiO_2 + Al_2O_3 + SiO_2 + Rh$ | 3 | 20 | 1.5 | 50 | 2.4 | 6 |
| Tile of Ex. 6 (4 components) | $TiO_2 + Al_2O_3 + SiO_2 + Ru$ | 3 | 20 | 1.5 | 50 | 2.4 | 6 |

From the results shown in Table 3, it is apparent that, as with the reference tiles of the two component system which have been examined for the influence of metal formulation, for the example tiles of the four component system (sixth example), formulation of metals indicated in the table, such as copper and silver, could improve all the antimicrobial activity, the oil decomposition activity, and the NO oxidation activity and enhance the decomposition activity. Further, the example tiles could provide the antimicrobial activity exceeding the sum of the antimicrobial activity of the metals, indicated in the table, such as copper and silver per se and the antimicrobial activity of the comparative tile using the photocatalyst alone and the example tiles of the three component system. Further, the Mohs hardness of the surface layer is equal to that of a simple tile not having any surface layer, indicating that the example tiles of the sixth example can be put to practical use as tile.

The contact angle of the example tiles of the sixth and seventh examples is lower than the comparative tile independently of whether the tiles are placed under light conditions or under dark conditions, indicating that, as described above, $SiO_2$ or $Al_2O_3$, either alone or in combination, formulated together with $TiO_2$ could contribute to an improvement in hydrophilicity of the surface of the tile through the adsorption of hydroxyl groups. It was further found that formulation of metals indicated in the table, such as copper and silver, does not cause an increase in contact angle, that is, a lowering in hydrophilicity. From these facts, it is apparent that functional thin films having both decomposition activity and hydrophilicity and functional materials having such thin films can be produced through supporting of metals contributable to the improvement in decomposition activity, such as copper, silver, palladium, iron, nickel, chromium, cobalt, platinum, gold, rhodium, and ruthenium, onto $TiO_2$ and formulation of $SiO_2$ and $Al_2O_3$, which contribute to an improvement in hydrophilicity, either alone or in combination, into $TiO_2$.

example tiles of the sixth and seventh examples, however, as described above in connection with the first and second examples, $NO_2$ is also reduced because the intermediate ($NO_2$) is chemically converted to nitric acid. Therefore, the example tiles of the sixth and seventh examples have the effect of reducing all harmful materials including NO and $NO_2$.

The improvement of decomposition activity was examined for the example tiles of the sixth and seventh examples (paint type). The results were as summarized in Table 4. The results demonstrate that, also for the paint type, according to the example tiles of the sixth and seventh examples, the formulation of the metals indicated in the table can enhance all the antimicrobial activity, the oil decomposition activity and the NO oxidation activity and can enhance the decomposition activity. It is a matter of course that as with the baked type example tiles, the paint type example tiles of the sixth and seventh examples can contribute to an improvement in hydrophilicity of the surface of the tile through adsorption of hydroxyl groups derived from $SiO_2$ which has been formulated together with $TiO_2$. Also for the paint type example tiles, the surface layer had a pencil hardness of 4H, indicating that the paint type example tiles can be put to practical use as tiles.

TABLE 4

Paint type

| | | Oxidation decomposition activity | | | |
|---|---|---|---|---|---|
| Classification | Formulation | Anti-microbial activity | Oil decomposition, % | NO oxidizing power/ μmol hr | Pencil hardness |
| Reference tile (2 components) | $TiO_2 + SiO_2$ | 1 | 50 | 0.6 | 4H |
| Tile of Ex. 7 (3 components) | $TiO_2 + Al_2O_3 + SiO_2$ | 1 | 50 | 0.6 | 4H |
| Reference tile (3 components) | $TiO_2 + Ag + SiO_2$ | 2.5 | 90 | 1.0 | 4H |
| Tile of Ex. 6 (4 components) | $TiO_2 + Cu + SiO_2$ | 2 | 90 | 0.7 | 4H |
| Tile of Ex. 6 (4 components) | $TiO_2 + Al_2O_3 + SiO_2 + Ag$ | 3 | 90 | 1.0 | 4H |
| Tile of Ex. 6 (4 components) | $TiO_2 + Al_2O_3 + SiO_2 + Cu$ | 2 | 90 | 0.7 | 4H |
| Tile of Ex. 6 (4 components) | $TiO_2 + Al_2O_3 + SiO_2 + Pd$ | 2.8 | 55 | 6.0 | 4H |
| Tile of Ex. 6 (4 components) | $TiO_2 + Al_2O_3 + SiO_2 + Fe$ | 1.5 | 50 | 3.0 | 4H |
| Tile of Ex. 6 (4 components) | $TiO_2 + Al_2O_3 + SiO_2 + Ni$ | 2.5 | 50 | 3.1 | 4H |
| Tile of Ex. 6 (4 components) | $TiO_2 + Al_2O_3 + SiO_2 + Cr$ | 1.5 | 50 | 2.4 | 4H |
| Tile of Ex. 6 (4 components) | $TiO_2 + Al_2O_3 + SiO_2 + Co$ | 1.5 | 30 | 1.7 | 4H |
| Tile of Ex. 6 (4 components) | $TiO_2 + Al_2O_3 + SiO_2 + Pt$ | 2.8 | 60 | 6.0 | 4H |
| Tile of Ex. 6 (4 components) | $TiO_2 + Al_2O_3 + SiO_2 + Au$ | 1.5 | 50 | 2.4 | 4H |
| Tile of Ex. 6 (4 components) | $TiO_2 + Al_2O_3 + SiO_2 + Rh$ | 1.5 | 50 | 2.4 | 4H |
| Tile of Ex. 6 (4 components) | $TiO_2 + Al_2O_3 + SiO_2 + Ru$ | 1.5 | 50 | 2.4 | 4H |

Figure 11:
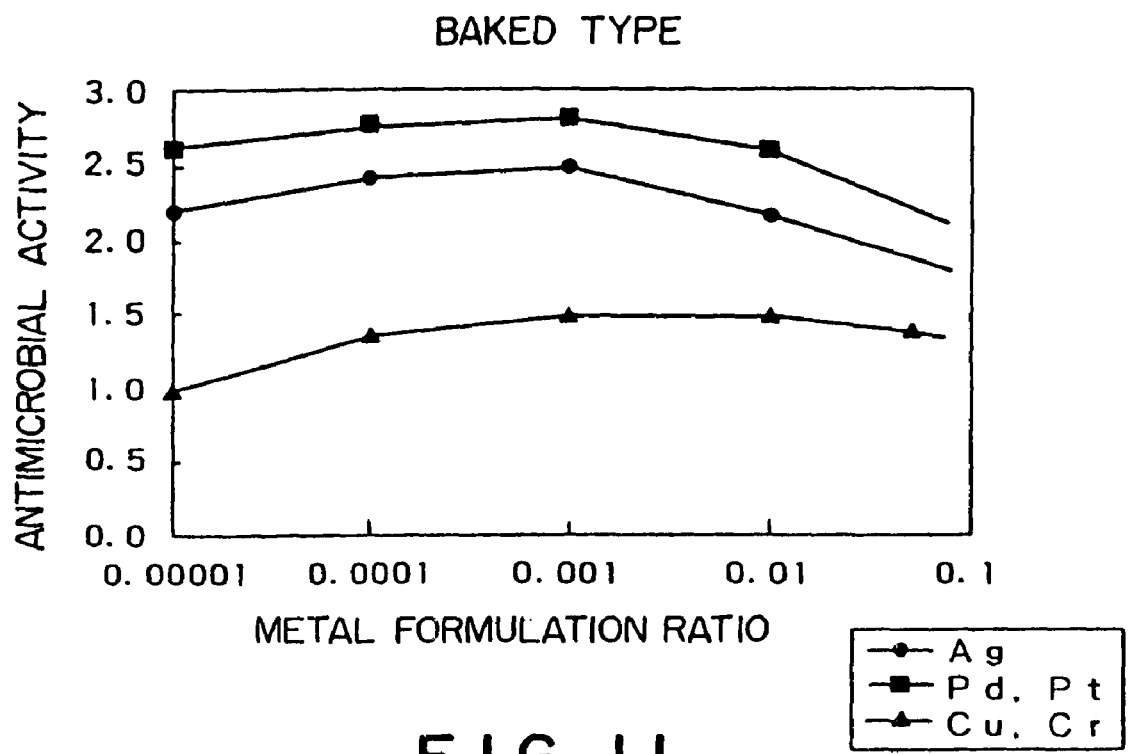
FIG. 11 is a graph showing the relationship between c/d (metal formulation ratio) and the antimicrobial activity, wherein c represents the weight of a metal supported in example tiles (baked type) of a four component system according to the sixth example, and d represents the weight of $TiO_2$ supported.

It is a matter of course that the example tiles of the sixth and seventh examples have the effect of reducing harmful materials, such as nitrogen oxides, as described in the first and second examples, because the surface layer contains $Al_2O_3$, in addition to $TiO_2$. The example tile of the seventh example of the three component system free from the above metal has NO oxidation activity equal to the comparative tile. For the The amount of copper, silver and the like formulated will be described by taking the example tiles of the sixth example of four component system of photocatalyst/metal/alumina/silica as an example. The example tiles of the sixth example were such that the formulation ratio ($SiO_2/(TiO_2+Al_2O_3+SiO_2)$) was constant and 1/10, while the metal formulation ratio c/d varied, wherein c represents the weight of the metal and d represents the weight of $TiO_2$. For the example tiles, the relationship between the metal formulation ratio and the antimicrobial activity was examined. The results are shown in FIG. 11 (baked type) and FIG. 12 (paint type). In this case, the antimicrobial activity was expressed by taking the antimicrobial activity of the example tile of the seventh example of three component system of photocatalyst/alumina/silica as 1.

Figure 12:
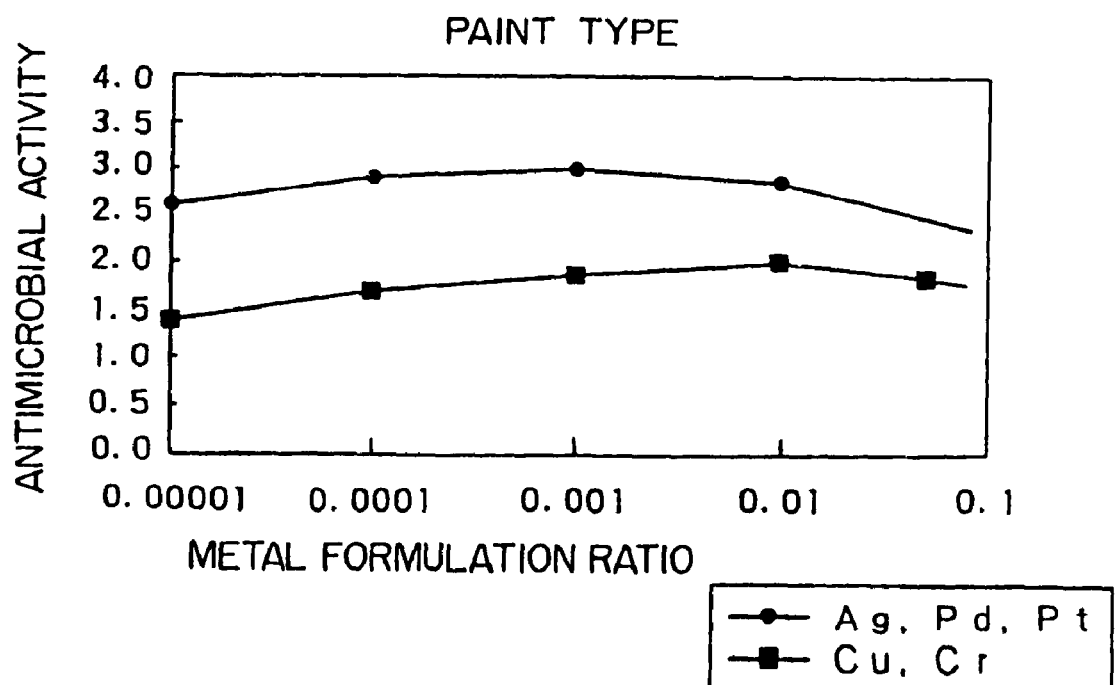
FIG. 12 is a graph showing the relationship between c/d (metal formulation ratio) and the antimicrobial activity, wherein c represents the weight of a metal supported in example tiles (paint type) of a four component system according to the sixth example, and d represents the weight of $TiO_2$ supported in the tiles.

As is apparent from FIGS. 11 and 12, for both the baked type and the paint type, an antimicrobial activity of not less than 1 could be provided also in the case of any metal of silver, palladium, platinum, copper, and chromium when the metal formulation ratio was not less than about 0.00001. The antimicrobial activity reached the maximum when the metal formulation ratio was about 0.001 for silver, palladium, and platinum, and about 0.01 for copper and chromium. After the antimicrobial activity reached the maximum, it gradually decreased. This demonstrates that satisfactory results can be attained when metals, such as silver, palladium, platinum, copper, and chromium, are formulated in a metal formulation ratio of about 0.00001 to 0.05. That is, when these metals are formulated in a metal formulation ratio of not less than 0.00001, advantageously there is no possibility that the metal is not contributed to an improvement in antimicrobial activity at all due to excessively small metal content. On the other hand, when these metals are formulated in a formulation ratio of not more than 0.05, advantageously, there is no possibility that the amount of the metal is excessive in relation with the amount of the photocatalyst ($TiO_2$), adversely affecting the catalytic reaction of the photocatalyst. It was further found that the example tiles having a surface layer containing silver, palladium, or platinum as the fourth component have superior antimicrobial activity to the example tiles having a surface layer containing copper or chromium as the fourth component.

Surface properties of the surface layer formed on the surface of the tile using the photocatalyst sol as described above will be described by taking the example tile of the sixth example of the four component system of photocatalyst/metal/alumina/silica and the example tile of the seventh example of the three component system of photocatalyst/alumina/silica as an example. In this case, the example tiles of the sixth and seventh examples were such that, in the surface layer, the formulation ratio ($SiO_2/(TiO_2+Al_2O_3+SiO_2)$) was constant and 1/10, while the thickness of surface layer, one of the surface properties, was varied. For the example tiles, the relationship between the surface layer thickness and the contact angle, the antimicrobial activity, the oil decomposition activity, or the NO oxidation activity was examined. The results are shown in FIGS. 13 to 17.

Figure 17:
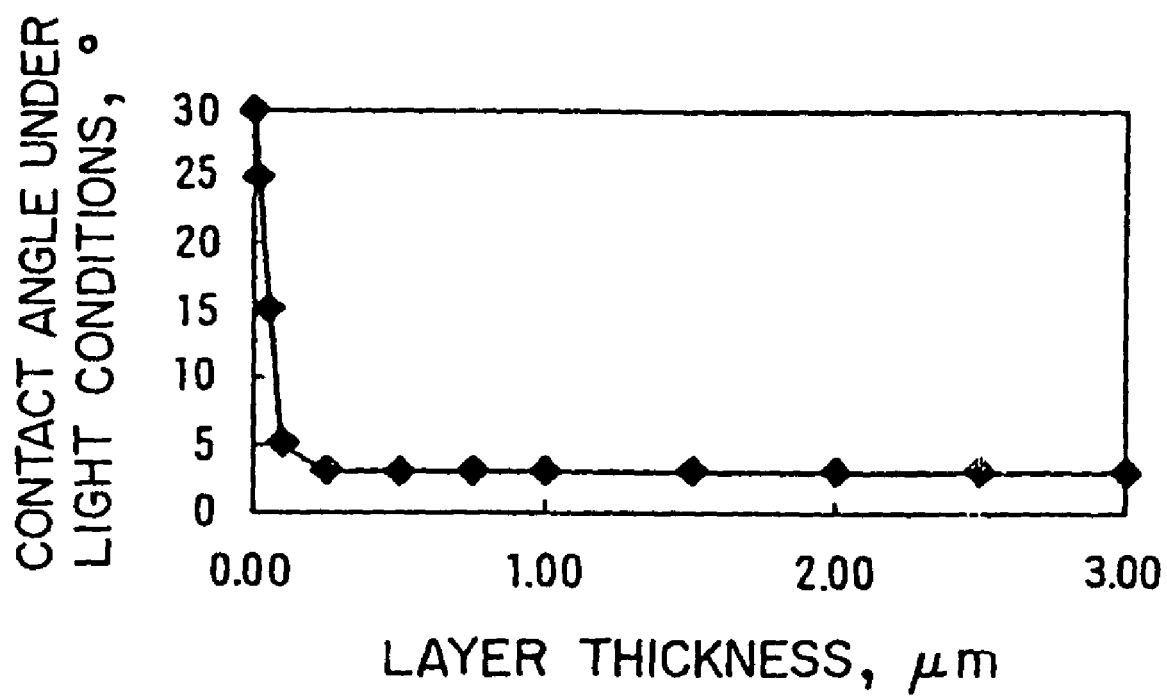
FIG. 17 is a graph showing the relationship between the thickness of the surface layer and the contact angle under light conditions in example tiles of a three component system (baked type) according to the seventh example.

FIGS. 13 to 16 show the results for the example tiles (baked type) of the sixth example of the four component system. Specifically, FIG. 13 is a graph showing the relationship between the surface layer thickness and the contact angle under light conditions, FIG. 14 is a graph showing the relationship between the surface layer thickness and the antimicrobial activity, FIG. 15 is a graph showing the relationship between the surface layer thickness and the oil decomposition activity, and FIG. 16 is a graph showing the relationship between the surface layer thickness and the NO oxidation activity. In this case, the antimicrobial activity was expressed by taking the antimicrobial activity of the tile having a surface layer containing photocatalyst/alumina/silica as 1. FIG. 17 is a graph showing the relationship between the surface layer thickness and the contact angle under light conditions in the example tiles (baked type) of the seventh example of three component system. The example tiles of the four component system had a surface layer containing silver, palladium, platinum, copper, or chromium, the surface layer having a thickness of 0.005 to 3 microns.

For the example tiles of the three component system and four component system, as described above, since the surface layer contained $SiO_2$, which can contribute to an improvement in hydrophilicity through adsorption of a hydroxyl group, the function exerted by the incorporation of $SiO_2$ (improved hydrophilicity) is expected. In this case, as described above, the improvement in hydrophilicity is confirmed based on whether or not the contact angle is small, and a contact angle of not more than 20° is preferred. When FIGS. 13 and 17 are observed by taking this into consideration, it is apparent that, for the baked type of example tiles of three component system and four component system, a low constant angle of not more than 20° is provided when the surface layer thickness is not less than about 0.01 microns, that is, the antifouling effect can be advantageously attained through the improved hydrophilicity. The reason why a low contact angle of not more than 20° is provided in the case of a surface layer thickness of not less than about 0.01 μm is believed to reside in that, by virtue of satisfactory layer (surface layer) thickness, the contact angle of the surface layer, formed on the substrate (tile), per se can be provided even though the contact angle of the substrate is large.

As is apparent from FIGS. 13 and 17, when the surface layer thickness is not less than about 0.5 μm, the constant angle is kept low. On the other hand, the weight per contact area of the surface layer increases with increasing the thickness of the surface layer thickness. Therefore, when the surface layer thickness is excessively large, the adhesion between the substrate and the surface layer is often lowered, causing the surface layer to be separated. For this reason, the surface layer thickness is preferably not more than about 3 microns from the viewpoint of maintaining the adhesion between the substrate and the surface layer. Further, when the surface layer thickness is excessively large, ultraviolet light does not reach the lower portion of the surface layer at all. This makes it impossible for the whole surface layer to exhibit the photocatalytic activity. Also from this point of view, the surface layer thickness is preferably not more than about 3 microns.

As shown in FIGS. 14 to 16, when the surface layer thickness is in the above range (about 0.01 to about 3 μm), advantageously, the antimicrobial activity, the oil decomposition activity, and the NO oxidation activity can be surely improved.

In addition to the surface layer thickness, the following surface properties were also investigated.

Upon ultraviolet irradiation, excited electrons, together with hydroxy radicals, are produced by the photocatalyst. Therefore, specific phenomena created on the surface layer by excited electrons and inspection of the state can reveal how excited electrons are produced, that is, how hydroxy radicals are produced. For the example tiles of the sixth and seventh examples, the surface layer contains SiO2 which can adsorb and hold a hydroxyl group, so that hydroxy radicals produced by the photocatalyst are held on $SiO_2$. Therefore, it is believed that a larger amount of excited electrons produced by the photocatalyst results in the production of a larger amount of hydroxy radicals and consequently enhances the hydroxyl density on the surface of $SiO_2$ and lowers the contact angle with water, enhancing hydrophilicity. For this reason, when ultraviolet irradiation is carried out with a silver nitrate solution being deposited on the surface layer, the charge of silver ion in the silver nitrate solution deposited on the surface layer is affected by excited electrons to develop a color reaction.

This creates a color difference ΔE between before the ultraviolet irradiation and after the ultraviolet irradiation. This color difference ΔE increases with increasing the number of excited electrons involved in the reaction and hence can serve as an indication of the hydrophilicity. Therefore, the color difference ΔE was observed as follows.

For the measurement of the color difference ΔE, a 1% silver nitrate solution, a general reagent capable of developing a color reaction, was used. Silver ions contained in this solution are precipitated as silver as a result of a reaction with excited electrons (e⁻) produced by the photocatalyst according to the following formula. The precipitation of silver causes the color on the silver nitrate solution-deposited surface to be changed to brown or black, creating a clear color difference ΔE. This is according to the reaction $Ag^+ + e^- \rightarrow Ag\downarrow$.

Therefore, a 1% silver nitrate solution was deposited onto the surface layer of the paint type of example tiles of the sixth example (four component) and the seventh example (three component), and, in this state, the example tiles were irradiated with ultraviolet light, followed by measurement of the color difference ΔE for each of the tiles. The ultraviolet light was applied at an intensity 1.2 mW/cm² on the surface layer for 5 min, and the relationship between the measured color difference ΔE and the contact angle, the antimicrobial activity, the oil decomposition activity, or the NO oxidation activity was investigated. The results are shown in FIGS. 18 to 22.

In the measurement of the color difference ΔE, the residual aqueous solution on the surface of the tile was wiped with a Kim towel, and the difference in the amount of color development of silver of the surface of the tile between this state and before the test (before the ultraviolet irradiation) was determined. The amount of color development was measured with a color difference meter ND300A manufactured by Nippon Denshoku Co., Ltd. according to JIS Z 8729 (1980) and JIS Z 8730 (1980).

Figure 18:
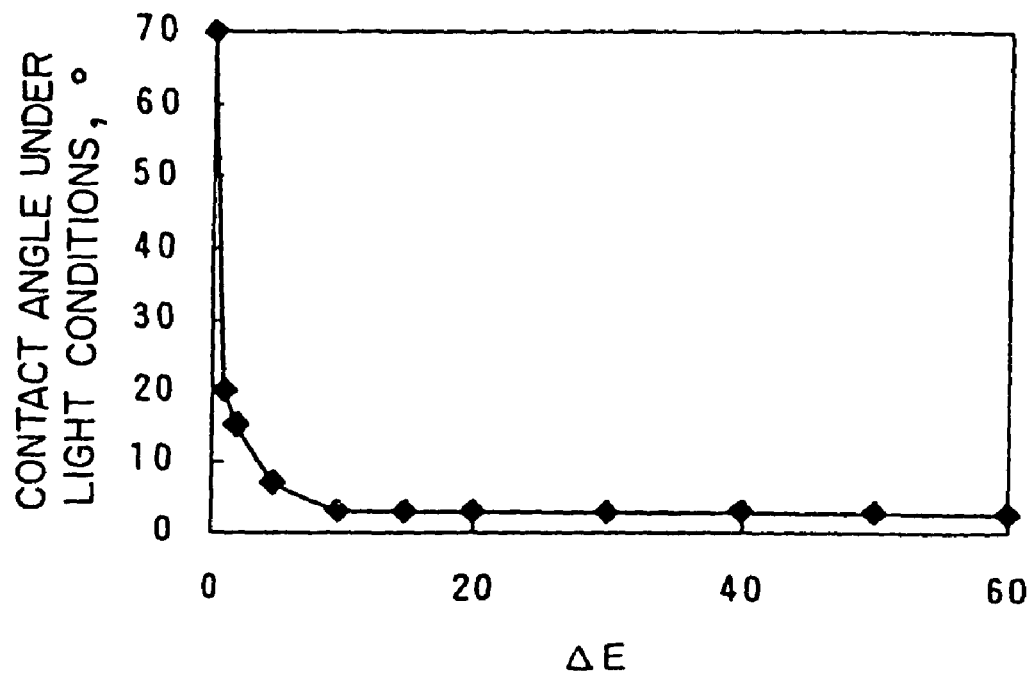
FIG. 18 is a graph showing the relationship between the color difference ΔE and the contact angle under light conditions in example tiles of a four component system (paint type) according to the sixth example.
Figure 19:
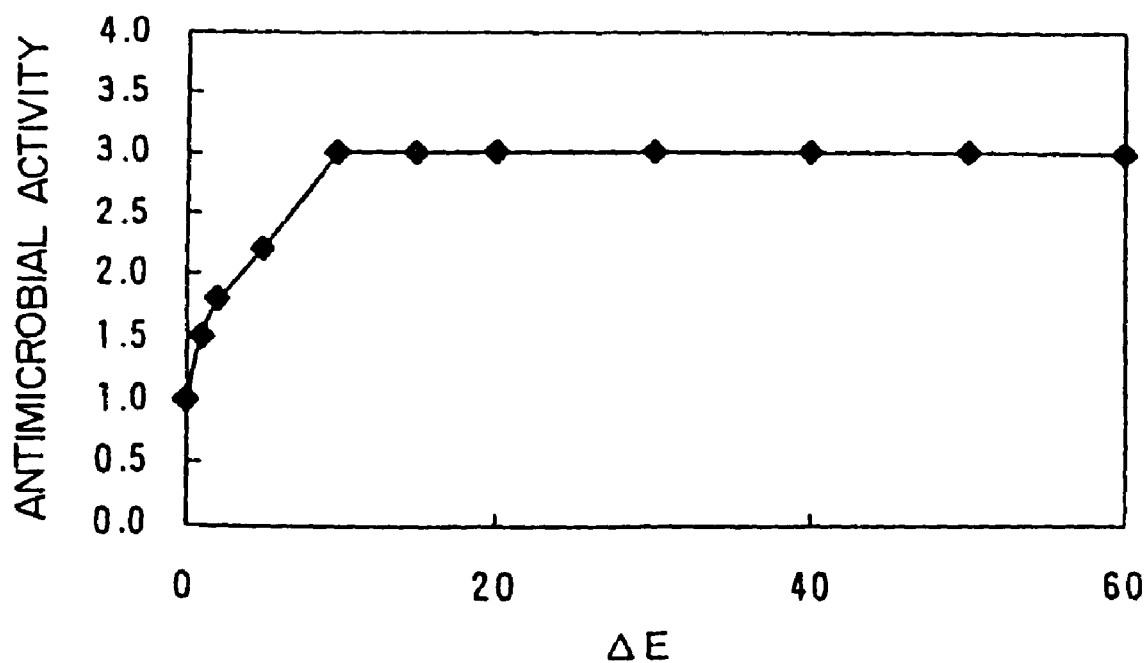
FIG. 19 is a graph showing the relationship between the color difference ΔE and the antimicrobial activity in example tiles of a four component system (paint type) according to the sixth example.

FIGS. 18 to 21 show the test results for the example tiles (paint type) of the sixth example of four component system. Specifically, FIG. 18 is a graph showing the relationship between the color difference ΔE and the contact angle under light conditions, FIG. 19 is a graph showing the relationship between the color difference ΔE and the antimicrobial activity, FIG. 20 is a graph showing the relationship between the surface layer thickness and the oil decomposition activity, and FIG. 21 is a graph showing the relationship between the color difference ΔE and the NO oxidation activity. Also in this case, the antimicrobial activity was expressed by taking the antimicrobial activity of the tile having a surface layer containing photocatalyst/alumina/silica as 1. FIG. 22 is a graph showing the relationship between the color difference ΔE and the contact angle under light conditions in the example tile (paint type) of the seventh example of the three component system. The example tiles of the four component system had a surface layer containing silver, and the test was carried out for the tiles which provided color differences ΔE ranging from 0 to 60. In this case, the tile which provided a color difference ΔE of zero was a simple tile which did not produce excited electrons (a tile having a surface layer formed of a paint alone).

As is apparent from FIGS. 18 and 22, a color difference ΔE of not less than 1 is preferred because the contact angle is as low as not more than 20° and the antifouling effect is improved through the improved hydrophilicity. When the color difference ΔE is not less than about 10, the contact angle is kept low. On the other hand, the larger the amount of the photocatalyst, the more active the production of excited electrons and the larger the color difference ΔE. In this case, however, the amount of the photocatalyst based on the total amount of ingredients other than the photocatalyst ($Al_2O_3$, $SiO_2$, or a combination of $Al_2O_3$ or $SiO_2$ with the above metal) becomes large, and a larger amount of the photocatalyst lowers the adhesion to the substrate and creates a larger tendency toward the separation of the surface layer. When the color difference ΔE is not more than 50, the amount of the photocatalyst based on the total amount of other ingredients than the photocatalyst is not excessively large, which can advantageously prevent the separation of the surface layer.

As shown in FIGS. 19 to 21, the color difference ΔE is preferably in the above range (about 1 to about 50) from the viewpoint of surely improving the antimicrobial activity, the oil decomposition activity, and the NO oxidation activity.

Next, an improvement in superhydrophilic activity attained by the addition of other ingredients (metal oxides), which contribute to an improvement in hydrophilicity of $TiO_2$, such as $SiO_2$ or $Al_2O_3$, will be described. Baked type example tiles of the eighth example will be first described.

(i) Provision of Photocatalyst and Metal Oxide Sol:

Photocatalytic material/$TiO_2$ sol: average particle diameter about 0.02 μm (STS-11, manufactured by Ishihara Sangyo kaisha Ltd.) or average particle diameter about 0.01 μm (A-6L, manufactured by Taki Chemical Co., Ltd.).

$SnO_2$ sol: average particle diameter about 0.002 microns (manufactured by Taki Chemical Co., Ltd.).

In the eighth example, $SnO_2$ sol was used in addition to anatase form of $TiO_2$ sol which is harmless, chemically stable, and inexpensive. Other photocatalytically active crystalline $TiO_2$, $SrTiO_3$, $ZnO$, $SiC$, $GaP$, $CdS$, $CdSe$, $MoS_3$, $V_2O_5$, $WO_3$, $SnO_2$, $Bi_2O_5$, and $Fe_2O_3$ may be used as alternative materials.

Metal oxide/$SiO_2$ sol: average particle diameter about 0.007 to about 0.009 μm (Snowtex 5, manufactured by Nissan Chemical Industry Ltd.).

$Al_2O_3$ sol: average particle diameter about 0.01 μm×about 0.1 μm (Alumina Sol 200, amorphous form, manufactured by Nissan Chemical Industry Ltd.) or average particle diameter about 0.01 to about 0.02 μm (Alumina Sol 520, boehmite form, manufactured by Nissan Chemical Industry Ltd.).

$SiO_2$+$K_2O$ sol: (Snowtex K, $SiO_2$/$K_2O$ molar ratio 3.3 to 4.0, manufactured by Nissan Chemical Industry Ltd.).

$SiO_2$+$LiO_2$ sol: (Lithium silicate 35, $SiO_2$/$LiO_2$ molar ratio 3.5, manufactured by Nissan Chemical Industry Ltd.).

$ZrO_2$ sol: average particle diameter about 0.07 μm (NZS-30B, manufactured by Nissan Chemical Industry Ltd.).

All the above sols were commercially available products. Alternatively, it is possible to use a liquid prepared by adding a hydrolysis inhibitor, such as hydrochloric acid or ethylamine, to a metal alkoxide as a starting material, diluting the mixture with an alcohol, such as ethanol or propanol, and allowing hydrolysis to partially or entirely proceed For example, titanium alkoxides usable herein include tetraethoxytitanium, tetraisopropoxytitanium, tetra-n-propoxytitanium, tetrabutoxytitanium, and tetramethoxytitanium. Further, other organometal compounds (chelates and acetates) and inorganic metal compounds, such as $TiCl_4$ and $Ti(SOC)_2$, may be used as the starting material.

(ii) Preparation of Hydrophilicity-Imparting Materials:

In the mixing of a sol of the photocatalytic material with a sol of the metal oxide, each of the sols is previously diluted so as to give a solid content of 0.4% by weight, and the sols were mixed together in proportions as indicated in Table 5 below, followed by thorough stirring. The solid weight ratio after the mixing is the liquid weight ratio of the sols.

(iii) Preparation of Hydrophiliflable Tiles:

A glazed tile (ABO6E11, manufactured by TOTO) was provided as the substrate, and a predetermined amount of the mixed sol was spray-coated on the surface of the tile to a layer thickness of about 0.5 microns. The coated substrate was fired at a maximum temperature of about 700 to 900° C. in RHK (a roller hearth kiln) for a firing time of 60 min. Thus, the example tile of the eighth example was produced. In the eighth example, spray coating was used. Further, flow coating, spin coating, dip coating, roll coating, brush coating, and other coating methods are usable. In the eighth example, tiles were used as the substrate. Besides tiles, metals, ceramics, potteries, glasses, plastics, woods, stones, cements, concretes, or combinations or laminates of the above substrates may be used. In this eighth example, the sols used were those described in the above sols, that is, were of a two or three component system of a combination of the photocatalyst, the amphoteric or basic or acidic metal oxide typified by alumina, and the other compound (oxide), such as silica, described in the fourth example. In some cases, however, as shown in Table 5, a plurality of types of compounds (metal oxides) may be used as one component.

(iv) Evaluation:

The hydrophilicity was evaluated in terms of the static contact angle of water. At the output, test tiles (the eighth example tile and the comparative tile) were irradiated with ultraviolet light from a BLB fluorescent lamp (a black light lamp, FL2OBLB, manufactured by Sankyo Electric Co. Ltd.) at an intensity of 1.5 mW/cm$^2$ for 24 hr, and the contact angle of the tiles with water was then measured. Thereafter, the tiles were stored under light shielded conditions (in a dark place) for 72 hr, and the contact angle with water was again measured. The results are summarized in the table. The film strength was evaluated in terms of Mohs hardness. The results are summarized in Table 5.

As is apparent from Nos. 2 to 14 of Table 5, in the hydrophilification by ultraviolet irradiation, when $TiO_2/(TiO_2+SiO_2+Al_2O_3)$ is greater than or equal to 0.4, the contact angle of the example tiles with water is not more than 10°, indicating that satisfactory hydrophilification has been made. After storage in a dark place, when the amount of $TiO_2$ is identical, the hydrophilicity is maintained on a higher level with increasing the amount of $Al_2O_3$ added. Further, when $SiO_2$ is added, the hardness increases with increasing the amount of $SiO_2$ added. From these facts, it is apparent that addition of $SiO_2$ and $Al_2O_3$ to the photocatalyst ($TiO_2$) can provide a formulation that, as compared with the photocatalyst alone, has better hydrophilicity under light irradiation conditions, has improved retention of the hydrophilicity under dark conditions, and was found to have improved layer hardness and denseness. When sols described in this example are used, it is considered that, among these effects, the improved hydrophilicity is provided mainly by the addition of $Al_2O_3$ and the improved film hardness is provided by the addition of $SiO_2$. No. 1 in Table 4 shows the results for the glazed tile, while No. 2 shows the results for the tile using the photocatalyst alone (comparative tile).

Nos. 15 to 18 in Table 5 show the results of the same tiles as used above, except that a part of $SiO_2$ has been replaced with $K_2O$. Also in this case, the improved hydrophilicity and the increased layer hardness have been attained in the firing temperature range of about 700 to about 800° C. by the addition of $SiO_2$, $K_2O$, and $Al_2O_3$. No. 19 shows the results of the test wherein a part of $SiO_2$ has been replaced with $LiO_2$. Also in this case, the hydrophilicity and the layer hardness have been improved.

No. 17 and No. 18 show the results of an examination on the shape of the starting material for the alumina sol. Use of an alumina sol, which is amorphous and has a feather-like structure, was found to further improve the hydrophilicity. This

TABLE 5

| | Formulation ratio | | | | | | | | Measurement Results | | |
|---|---|---|---|---|---|---|---|---|---|---|---|
| | | | | Al$_2$O$_3$ | | SiO$_2$ + K$_2$O | SiO$_2$ + LiO$_2$ | | After irradiation with light | After storage in dark place | |
| | Firing | TiO$_2$ | SnO$_2$ | SiO$_2$ | Alumina sol 200 | Alumina sol 520 | Snowtex K | Lithium silicate 35 | ZrO$_2$ NZS-30B | Contact angle | Contact angle | Mohs hardness |
| No. | Temp. (° C.) | STS-11 | A-6L | Snowtex S | | | | | | | | |
| 1 | 800 | | | | | | | | | 40 | 40 | 6 |
| 2 | to | 100 | | | | | | | | 10 | 27 | 4 |
| 3 | 900 | 80 | | 20 | 0 | | | | | 5 | 26 | 6 |
| 4 | | 80 | | 10 | 10 | | | | | 3 | 20 | 6 |
| 5 | | 80 | | 0 | 20 | | | | | 3 | 18 | 4 |
| 6 | | 50 | | 50 | 0 | | | | | 9 | 24 | 6 |
| 7 | | 50 | | 30 | 20 | | | | | 8 | 17 | 6 |
| 8 | | 50 | | 10 | 40 | | | | | 8 | 15 | 4 |
| 9 | | 50 | | 0 | 50 | | | | | 6 | 15 | 4 |
| 10 | | 20 | | 80 | 0 | | | | | 19 | 26 | 5 |
| 11 | | 20 | | 60 | 20 | | | | | 19 | 21 | 5 |
| 12 | | 20 | | 40 | 40 | | | | | 18 | 19 | 4 |
| 13 | | 20 | | 20 | 60 | | | | | 14 | 16 | 3 |
| 14 | | 20 | | 0 | 80 | | | | | 14 | 15 | 3 |
| 15 | 700 | | 100 | | | | | | | 12 | 29 | 4 |
| 16 | to | | 50 | | | | 50 | | | 10 | 21 | 6 |
| 17 | 800 | | 40 | | | 10 | 50 | | | 7 | 18 | 6 |
| 18 | | | 40 | | 10 | | 50 | | | 4 | 14 | 6 |
| 19 | | 50 | | | | | | 50 | | 10 | 25 | 6 |
| 20 | 750 | 80 | | | | | | | 20 | 7 | 26 | 4 |
| 21 | to | | | 100 | | | | | | 16 | 35 | 6 |
| 22 | 850 | | | 90 | | 10 | | | | 11 | 29 | 6 | suggests that, in order to improve the hydrophilicity, the structure having higher hydrophilic group content is more effective than the particulate form.

No. 20 shows the results of the test wherein $ZrO_2$ has been added to $TiO_2$. From these facts, it is apparent that $ZrO_2$ also is effective in improving the hydrophilicity.

No. 21 and NO. 22 show the results of the test wherein $SnO_2$ has been used as the photocatalyst. It was confirmed that use of $SnO_2$ alone also can provide hydrophilic effect, and further addition of $Al_2O_3$ can provide improved hydrophilicity. At that time, the layer hardness was not lowered, and it was confirmed that $SnO_2$ per se had the function of the binder.

Further, as is apparent from No. 3 to No. 14, the larger the amount of $Al_2O_3$ added, the lower the contact angle and the better the hydrophilicity. Therefore, the hydrophilicity can be varied by regulating the amount of $Al_2O_3$ added. From the results shown in Table 2, since the decomposition activity of $TiO_2$ can be varied by regulating the amount of metals, such as copper, silver, palladium, and iron, supported on the photocatalyst, regulation of the amount of $Al_2O_3$ added and regulation of the metal supported can regulate the balance between the hydrophilicity and the decomposition activity (decomposition properties). As a result, when high decomposition activity is required, the required high decomposition activity can be attained while maintaining the level of the hydrophilicity equal to or higher than the level attained by the photocatalyst.

Possessing both the hydrophilic nature and the decomposition activity has the following advantages. Specifically, a two-stage process of removal of stains based on the hydrophilic nature and removal of stains based on the decomposition activity can provide markedly improved removal of deposited stains and improved removing speed. In this case, for some stains, the deposition strength of slight stains left after the removal of stains based on the hydrophilic nature is high. However, the improved decomposition activity through the regulation of the amount of the metal supported enables even the slight stains having high deposition strength to be removed. Further, removal of the stain can prevent the photocatalyst from undergoing light shielding. This can increase the quantity of light applied. Therefore, removal of stains based on the hydrophilic nature and removal of stains based on the decomposition activity can be very efficiently retained.

In summary, it was found that addition of $SiO_2$, $Al_2O_3$, or $ZrO_2$ to the photocatalyst can improve the contact angle under light irradiation conditions and the retention of the hydrophilicity after storage in a dark place. This effect is considered to be created by the hydrophilic nature of these materials. The heat of wetting may be mentioned as an indicative of the hydrophilicity of materials. The heat of wetting of $TiO_2$, a preferred photocatalyst, is 320 to $\times 512 \times 10^{-3}$ $Jm^{-2}$ for anatase form and 293 to $645 \times 10^{-3}$ $Jm^{-2}$ for rutile form. For this reason, compounds having a heat of wetting of not less than $500 \times 10^{-3}$ $Jm^{-2}$ are preferred.

In addition to the above three metal oxides, $GeO_2$, $ThO_2$, and ZnO may be used. These metal oxides may be in a crystal form, as well as in an amorphous form. The particle diameter thereof was found to be not more than 0.1 microns. Addition of $SiO_2$ was found to contribute to improved layer hardness. Replacement of a part of the amount of $SiO_2$ added with $K_2O$ or $LiO_2$ could improve the layer hardness even when the firing temperature is low. In particular, when $TiO_2$/(total solid content of hydrophilicity-imparting/regulating agent) is equal to or greater than 0.5 and $SiO_2$/(total solid content of hydrophilicity-imparting/regulating agent) is equal to or greater than 0.5 are satisfied, the above effect can be expected.

Next, an improvement in superhydrophilic activity by the addition of other ingredient (metal oxide), which contributes to an improvement in the hydrophilicity of $TiO_2$, such as $SiO_2$ or $Al_2O_3$, and an improvement in other functions (improvement in layer hardness) will be described S for a paint type example (ninth example)

(i) Provision of Photocatalyst and Metal Oxide Sols:
Photocatalytic material/$TiO_2$ sol: (TA-15, manufactured by Nissan Chemical Industry Ltd.).

Also in this ninth example, an $SiO_2$ sol was used in addition to anatase form of $TiO_2$ sol which is harmless, chemically stable, and inexpensive. Other photocatalytically active crystalline $TiO_2$, $SrTiO_3$, ZnO, SiC, GaP, CdS, CdSe, $MoS_3$, $V_2O_5$, $WO_3$, $SnO_2$, $Bi_2O_5$, and $Fe_2O_3$ may also be used as alternative materials.

Metal oxide/$SiO_2$ sol: (Glasca T2202, manufactured by Japan Synthetic Rubber Co., Ltd.)

$Al_2O_3$ sol: average particle diameter about 0.01 to about 0.02 microns (Alumina Sol 520, boehmite form, manufactured by Nissan Chemical Industry Ltd.)

$SiO_2$ used was a commercially available product. A film forming element comprising a silicone (an organopolysiloxane) or a precursor of a silicone may also be used. Also for the $TiO_2$ and $Al_2O_3$ sols, commercial products were used. However, as with the eighth example, these sols may be provided through the above steps, for example, the addition of a hydrolysis inhibitor, such as hydrochloric acid or ethylamine, to an alkoxide of a metal as the starting material.

(ii) Preparation of Hydrophilicity-Imparting Materials:
The above starting materials were mixed in a given ratio together. The mixture was diluted three times with ethanol to prepare a coating liquid. The formulation of the coating liquid was as follows.

TABLE 6

| $TiO_2$ | $SiO_2$ | $Al_2O_3$ |
|---|---|---|
| 1 | 1/10 | 0 to 1/12 |
| 1 | 1/5 | 0 to 3 |
| 1 | 1/2 | 0 to 3 |
| 1 | 1 | 0 to 3 |
| 1 | 2 | 0 to 3 |
| 1 | 5 | 0 to 3 |

(iii) Preparation of Hydrophilifiable Tiles:
As with the eighth example, a glazed tile was provided as a substrate, and the coating liquid was spin-coated onto the substrate. The coated substrate was heated at 150° C. for 30 minutes to cure the coating. Although spin coating was used in the ninth example, flow coating, spray coating, dip coating, roll coating, brush coating, and other coating methods are usable. Also in the ninth example, besides tiles, metals, ceramics, potteries, glasses, plastics, woods, stones, cements, concretes, or combinations or laminates of the above substrates may be used as the substrate. In this ninth example, the sols used were those described above in connection with the provision of the sols, and, as specified in Table 6, the ingredients were $TiO_2$, $SiO_2$, and optionally $Al_2O_3$. Therefore, the surface layer is of a two or three component system of a combination of the photocatalyst, the amphoteric or basic or acidic metal oxide typified by alumina, and the other compound (oxide), such as silica, described in the fourth example.

(iv) Evaluation:
For the layer hardness, a pencil hardness test (General Test for Paints specified in JIS K 5400) was carried out for test tiles (the ninth example tiles and the comparative tile) The results are summarized in Table 7. For the hydrophilicity, the static contact angle with water was measured for the test tiles (the ninth example tiles and the comparative tile) in the same manner as in the eighth example. The results are summarized in Table 8. In this case, the intensity of ultraviolet irradiation was about 1.2 mW/cm², and the ultraviolet irradiation time was 12 hr.

TABLE 7

|  | $Al_2O_3/TiO_2$ | | | | | | | | |
|---|---|---|---|---|---|---|---|---|---|
| $SiO_2/TiO_2$ | 0 | 1/24 | 1/12 | 1/6 | 1/4 | 1/2 | 1 | 2 | 3 |
| 1/10 | B or less | B or less | B or less | — | — | — | — | — | — |
| 1/5 | 2H | 2H | 2H | 2H | 2H | 2H | 2H | 2H | 2H |
| 1/2 | 4H | 4H | 4H | 4H | 4H | 4H | 4H | 4H | 4H |
| 1 | 4H | 4H | 4H | 4H | 4H | 4H | 4H | 4H | 4H |
| 2 | 4H | 4H | 4H | 4H | 4H | 4H | 4H | 4H | 4H |
| 5 | 4H | 4H | 4H | 4H | 4H | 4H | 4H | 4H | 4H |

TABLE 8

|  | $Al_2O_3/TiO_2$ | | | | | | | |
|---|---|---|---|---|---|---|---|---|
| $SiO_2/TiO_2$ | 0 | 1/24 | 1/12 | 1/4 | 1/2 | 1 | 2 | 3 |
| 1/5 | 60 | 70 | 45 | 30 | 0 | 10 | 45 | 75 |
| 1/2 | 60 | 60 | 45 | 40 | 0 | 20 | 45 | 70 |
| 1 | 60 | 60 | 20 | 0 | 0 | 0 | 20 | 55 |
| 2 | 70 | 60 | 50 | 50 | 50 | 55 | 60 | 70 |
| 5 | 80 | 75 | 75 | 75 | 80 | 80 | 80 | 80 |

As is apparent from Table 7, when $SiO_2/TiO_2$ is not more than 0.1, the amount of the binder ($SiO_2$ sol) is unsatisfactory, leading to lowered layer strength. Further, as is apparent from Table 8, when $Al_2O_3/TiO_2$ is 1/12 to 2 with $SiO_2/TiO_2$ being 1/5 to 2, the effect of improving the hydrophilicity by the addition of alumina is developed. As described in the eighth example, this effect also is considered to be created by the hydrophilic nature of $Al_2O_3$. The heat of wetting may be mentioned as an indicative of the hydrophilicity of materials. The heat of wetting of $TiO_2$, a preferred photocatalyst, is 320 to 512×10⁻³ Jm² for anatase form and 293 to 645×10⁻³ Jm² for rutile form. For this reason, compounds having a heat of wetting of not less than 500×10⁻³ Jm² are preferred. Also in this example, in addition to the above three metal oxides, $ZrO_2$, $GeO_2$, $ThO_2$, and ZnO may be used. These metal oxides may be in a crystal form, as well as in an amorphous form.

The present invention has been described with reference to examples, but it is a matter of course that the present invention is not limited to the above examples and embodiments, and various variations and modifications are effected within the scope of the subject matter of the present invention.

For example, in anchoring particles of copper, an oxide thereof or the like onto a tile to produce a tile having supplemented antimicrobial activity, a method may be used which comprises previously producing a tile having a surface layer of a photocatalyst formulation, through coating of a Ti/Al sol onto the surface of a tile and firing of the coated tile, and then coating a third sol onto the surface layer of the tile followed by firing.

The invention claimed is:

1. A method for cleaning air, comprising the steps of:
   contacting air with the surface of a composite material which is exposed to light; and
   contacting the surface of the composite material with water, said composite material comprising at least a substrate and a surface layer, said surface layer being hydrophilic and self-cleanable, said surface layer comprising three components comprising:
   a component (i) comprising a photocatalyst which functions as a catalyst upon exposure to light;
   a component (ii) comprising at least one metal oxide selected from the group consisting of ZnO, SrO, BaO, MgO, CaO, $Rb_2O$, $Na_2O$, $K_2O$, and $P_2O_5$; and
   a component (iii) comprising at least one metal oxide selected from the group consisting of $SiO_2$, $ZrO_2$, $GeO_2$, and $ThO_2$;
   wherein components (i), (ii) and (iii) are all situated within said surface layer which is provided as a single surface layer, such that all of said components are in close proximity to one another within the single surface layer.

2. A method according to claim 1, wherein the composite material satisfies a/(a+b) of about 0.0001 to about 0.8, wherein a represents the weight of the metal oxide as the component (ii) and b represents the weight of the photocatalyst as the component (i).

3. A method according to claim 1, wherein the photocatalyst as the component (i) and the metal oxide as the component (ii) are contained in the form of particles having a diameter of about 0.005 to about 0.5 microns.

4. A method according to claim 1, wherein the composite material further comprises a component (iv), in said surface layer, comprising at least one antimicrobial metal selected from the group consisting of zinc, silver, and copper, and wherein the antimicrobial metal as the component (iv) is supported on the photocatalyst as the component (i).

5. A method according to claim 1, wherein the surface layer further comprises at least one metal selected from the group consisting of silver, copper, palladium, iron, nickel, chromium, cobalt, platinum, gold, rhodium, and ruthenium.

6. A method according to claim 1, wherein the surface layer further comprises at least one metal selected from the group consisting of lithium, calcium, magnesium, and aluminum in an amount effective for improving the hydrophilicity.

7. A method according to claim 4, wherein the composite material satisfies c/d of about 0.00001 to about 0.05 wherein c represents the weight of the component (iv) and d represents the weight of the photocatalyst as the component (i).

8. A method according to claim 1, wherein the surface layer has a geometry satisfying any one of the following requirements (1) and (2):
   (1) thickness of the surface layer is about 0.01 to about 3.0 microns; and
   (2) difference in color ΔE of the surface layer between before ultraviolet irradiation and after ultraviolet irradiation of the surface layer, with a 1% silver nitrate solution deposited thereon, for 5 min at an ultraviolet intensity on the surface layer of 1.2 mW/cm², is 1 to 50.

9. A method according to claim 1, wherein the composite material has a binder which is interposed between the substrate and the surface layer.

10. A method according to claim 9, wherein the binder is polymerizable or meltable below a temperature at which the substrate is deformed, to fix the surface layer onto the substrate.

11. A method according to claim 10, wherein the binder is a glaze or a paint.

12. A method according to claim 1, wherein the substrate is a tile.

13. A method according to claim 1, wherein the substrate is an earthenware, a wood, a calcium silicate material, concrete, a cement board, a cement extruded board, a plaster board, or an autoclave light-weight concrete board.

14. A method according to claim 1, wherein the composite material has an antimicrobial metal or a metal compound which is anchored on the surface of the surface layer.

15. The method of claim 1, wherein the components (i), (ii) and (iii) are all substantially intimately mixed and dispersed in the single surface layer.

* * * * *